US010050799B2

(12) United States Patent
Kawaguchi

(10) Patent No.: US 10,050,799 B2
(45) Date of Patent: Aug. 14, 2018

(54) POWER CONTROL SYSTEM AND METHOD, AND INFORMATION COMMUNICATION ABILITY CONTROL SYSTEM AND METHOD

(71) Applicant: PATCHED CONICS, LLC., Tokyo (JP)

(72) Inventor: Junichiro Kawaguchi, Uenohara (JP)

(73) Assignee: PATCHED CONICS, LLC., Tokyo (JP)

( * ) Notice: Subject to any disclaimer, the term of this patent is extended or adjusted under 35 U.S.C. 154(b) by 188 days.

(21) Appl. No.: 15/113,573

(22) PCT Filed: Jan. 27, 2015

(86) PCT No.: PCT/JP2015/052091
§ 371 (c)(1),
(2) Date: Aug. 23, 2016

(87) PCT Pub. No.: WO2015/115385
PCT Pub. Date: Aug. 6, 2015

(65) Prior Publication Data
US 2017/0010595 A1 Jan. 12, 2017

(30) Foreign Application Priority Data

Jan. 28, 2014 (JP) ................................ 2014-012924
Jul. 28, 2014 (JP) ................................ 2014-153348

(51) Int. Cl.
*G05D 23/00* (2006.01)
*H04L 12/12* (2006.01)
(Continued)

(52) U.S. Cl.
CPC ............ *H04L 12/12* (2013.01); *G05B 19/042* (2013.01); *H02J 13/00* (2013.01); *G05B 2219/2639* (2013.01)

(58) Field of Classification Search
CPC ... G05B 2219/2639; G05B 13/00; H02J 5/00; H04L 12/12; G06F 9/4893
See application file for complete search history.

(56) References Cited

U.S. PATENT DOCUMENTS 4,481,774 A 11/1984 Snook
5,581,130 A 12/1996 Boucheron
(Continued)

FOREIGN PATENT DOCUMENTS

EP 1566875 A1 8/2005
EP 2214283 A2 8/2010
(Continued)

OTHER PUBLICATIONS

An Office Action; "Notice of Reasons for Rejection," issued by the Japanese Patent Office dated Jan. 30, 2017, which corresponds to Japanese Patent Application No. 2015-149011 and is related to U.S. Appl. No. 15/113,573; with English language comments.
(Continued)

*Primary Examiner* — Tuan Vu
(74) *Attorney, Agent, or Firm* — Studebaker & Brackett PC

(57) ABSTRACT

It is a problem to be solved to provide Electric power control systems and methods which do not require one-to-one communications in both directions, in which the communications traffic does not rapidly increase even if the number of electric power consumption elements increases and which have good expandability. In addition, it is also a problem to be solved to provide information transfer capability control systems and methods which can be worked by the similar principles. In over to solve the problems, information representing an indication value for adjusting total consumed electric power which is a function of the difference between a current value and a reference value of the total consumed electric power in the group is transmitted by broadcast. Respective electric power consumed elements included in the group receive the information, and calculate, independently and in parallel, their own update values for consumed electric power by an operation using their own degrees of priorities and the indication value for adjusting total consumed electric power, and control their own consumed electric powers based on this. Information transfer capabilities can be controlled by the similar principle.

16 Claims, 15 Drawing Sheets

(51) Int. Cl.
 *H02J 13/00* (2006.01)
 *G05B 19/042* (2006.01)

(56) References Cited

U.S. PATENT DOCUMENTS

| | | | |
|---|---|---|---|
| 5,834,855 | A | 11/1998 | Chiba |
| 5,963,457 | A | 10/1999 | Kanoi et al. |
| 6,008,971 | A | 12/1999 | Duba et al. |
| 6,030,718 | A | 2/2000 | Fuglevand et al. |
| 6,310,439 | B1 | 10/2001 | Jacoby, Jr. et al. |
| 6,961,641 | B1 | 11/2005 | Forth et al. |
| 6,965,269 | B2 | 11/2005 | Takasu |
| 7,320,218 | B2 | 1/2008 | Silver et al. |
| 7,421,601 | B2 | 9/2008 | Bose et al. |
| 7,479,858 | B1 | 1/2009 | Baurand et al. |
| 7,755,111 | B2 | 7/2010 | Byrn |
| 7,805,621 | B2 | 9/2010 | Kendall et al. |
| 7,825,325 | B2 | 11/2010 | Kennedy et al. |
| 7,970,374 | B2 | 6/2011 | Riveiro et al. |
| 8,112,642 | B2 | 2/2012 | Bose et al. |
| 8,276,002 | B2 | 9/2012 | Dennard et al. |
| 8,466,760 | B2 | 6/2013 | Foster et al. |
| 8,504,214 | B2 | 8/2013 | Genc et al. |
| 8,508,540 | B2 | 8/2013 | Porwal |
| 8,588,991 | B1 | 11/2013 | Forbes, Jr. |
| 2003/0011460 | A1 | 1/2003 | Ying |
| 2003/0011486 | A1 | 1/2003 | Ying |
| 2003/0020333 | A1 | 1/2003 | Ying |
| 2004/0004533 | A1 | 1/2004 | Ying |
| 2004/0027003 | A1 | 2/2004 | Yang |
| 2005/0128043 | A1 | 6/2005 | Ying |
| 2005/0187727 | A1 | 8/2005 | Weik et al. |
| 2005/0207081 | A1 | 9/2005 | Ying |
| 2006/0064205 | A1 | 3/2006 | Ying |
| 2008/0042874 | A1 | 2/2008 | Rogai |
| 2008/0082981 | A1 | 4/2008 | Kawaguchi et al. |
| 2008/0108379 | A1 | 5/2008 | Cho et al. |
| 2008/0186126 | A1 | 8/2008 | Ying |
| 2008/0220804 | A1 | 9/2008 | Cho et al. |
| 2008/0227476 | A1 | 9/2008 | Cho et al. |
| 2009/0118867 | A1 | 5/2009 | Miyaba et al. |
| 2010/0013592 | A1 | 1/2010 | Ying |
| 2010/0152914 | A1 | 6/2010 | Ying |
| 2010/0191996 | A1 | 7/2010 | Iino et al. |
| 2011/0160874 | A1 | 6/2011 | Schulze et al. |
| 2011/0184582 | A1* | 7/2011 | Jang ............... H04L 12/12 700/296 |
| 2012/0086396 | A1 | 4/2012 | Pan et al. |
| 2012/0092122 | A1 | 4/2012 | Ying |
| 2013/0067014 | A1* | 3/2013 | Lau ............... G06F 9/4893 709/207 |
| 2013/0293001 | A1 | 11/2013 | Miura |
| 2014/0207304 | A1 | 7/2014 | Yamaguchi et al. |
| 2014/0371942 | A1 | 12/2014 | Matsuyama et al. |
| 2015/0214768 | A1 | 7/2015 | Matsuyama et al. |
| 2015/0255238 | A1 | 9/2015 | Ying |
| 2016/0209821 | A1 | 7/2016 | Hashimoto et al. |

FOREIGN PATENT DOCUMENTS

| | | |
|---|---|---|
| JP | H07-31013 A | 1/1995 |
| JP | H07-308036 A | 11/1995 |
| JP | H08-182194 A | 7/1996 |
| JP | H09-93820 A | 4/1997 |
| JP | H10-42481 A | 2/1998 |
| JP | H11-313438 A | 11/1998 |
| JP | H11-45101 A | 2/1999 |
| JP | 2000-016200 A | 1/2000 |
| JP | 2001-069668 A | 3/2001 |
| JP | 2002-027686 A | 1/2002 |
| JP | 2003-511842 A | 3/2003 |
| JP | 2004-120919 A | 4/2004 |
| JP | 2004-208393 A | 7/2004 |
| JP | 2004-328184 A | 11/2004 |
| JP | 2004-348411 A | 12/2004 |
| JP | 2005-512284 A | 4/2005 |
| JP | 2005-513900 A | 5/2005 |
| JP | 2005-178778 A | 7/2005 |
| JP | 2006-050862 A | 2/2006 |
| JP | 2007-228234 A | 9/2007 |
| JP | 2007-240084 A | 9/2007 |
| JP | 2007-311950 A | 11/2007 |
| JP | 2008-090607 A | 4/2008 |
| JP | 2009-094768 A | 4/2009 |
| JP | 2009-272966 A | 11/2009 |
| JP | 2009-540730 A | 11/2009 |
| JP | 2010-019530 A | 1/2010 |
| JP | 2010-148125 A | 7/2010 |
| JP | 2010-279238 A | 12/2010 |
| JP | 2011-234561 A | 11/2011 |
| JP | 2011-242030 A | 12/2011 |
| JP | 2012-085511 A | 4/2012 |
| JP | 2012-161202 A | 8/2012 |
| JP | 2013-027211 A | 2/2013 |
| JP | 2013-038470 A | 2/2013 |
| JP | 2013-038885 A | 2/2013 |
| JP | 2013-048326 A | 3/2013 |
| JP | 2013-070569 A | 4/2013 |
| JP | 2013-143898 A | 7/2013 |
| JP | 2013-219661 A | 10/2013 |
| JP | 2013-236529 A | 11/2013 |
| JP | 2014-239632 A | 12/2014 |
| KR | 10-2013-0142185 A | 12/2013 |
| WO | 2013/065394 A1 | 5/2013 |
| WO | 2014/010442 A1 | 1/2014 |
| WO | 2014/109403 A1 | 7/2014 |
| WO | 2015/029194 A1 | 3/2015 |
| WO | 2015/079493 A1 | 6/2015 |

OTHER PUBLICATIONS

An Office Action, mailed by the Japanese Patent Office dated Feb. 7, 2018, which corresponds to Japanese Patent Application No. 2014-012924 and is related to U.S. Appl. No. 15/113,573.

The extended European search report issued by the European Patent Office dated Nov. 2, 2017, which corresponds to European Patent Application No. 15742751.9-1804 and is related to U.S. Appl. No. 15/113,573.

An Office Action issued by the Korean Patent Office dated Feb. 1, 2018, which corresponds to Korean Patent Application 10-2016-7022662 and is related to U.S. Appl. No. 15/113,573; with its English translation.

A Decision to Grant issued by the Japanese Patent Office dated Jun. 12, 2017, which corresponds to Japanese Patent Application No. 2015-149011 and is related to U.S. Appl. No. 15/113,573.

International Search Report; PCT/JP2015/052091; dated Mar. 3, 2015.

Notification Concerning Transmittal of International Preliminary Report on Patentability (Chapter I) and Translation of Written Opinion of the International Searching Authority; PCT/JP2015/052091; dated Aug. 2, 2016.

"Hitachi Offers Connected Air Conditioners with Yitran's IT800 Power Line Communication Chip"; [online]: Sep. 27, 2015; Business Wire; Beer_Sheva, Israel & Osaka, Japan. <URL: http://www.businesswire.com/news/home/20050927005472/en/Hitachi-Offers-Connected-Air-Conditioners-Yitrans-IT800#.UtzSc3xKOSM>.

Partial Exception of : "Smart Home"; Renesas Electronics. No longer valid; <URL: http://japan.renesas.com/event/detail/et2011/report/s_home/index.jsp>.

* cited by examiner

FIG.10
{ Trapezoid Method -1
Trapezoid Method -1a
Pr (Degree of Priority) =
| | | |
|---|---|---|
| N/2 | N | 2N |
| 1/Pr=2/N | 1/N | 1/(2N) |
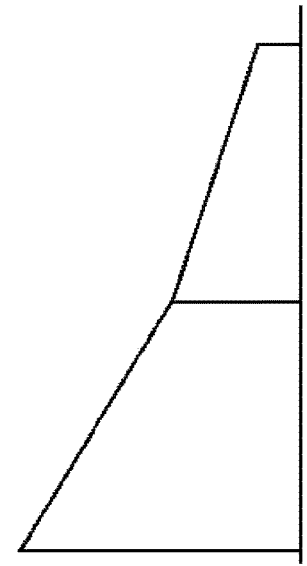
1/St (System Sensitivity) =
(2/N+1/N)/2 × (N/2) + (1/N+1/(2N))/2 × (N/2)
=9/8
St=8/9.
System Sensitivity is Advantageously Close to "1".
Trapezoid Method -1b
Pr (Degree of Priority) =
| | | |
|---|---|---|
| N/2 | N | 3N |
| 1/Pr=2/N | 1/N | 1/(3N) |
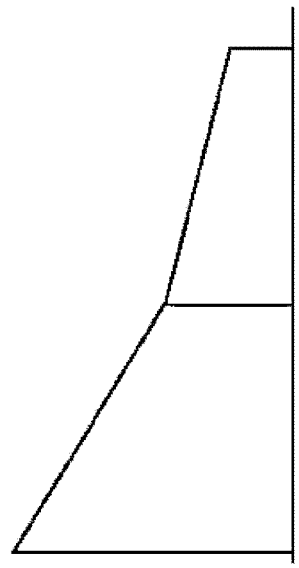
1/St (System Sensitivity) =
(2/N+1/N)/2 × (N/2) + (1/N+1/(3N))/2 × (N/2)
=13/12
St=12/13.
System Sensitivity is Advantageously Close to "1".
}

FIG.11
{ Trapezoid Method -2
Trapezoid Method -2a
Pr (Degree of Priority) =   N   1.5N   2N
1/Pr=1/N   2/(3N)   1/(2N)
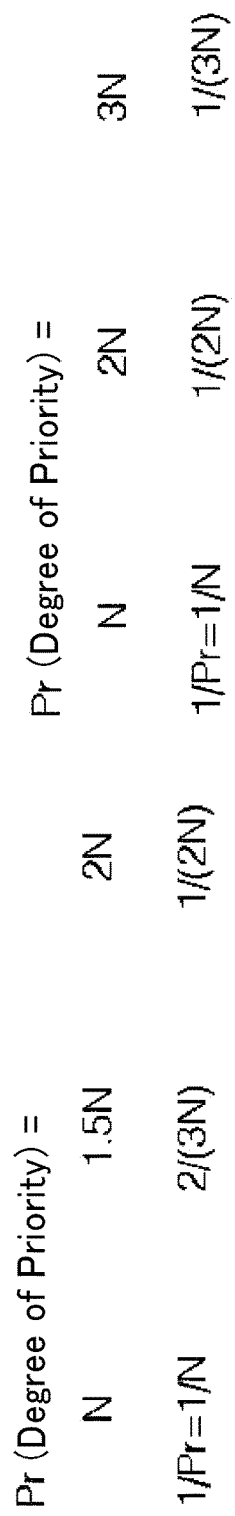
St=24/17 >1.
Effective System Sensitivity Exceeds "1",
and Stability is Improved.
Trapezoid Method -2b
Pr (Degree of Priority) =   N   2N   3N
1/Pr=1/N   1/(2N)   1/(3N)
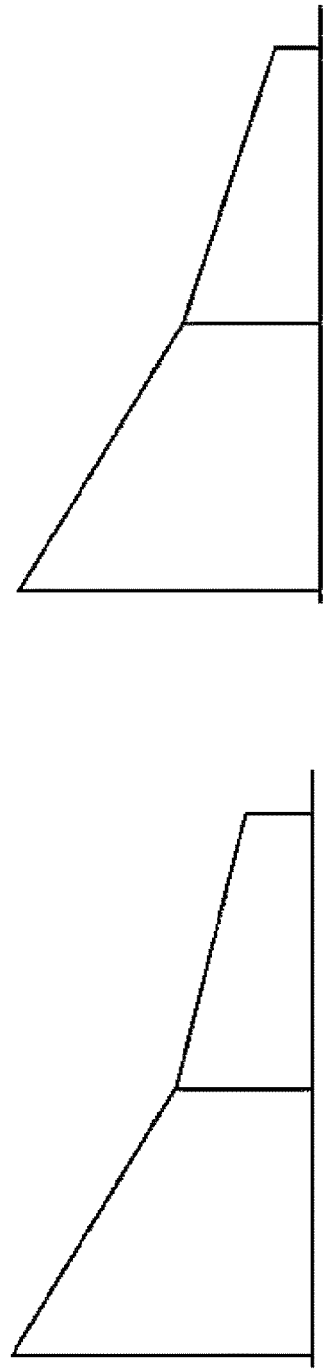
St=12/7 >1.
Effective System Sensitivity Exceeds "1",
and Stability is Improved.
}

FIG. 13
Example of Setting of Sub-Constraints
$e_0$
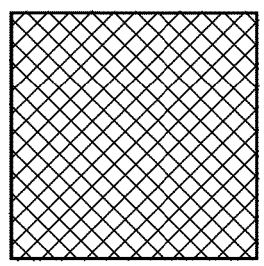
$e_{11}$
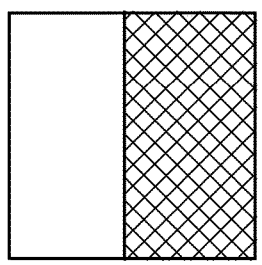
$e_{21}$
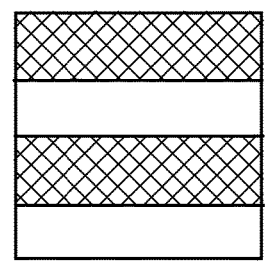
$e_{12}$
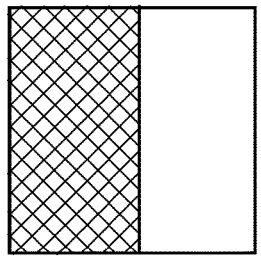
$e_{22}$
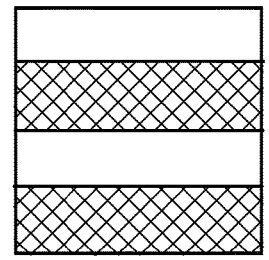

POWER CONTROL SYSTEM AND METHOD, AND INFORMATION COMMUNICATION ABILITY CONTROL SYSTEM AND METHOD

CROSS-REFERENCE TO RELATED APPLICATIONS

The present application is a U.S. National Stage Application of PCT Application No. PCT/JP2015/052091 filed Jan. 27, 2015, and claims priority from Japanese Patent Application No. 2014-012924 filed Jan. 28, 2014, and Japanese Patent Application No. 2014-153348 filed Jul. 28, 2014, the contents of which are all herein incorporated by reference in their entirety.

TECHNICAL FIELD

The present invention relates to a system and method for dynamically and efficiently performing, in particular with saving communications traffic, allocation of resources corresponding to degrees of priorities of respective elements while satisfying constraints to the total amounts of resources (electric power, information transfer capability).

BACKGROUND ART

In respective homes, offices, etc., contracts for a maximum power have been made with electric power providers for covering consumed electric powers (electric power consumptions) which can instantaneously arise, and also electric power providers have been trying to prepare facilities for generating/transmitting electricity covering total amounts of consumed electric powers which can arise by respective contract units. However, in summer, for example, capabilities for providing electric powers are always in a critical situation. Since electric power providers avoid holding of excessive facilities, their capabilities for providing fluctuate in a situation slightly above demands. As a result, margins become very small during the peak of demand.

Even in this state, crisis of electric power can be avoided if restrictions (limitations) of provision are slightly conducted for respective homes, offices, etc., via smart meters. It is expected that new contract relations between electric power providers and contractors in the future are in the above-described form.

However, environments for living must be maintained even under such restrictions. That is, it is required to autonomously and dispersively (in a distributed manner) "manage" electric powers even under constraints of electric powers to respective homes, offices, etc. Electric power providers are not in charge of this portion.

If instantaneous arising of peak electric powers is avoided by "managing" electric powers in respective homes, offices, etc. to flatten the peak, the situation related to the above-described peaks of demands can be dramatically improved. In this regard, flattening is not taken into consideration in current utilizing of electric appliances etc. in respective homes, offices, etc. Except some dwelling units, electric power control in houses, office buildings, etc. has not been realized/made common yet.

In the following, related conventional arts will be briefly described.

JP H11-313438 A "Failure-Protection Device for Electric Power Distribution System"

The invention is of hardware-handling which blocks off the circuit corresponding to detection of breakdown with failure detection device. However, that is completely different in that in the present invention a group of devices collects information with a server via communications and dynamically manages electric powers with respect to electric power constraint and required amount in a cooperative manner in view of degrees of priorities.

JP 2001-69668 A "Electric Power Management Device"

The invention premises a format in which collecting/aggregating of information from a group of devices is not performed, but that is completely different in that in the present invention a group of devices dynamically manages electric powers with respect to electric power constraint and required amount in a cooperative manner in view of degrees of priorities.

JP 2013-38885 A "Home Generation of Electric Power System"

The invention refers to an electric power generation device. On the contrary, the present invention provides negative electric power.

JP 2012-85511 A "System for Charging Vehicles which has Control of Charging Efficiency and which Provides Adaptive Charging Service"

The invention does not perform electric power management in a group of charging stations, and it assumes existence of a management station and existence of a smart grid. That is completely different in that in the present invention, regardless of existence of a management station and a smart grid, dynamic management of electric powers in view of electric power constraint, required amount and degrees of priorities in a cooperative manner is performed.

JP 2009-94768 A "Power Line Communication Devices and Method for Automatic Registration of Power Line Communication Devices"

The invention relates to a method for establishing a connection in power line communication. The present invention does not specify communication formats, and does not asserts that establishment of communication should be solved. In addition, the present invention cites power line communication as one of communication means, but does not cites establishment of connection there as a problem to be solved.

JP 2004-208393 A "Multi Output Circuit Device Enabling Setting of Prioritized Order of Electric Power Source Supply"

The invention detects excess of total load electric current, and it assumes disconnection of the loads in the set order. The present invention performs excess of the loads via collecting of information in a group of devices, and it does not require a particular detection means. In addition, it is characterized in that the order of disconnecting the loads is not set in advance, but determined by dynamic judgment in the group of devices.

JP 2003-511842 A "Contactor Breaker"

In the invention, failure detection and control based on the same are performed in a same one. That is completely different in that in the present invention, a group of devices dynamically manages electric powers in view of electric power constraint, required amount and degrees of priorities in a cooperative manner.

JP 2013-70569 A "Dispersive Type Electric Power Source System"

In the invention, breakdown detection and control are performed in a same one. However, it is completely different in that in the present invention, a group of devices dynamically manages electric powers in view of electric power constraint, required amount and degrees of priorities in a cooperative manner.

JP 2011-234561 A "Intelligent Electric Power Distribution Board, Electric Power Distribution Device, System Against Electric Power Failure and Method for Electric Power Distribution"

In the invention, detection of electric power failure, subsequent connection switching to a backup electric power source and inverse operations after recovering from the electric power failure are performed in a same one. It is completely different in that, a group of devices dynamically manages electric powers in view of electric power constraint, required amount and degrees of priorities in a cooperative manner.

JP 2010-148125 A "System for Remote Acquisition of Electric Energy Consumption Including that for Home and Remote Control of Distributed Target Users"

The invention premises a centralized management via a communication structure as a center server, concentrator, and a meter, but that is completely different in that the present invention originates from a structure in which a group of devices dynamically manages electric powers in view of electric power constraint, required amount and degrees of priorities in a cooperative manner, independently in dispersed local groups.

JP 2005-513900 A "System for Remote Acquisition of Electric Energy Consumption Including that for Home and Remote Control of Distributed Target Users"

The invention premises a centralized management via a communication structure as a center server, concentrator, and a meter, but that is completely different in that the present invention originates from a structure in which a group of devices dynamically manages electric powers in view of electric power constraint, required amount and degrees of priorities in a cooperative manner, independently in dispersed local groups.

JP H09-93820 A "Solar Photovoltaic Electric Power Generation Device"

The invention only describes communication means and block-off means. It is completely different in that, in the present invention, a group of devices dynamically manages electric powers in view of electric power constraint, required amount and degrees of priorities in a cooperative manner.

JP H10-42481 A "Electric Power Source Control Device for Vehicles"

Electric power source block-off device according to the invention premises configuration of a centralized management making a tree or star system around there. That is completely different in that in the present invention, a group of devices dynamically manages electric powers in view of electric power constraint, required amount and degrees of priorities in a cooperative manner.

JP 2000-16200 A "Electric Power Source Control Device for Vehicles"

Electric power source block-off device according to the invention premises configuration of a centralized management making a tree or star system around there. That is completely different in that in the present invention, a group of devices dynamically manages electric powers in view of electric power constraint, required amount and degrees of priorities in a cooperative manner.

JP 2005-178778 A "Electric Power Source Terminal Device for Vehicles and Electric Power Supply System for Vehicles"

Electric power source block-off device according to the invention premises configuration of a centralized management making a tree or star system around there. That is completely different in that in the present invention, a group of devices dynamically manages electric powers in view of electric power constraint, required amount and degrees of priorities in a cooperative manner.

JP 2004-348411 A "Disperse Type Electric Power Reception/Distribution Equipment Integrated with Central Monitor Control System"

The invention premises existence of a central monitor control system. That is completely different in that in the present invention, a group of devices dynamically manages electric powers in view of electric power constraint, required amount and degrees of priorities in a cooperative manner.

JP 2012-161202 A "Hierarchical Type Demand/Supply Control Device and Electric Power Structure Control System"

In the invention, a hierarchy is constructed but a centralized monitor control system aggregating information is made. It is completely different in that there is not the point where aggregation of information and control in a group are performed dispersively and independently from other groups, hierarchies as an embodiment of the present invention.

JP 2010-279238 A "System for Monitoring and Controlling a Structure"

A hierarchy is constructed in the invention, but it is completely different in that there is not the point where aggregation of information and control in a group are performed dispersively and independently from other groups, classes as an embodiment of the present invention.

JP 2002-27686 A "Consumed Electric Power Control Method for Devices in a Store"

Keywords "hierarchy", "disperse" are present as the name in the invention, but the contents are qualitatively different and it is completely different from the present invention, as described below by an extraction of the specification: (Extraction from JP 2002-27686 A)

"In addition, respective controllers constitute an autonomous and dispersive system, and even if one controller as a subsystem becomes inactive, there is not any trouble in other controllers controlling devices under their own administration (This is called capability of autonomous control). And, respective controllers can coordinate their purposes among them each other (This is called capability of autonomous coordination). Because of this, there is not distinction of master/slave or difference in importance among the respective controllers, and they basically can perform management and control with their own resources."

"Autonomous and dispersive" control according to the invention is, as in FIG. 2 of the specification, independency among kinds of controllers such as an illumination and an air conditioner, and it is not indicated that arrangements of electric powers among air conditioners, among illuminations, under a controller are autonomously performed. An embodiment of the present invention has a first feature in that dynamic arrangement of electric powers in view of degrees of priorities of those under members are performed independently from other groups and classes. Even though their titles are similar in as "autonomous and dispersive", their methods are completely different. In addition, "class" in the invention indicates a class in an operation mode as time zones, cooperative energy savings and peaks. However, classes according to one embodiment of the present invention are, when applied to the invention, classes constituted from groups of which members are stores, or classes constituted from groups of which members are servers representing regional stores and the like. Even though their name is "hierarchy", their definitions are different in a fundamental way. One embodiment of the present invention has a first feature again in which, in any class of them, electric powers arrangement is dynamically performed independently from other groups or classes in view of degrees of priorities among groups, and the method is completely different.

JP H11-45101 A "Monitor Control System"

Hierarchy, dispersive monitor control according to the invention is based on decentralization as execution part, information exchange part and interface part. That is different in a fundamental way from one like an embodiment of the present invention which provides a method for dynamically determining electric powers arrangement in respective classes of which constituent members are groups or in respective groups of which constituent members are devices in accordance with degrees of priorities among the members under given electric power constraints.

JP H07-308036 A "Monitoring Method for Electric Power Distribution System, Controlling Method of Electric Power Distribution System and those Devices"

Monitoring and control according to the invention do not perform autonomous control among constituent members. That is different in a fundamental way from one like an embodiment of the present invention which provides a method for dynamically determining electric powers arrangement in respective classes of which constituent members are groups or in respective groups of which constituent members are devices in accordance with degrees of priorities among the members under given electric power constraints.

JP H07-31013 A "Indoor Electricity Line System" The invention merely provides means for lighting emergency lights.

JP 2008-90607 A "Autonomous Dispersive Type Control with Constraints of Resources"

Dispersion according to the invention indicates that a server is not specified, but the present invention teaches, not by a global control in block, but in subdivided units, controlling for enabling local and flexible measures. In the present invention, a server can be specified or it can be fixed.

The invention suggests a particular way for causing to perform process of determining measure/will, but in the present invention, it is necessary only to define a server in any way, and there is no limitation of ways of dynamically allocating the process. It does not have to be of card game type, and it does not specially require "shift" of a server function. The server function can even be shifted in an order of serial numbers or can be fixed.

The invention aims to maintain/accomplish performance by inputting resources, but an embodiment of the present invention does not input electric power as resource but permanently or intermittently blocks off electric power. In the present patent, permanent or intermittent block off of electric power is performed in view of required electric power amount and constraint to electric power amount based on degrees of priorities when consumed electric power is in excess of the permitted value or the target value instead of control in which electric power supply as total resources is inputted at a maximum. In that patent, the inputted electric power as resources is determined on the control side and thus it is known in advance, while in the present invention it is information to be measured and obtained.

That is, the purpose of that invention is exercising "controlling functions to accomplish/maintain the performance of the system as a whole", and is "a method for controlling individual performances of all the elements while meeting the constraint of the total resources (total sum of resources)" (claim 1 in that publication). However, in one embodiment of the present invention, it is aimed to prevent damages to the system by positively sacrificing accomplishment/maintenance of the performance though there are constraints to the total sum of the resources.

JP2013-38470 A "Controlling Device and Controlling System for Electric Devices"

(1) In that publication, constraints to electric power as resources are not taken into consideration, and solutions meeting those constraints are not ensured. Only certain actions which are configured in advance are taken in a feed-forward manner. In this regard, "configuration" in the description of claim scope in that publication indicates preliminary definition.

The present invention is completely different from the invention described in that publication in that the present invention explicitly deals with constraint to resources and ensures actions meeting it.

(2) Actions suggested in that publication are actions of command by so-called bulk transmission part, but the present invention is completely different from the invention described in that publication in that the present invention suggests a method for determining a solution of optimization under constraint conditions by cooperation of after-mentioned "broadcast" transmission process and parallel processes in respective elements.

(3) The present invention is completely different from the invention described in that publication in that the present invention characteristically enables to obtain a solution of optimization under constraint conditions regardless of dynamically changing of degrees of priorities in respective elements.

JP 2011-242030 A "Device for Controlling Air Conditioner"

JP 2010-19530 A "Air Conditioning System and Method for Adjusting Communications Traffic"

JP 2009-272966 A "System for Managing Devices and Equipments"

JP 2007-240084 A "Air Conditioner and Method for Setting Addresses in Air Conditioner"

JP 2007-228234 A "Transmission Controlling Device, System for Managing Devices and Method for Controlling Transmission"

JP 2004-328184 A "Management and Control System, Information Transmission Method, Communication Method, Network Node, Sending and Receiving Device, Information sharing Device, Air Conditioner and Centralized Controlling Device"

Those publications merely refer to communication address-related portions and do not deal with controlling measures.

Japanese Patent Application No. 2014-12924 "Power Management Method and System"

That invention suggests optimization with degrees of priorities in case of constraints to total resources and a power management system enabling it. However, they take steps of information-collecting from respective clients of a server, determining of allocated amounts by the server, and informing the respective clients of the allocated amounts from the server, and they merely hold out the problem itself to be solved by the present invention.

The present invention tries to accelerate processes by sharing among an alert element and respective member elements.

In this regard, the above application disclosing inventions by the inventor of the present invention has not been published yet at the time of filing of this application.

U.S. Pat. No. 8,504,214 B specification "Self-healing power grid and method thereof" The disclosure of that publication is not related to a method for allocating electric power.

U.S. Pat. No. 8,276,002 B specification "Power delivery in a heterogeneous 3-D stacked apparatus"

The publication deals with power source functions, but it does not deal with dynamic allocation of electric powers to members.

U.S. Pat. No. 8,112,642 B specification "Method and system for controlling power in a chip through a power-performance monitor and control unit U.S. Pat. No. 7,421,601 B specification "Method and system for controlling power in a chip through a power-performance monitor and control unit"

Those publications are related to microprocessor power sources, and they are not related to functions for performing dynamic and autonomous electric power allocations.

U.S. Pat. No. 7,805,621 B specification "Method and apparatus for providing a bus interface with power management features"

That publication discloses transition of electric power modes and does not deal with functions of determining dynamic allocation among members.

U.S. Pat. No. 6,961,641 B specification "Intra-device communications architecture for managing electrical power distribution and consumption"

The disclosure of that publication is about an architecture in which intelligent devices and servers are connected by a network at most. It does not disclose how electric power management is actually performed. The present invention particularly provides measures for allocating electric powers.

U.S. Pat. No. 5,581,130 B specification "Circuit board for the control and/or power supply of electrical function devices of a vehicle"

That publication requests to make a circuit as a modular shape at most.

U.S. Pat. No. 8,508,540 B specification "Resonant induction to power a graphics processing unit"

The disclosure of that publication is related to hardware supplying electric power by induction and is completely different from the present invention.

U.S. Pat. No. 8,466,760 B specification "Configurable power, supply using MEMS switch"

The disclosure of that publication is related to hardware of switches produced with MEMS of dual substrate, and is completely different from the present invention.

U.S. Pat. No. 7,970,374 B specification "Multi-wideband communications over power lines"

The disclosure of that publication is related to transmission media, but the present invention is not dependent on a particular medium.

U.S. Pat. No. 7,825,325 B specification "Portable lighting and power-generating system"

The disclosure of that document is related to a particular device, and is completely different from the present invention.

U.S. Pat. No. 7,755,111 B specification "Programmable power management using a nanotube structure"

The disclosure of that publication is related to a device using a nanotube, and is completely different from the present invention.

U.S. Pat. No. 7,320,218 B specification "Method and system for generating of power using stirling engine principles"

The disclosure of that publication is related to hardware as stirling engine and is completely different from the present invention.

U.S. Pat. No. 6,965,269 B specification "Microwave phase shifter having an active layer under the phase shifting line and power amplifier using such a phase shifter"

The disclosure of that publication is related to hardware as phase adjuster in communication devices and is completely different from the present invention.

U.S. Pat. No. 6,310,439 B specification "Distributed parallel semiconductor device spaced for improved thermal distribution and having reduced power dissipation"

The disclosure of that publication is related to semiconductor arrangement and thermal dissipation, and is completely different from the present invention.

U.S. Pat. No. 6,030,718 B specification "Proton exchange membrane fuel cell power system"

The disclosure of that publication is related to hardware as fuel battery and is completely different from the present invention.

U.S. Pat. No. 4,481,774 B specification "Solar canopy and solar augmented wind power station"

The disclosure of that publication is related to device for photovoltaic power generation and is completely different from the present invention.

"TMC NEWS Hitachi Offers Connected Air Conditioners with Yitran's IT800 Power Line Communication Chip" Internet <URL: http://technews.tmcnet.com/ivr/news/2005/sep/1186941.htm> or <URL: http://www.businesswire.com/news/home/20050927005472/en/Hitachi-Offers-Con-nected-Air-Conditioners-Yitrans-IT800#.UtzSc3xKOSM>

In the above web site, an example in which communication devices is provided to home electrical appliances is disclosed. However, the present invention characteristically performs independent distributed control without communication or centralized control. The technical details of those inventions are completely different.

"Smart Home", Internet <URL: http://japan.renesas.com/event/detail/et2011/report/s_home/index.jsp>

In the above web site, an example in which devices are disconnected under predetermined degrees of priorities is disclosed. When comparing to the present invention, they are different at least in the following points.

(1) In the example disclosed in the above website, controlling is performed in units of sockets, while the present invention is in units of devices and does not restrict the place of using.

(2) In the example disclosed in the above website, it is configured to perform permanent disconnection, but the present invention enables, not only permanent disconnection, but also continuous electric power reduction.

(3) In the example disclosed in the above website, static configuration of degrees of priorities are performed in units of sockets, but the present invention enables dynamic configuration of degrees of priorities in units of devices.

(4) The present invention has structures in which consumed electric power allocation is dynamically determined in groups, independent controls are performed among groups, classes are configured, and consumed electric power allocations are similarly and dynamically determined also in upper classes.

PRIOR ART DOCUMENTS

| Patent Documents | |
|---|---|
| Patent Document 1 | JP H11-313438 A |
| Patent Document 2 | JP 2001-69668 A |
| Patent Document 3 | JP 2013-38885 A |
| Patent Document 4 | JP 2012-85511 A |
| Patent Document 5 | JP 2009-94768 A |
| Patent Document 6 | JP 2004-208393 A |
| Patent Document 7 | JP 2003-511842 A |
| Patent Document 8 | JP 2013-70569 A |
| Patent Document 9 | JP 2011-234561 A |
| Patent Document 10 | JP 2010-148125 A |
| Patent Document 11 | JP 2005-513900 A |
| Patent Document 12 | JP H09-93820 A |
| Patent Document 13 | JP H10-42481 A |
| Patent Document 14 | JP 2000-16200 A |
| Patent Document 15 | JP 2005-178778 A |
| Patent Document 16 | JP 2004-348411 A |
| Patent Document 17 | JP 2012-161202 A |
| Patent Document 18 | JP 2010-279238 A |
| Patent Document 19 | JP 2002-27686 A |
| Patent Document 20 | JP H11-45101 A |
| Patent Document 21 | JP H07-308036 A |
| Patent Document 22 | JP H07-31013 A |
| Patent Document 23 | JP 2008-90607 A |
| Patent Document 24 | JP 2013-38470 A |
| Patent Document 25 | JP 2011-242030 A |
| Patent Document 26 | JP 2010-19530 A |
| Patent Document 27 | JP 2009-272966 A |
| Patent Document 28 | JP 2007-240084 A |
| Patent Document 29 | JP 2007-228234 A |
| Patent Document 30 | JP 2004-328184 A |
| Patent Document 31 | U.S. Pat. No. 8,588,991 B specification |
| Patent Document 32 | U.S. Pat. No. 8,504,214 B specification |
| Patent Document 33 | U.S. Pat. No. 8,276,002 B specification |
| Patent Document 34 | U.S. Pat. No. 8,112,642 B specification |
| Patent Document 35 | U.S. Pat. No. 7,421,601 B specification |
| Patent Document 36 | U.S. Pat. No. 7,805,621 B specification |
| Patent Document 37 | U.S. Pat. No. 6,961,641 B specification |
| Patent Document 38 | U.S. Pat. No. 5,581,130 B specification |
| Patent Document 39 | U.S. Pat. No. 8,508,540 B specification |
| Patent Document 40 | U.S. Pat. No. 8,466,760 B specification |
| Patent Document 41 | U.S. Pat. No. 7,970,374 B specification |
| Patent Document 42 | U.S. Pat. No. 7,825,325 B specification |
| Patent Document 43 | U.S. Pat. No. 7,755,111 B specification |
| Patent Document 44 | U.S. Pat. No. 7,320,218 B specification |
| Patent Document 45 | U.S. Pat. No. 6,965,269 B specification |
| Patent Document 46 | U.S. Pat. No. 6,310,439 B specification |
| Patent Document 47 | U.S. Pat. No. 6,030,718 B specification |
| Patent Document 48 | U.S. Pat. No. 4,481,774 B specification |

Non Patent Document

Non Patent Document 1: "TMC NEWS Hitachi Offers Connected Air Conditioners with Yitran's IT800 Power Line Communication Chip", [online], Sep. 27, 2005 Internet <URL: http://technews.tmcnet.com/ivr/news/2005/sep/1186941.htm> or <URL: http://www.businesswire.com/news/home/20050927005472/en/Hitachi-Offers-Connected-Air-Conditioners-Yitrans-IT800#.UtzSc3xKOSM>

Non Patent document 2: "Smart Home", [online], Renesas Electronics Inc., Internet <URL: http://japan.renesas.com/event/detail/et2011/report/s_home/index.jsp>

SUMMARY OF THE INVENTION

Problem to be Solved by the Invention

In case that the total consumed electric power (total electric power consumption), that is the total resource amount in a domain (an aggregation including a single electric power consumption element which joins control or other electric power consumption elements which do not have to join control, including the after-mentioned group. In this regard, individuals (entities) which consume electric power, or individuals which permanently or instantaneously open/close electric power, in an iterative manner, to be supplied to those consuming individuals are called electric power consumption element.) is constrained, the problem of determining a measure for electric power allocation which is closest to the current situation of electric power consumption in the domain becomes an optimization problem with constraint conditions, and the solution is obtained as described below, as disclosed in previous documents and Japanese patent application No. 2014-12924.

Consumed electric power values which are to be allocated to respective electric power consumption elements included in a group (an aggregation constituted by individuals joining electric power control (electric power consumption element which joins control). It is defined as the minimum aggregation which performs electric power control sharing the same information) in a domain are defined as $f_1, f_2, \ldots, f_n$, and a vector made by arranging them longitudinally is defined as f.

Assuming that a regulatory value of the total electric power (electric power limitation) for a group including electric power consumption elements is $P_t$, the constraint condition that the total value of the consumed electric power in the group is equal to $P_t$ is represented by the following formula (1):

[Numeral 1]

$$(1,1,1, \ldots 1)f = e^T f = P_1 \qquad (1)$$

In this regard, $e^T$ is an n-dimensional unit row vector (T is a symbol of transposition).

Consumed electric powers being currently consumed by the respective electric power consumption elements in the group are defined as $f^*_1, f^*_2, \ldots, f^*_n$, and a vector made by arranging them longitudinally is defined as f*.

The allocated values of consumed electric powers are determined as fi (i=1, 2, ... n) when the following evaluation function (performance index))

[Numeral 2]

$$\tfrac{1}{2}(f-f^*)^T Q(f-f^*) \qquad (2)$$

takes an extreme value under the binding condition of the above formula (1).

In this regard, Q in the above formula (2) is a positive definite symmetric matrix in which a diagonal element $Q_{ii}$ is equal to the degree of priority of the i-th electric power consumption element (In general, the matrix does not have to be diagonal as far as it is a positive definitive symmetric matrix, but it can be discussed as diagonal when dealing with the degrees of priorities individually below. For simplifying the explanation, Q is treated as n×n diagonal matrix below.).

Assuming that the expanded evaluation function (extended performance index) is (lambda λ is the Lagrange's undetermined multiplier):

[Numeral 3]

$$J = \tfrac{1}{2}(f-f^*)^T Q(f-f^*) + \lambda(e^T f - P_t) \qquad (3)$$

the optimum solutions of $f_i$ and lambda $\lambda$ are determined on the condition that partial differentiation values of the above expanded evaluation function by $f_i$ and $\lambda$ (lambda) are zero.

The optimum solutions are determined by aggregating weights (degrees of priorities) in the group and by calculating the above-described partial differentiations, as described below.

[Numeral 4]

$$\lambda = (e^T f^* - P_t) \bigg/ \left( \frac{1}{Q_{11}} + \frac{1}{Q_{22}} + \frac{1}{Q_{33}} + \ldots + \frac{1}{Q_{nn}} \right) \quad (4)$$

[Numeral 5]

$$f_i = f_i^* - (e^T f^* - P_t) \bigg/ \left( \frac{1}{Q_{11}} + \frac{1}{Q_{22}} + \frac{1}{Q_{33}} + \ldots + \frac{1}{Q_{nn}} \right) \bigg/ Q_{ii} \quad (5)$$

The re-allocated consumed electric powers should be determined as electric powers closest to the current situation of consumption in the respective electric power consumption elements in the group, and thus the solutions depend on the current situation of allocation of consumed electric power as in the above formula (5).

In this regard, the expanded evaluation function wherein it starts from a state where no electric power is consumed at all in the domain at the beginning is described according to the formula (6) below, assuming that the values of the consumed electric power to be allocated to the respective electric power consumption elements included in the group of the domain are $f_{1,\,opt}$, $f_{2,\,opt}$, ..., $f_{n,\,opt}$ and the vector made by arranging them longitudinally is defined as $f_{opt}$.

[Numeral 6]

$$J = \tfrac{1}{2} f_{opt}^T Q f_{opt} + \lambda (e^T f_{opt} - P_t) \quad (6)$$

The optimum solutions are determined by aggregating weights (degrees of priorities) in the group and under the condition that the partial differentiation values of the above expanded evaluation function of the above formula (6) by $f_{i,\,opt}$ and lambda $\lambda$ are zero, as follow:

[Numeral 7]

$$\lambda = -P_t \bigg/ \left( \frac{1}{Q_{11}} + \frac{1}{Q_{22}} + \frac{1}{Q_{33}} + \ldots + \frac{1}{Q_{nn}} \right) \quad (7)$$

[Numeral 8]

$$f_{i,opt} = P_t \bigg/ \left( \frac{1}{Q_{11}} + \frac{1}{Q_{22}} + \frac{1}{Q_{33}} + \ldots + \frac{1}{Q_{nn}} \right) \bigg/ Q_{ii} \quad (8)$$

While it is required to determine solutions close to the current situation of electric power consumption in the respective elements, the above formulas (5), (8) are transformed to be represented as:

[Numeral 9]

$$f = \left( 1 - \frac{1}{e^T Q^{-1} e} Q^{-1} e e^T \right) f^* + f_{opt} \quad (9)$$

(In the above formula (9), "1" represents a unit matrix, and $Q^{-1}$ represents the inverse matrix of Q.), and thus the re-allocated electric powers depend on the current situation of electric power consumption in the respective elements.

Starting from the state where all elements are not consuming electric power at the beginning, it converges to the solution of $f_{opt}$ in the above formula (8). Therefore, if the $f_{opt}$ is required, it is enough to perform the above control via a step of once setting all the electric power consumption elements off. The control would be accomplished by sharing the same information. In this regard, if the initial state of electric power consumption is a state where, for example, the same electric power is being consumed uniformly and there is no deficiency or excess for the total resources, this distributed control does not require change of it.

However, it is realistically difficult to welcome obtaining of the $f_{opt}$ solution. Once the present control is made valid, resetting of the previous on/off states to make a transition to another state will require needless activation or stop. In a real state where electric powers are being consumed, if the respective elements are operated without deficiency or excess, or at least without deficiency, it is not necessary to daringly change that state even if that state is different from the $f_{opt}$ solution.

In order to perform the above-described electric power allocation measure, it is necessary to: aggregate electric powers being currently consumed in the respective elements in the group and information of degrees of priorities which the respective elements have (FIG. 1a, FIG. 1b); determine the measure for re-allocation (FIG. 1c); and inform the respective elements of it (FIG. 1d. In this regard, as shown in FIG. 1e, the respective elements control their own consumed electric powers according to the allocated electric powers.). The degrees of priorities can dynamically change according to situations in which the respective elements are placed, such as margins enabling electric power control at respective timings, the number of persons present in the place of use, illuminance or temperature, and they are not always fixed in advance in the group, but they are comprehended and defined in the respective elements. If this operation is performed in a server element provided in the domain, the server is required to firstly performs an operation of making inquiries about consumed electric powers and degrees of priorities to individual elements as respective devices included in the group of the domain, then the optimization problem is required to be solved, and then the electric powers of allocation which have been newly determined or updated per an element as each device are required to be informed or instructed. This operation will dramatically increase the communications traffic particularly as the number of elements making groups involved in electric power control in the domain increases, and this makes it difficult to perform high-speed electric power control, that is optimization under constraints of resources by real-time feedback. If the groups included in the domain are small and they are consisted only of 2-3 elements, the communications traffic is not so big, but for performing high-speed control in groups consisted of hundreds of elements, it is difficult to enable it by the measure in which a server and clients exchange information in both directions (in a bidirectional manner). Even if high-speed controlled responses in the whole domain are not required, when the number of elements making the domain is very big, the communications traffic amount among the server and clients is made significantly big and control is made difficult, and this results in a similarly difficult situation. In case that the number of elements making a group involved in electric power control in the domain newly appears or disappears, it would be necessary also to configure parameters related to the number of elements or communications in the group, it would be necessary to inspect the number of existing elements or information of communication environment, and it would be difficult to enable to respond to the constitution situation of the group momentarily changing. These make it more difficult to perform feedback control in real-time.

In view of the above, the present invention aims at providing systems and methods for electric power control which do not require one-to-one communications in both directions between a server and individual clients, thus in which the communications traffic does not rapidly increase even if the number of electric power consumption elements as targets of electric power control increases, and which have good expandability since it does not need setting processes etc. for one-to-one communication. In addition, the present invention aims at providing systems and methods for information transfer capability control which can be worked by the similar principles.

Means for Solving the Problem

First, "broadcast" according to description of the present invention will be defined. "Broadcast" or "broadcast transmission" is defined as means for transmitting information to be shared only by one-directional or one side-directional transmission of information to all individuals in the domain in significantly short time compared to the time interval of control. Although there is cases that information is transmitted with requiring multiple steps, according to schemes for composing a network, "broadcast" or "broadcast transmission" according to description of the present invention does not refer to strict simultaneity, but in the following, references are made as "broadcast" or "broadcast transmission" including those cases.

In order to accomplish the above aim, the present invention provides an electric power control system comprising:
 a broadcast transmission element; and
 one or more electric power consumption elements for which degrees of priorities are given or determined individually,
 wherein the electric power control system is configured so that:
  the broadcast transmission element measures the difference between the current value of the total consumed electric power consumed in a group including the one or more electric power consumption elements and a reference value of the total consumed electric power, determines an indication value for adjusting total consumed electric power (indication of total electric power consumption to be adjusted, or indication of total electric power consumption to be corrected) as a function of the difference, creates information to be shared in the group representing the indication value for adjusting total consumed electric power, and transmits the information as broadcast into the group;
  the one or more electric power consumption elements receive the information transmitted as broadcast, and
  each one of the one or more electric power consumption elements determines, independently from electric power consumption elements of the one or more electric power consumption elements other than the each one and the broadcast transmission element and in parallel, an update value for consumed electric power (electric power consumption to be adjusted) to be used for update of the each one's own consumed electric power by an operation using the degree of priority given or determined for the each one and the indication value for adjusting total consumed electric power, and controls the each one's own consumed electric power based on the update value for consumed electric power to control the total consumed electric power in the group.

In the above electric power control system, the indication value for adjusting total consumed electric power can also be a function of a system sensitivity.

The above electric power control system can be further configured so that the degree of priority is dynamically changed in at least one of the one or more electric power consumption elements.

The above electric power control system can be further configured so that:
 the system sensitivity differs between the case that the current value of the total consumed electric power is larger than the reference value of the total consumed electric power and the case that the current value of the total consumed electric power is smaller than the reference value of the total consumed electric power; and
 the system sensitivity in the case that the current value is larger than the reference value is higher than the system sensitivity in the case that the current value is smaller than the reference value, so that the reduction response of the total consumed electric power is higher than the increase response of the total consumed electric power in controlling the total consumed electric power and the stability is improved.

The above electric power control system can be further configured so that:
 an upper limit value and a lower limit value are prescribed to the electric power to be consumed at each one of the one or more electric power consumption elements; and
 the control of the each one's own consumed electric power based on the update value for consumed electric power performed at respective ones of the one or more electric power consumption elements is performed within a scope of consumed electric power which does not exceed the upper limit value and is not below the lower limit value.

The above electric power control system can be further configured so that:
 the broadcast transmission element or a total consumed electric power monitoring element (total electric power consumption monitor) monitors transition of the current value of the total consumed electric power adjusted by repeating control of the total consumed electric power in the group;
 the broadcast transmission element or the total consumed electric power monitoring element estimates an equivalent transition rate $C_{k,\,eq}$ given by:

[Numeral 10]

$$x_{k+1} = C_{k,eq} x_k$$

where $x_k$ is the value of difference between the current value and the reference value of the total consumed electric power at the time when the control has been repeated (applied) k times (k is an integer equal to or greater than zero) and $x_{k+1}$ is the value at the time when the control has been repeated k+1 times; and
 the soundness of the electric power control system is evaluated using the estimated value of the equivalent transition rate $C_{k,\,eq}$.

The above electric power control system can be configured so that:
the broadcast transmission element further calculates at least one indication value for adjusting consumed electric power integrated under sub-constraint, and transmits by broadcast (broadcasts) at least one sub-constraint information representing the indication value for adjusting consumed electric power integrated under sub-constraint into the group;
the one or more electric power consumption elements further receive the sub-constraint information transmitted by broadcast;
electric power consumption elements as targets of control (targeted for the control) based on the sub-constraint information among the one or more electric power consumption elements further determine an update value for consumed electric power under sub-constraint (electric power consumption to be adjusted under sub-constraint) by an operation using the degree of priority given for the each one and the indication value for adjusting consumed electric power integrated under sub-constraint, and further control the each one's own consumed electric power based on the update value for consumed electric power under sub-constraint.

The above electric power control system can be further configured so that, in addition to broadcast transmission, communication in both directions between the broadcast transmission element and at least one of the one or more electric power consumption elements is available.

The present invention also provides an electric power control system comprising:
a broadcast transmission element for which a degree of priority in upper class (upper layer) is given or determined; and
one or more electric power consumption elements for which degrees of priorities in lower class (lower layer) are given or determined individually,
the broadcast transmission element is configured to
receive information in upper class which is transmitted by broadcast from an upper class broadcast transmission element and which represents an indication value for adjusting total consumed electric power in upper class (indication of total electric power consumption to be adjusted in upper layer, or indication of total electric power consumption to be corrected in upper layer),
measure lower class total consumed electric power (total power consumption reference in lower layer) consumed in a group in lower class including one or more electric power consumption elements,
determine an indication value for adjusting total consumed electric power in lower class (indication of total electric power consumption to be adjusted in lower layer, or indication of total electric power consumption to be corrected in lower layer) to be used for update of the lower class total consumed electric power, by an operation using the lower class total consumed electric power, a degree of priority in upper class (degree of priority in upper class layer), and the indication value for adjusting total consumed electric power in upper class,
create information in lower class to be shared in the group in lower class representing the indication value for adjusting total consumed electric power in lower class, and
transmit the information in lower class as broadcast into the group in lower class;

the one or more electric power consumption elements are configured to:
receive the information in lower class transmitted as broadcast from the broadcast transmission element, and
each one of the one or more electric power consumption elements are configured to:
calculate, independently from electric power consumption elements of the one or more electric power consumption elements other than the each one and the broadcast transmission element and in parallel, an update value for consumed electric power to be used for update of the each one's own consumed electric power by an operation using the degree of priority in lower class given or determined for the each one and the indication value for adjusting total consumed electric power in lower class, and
control the each one's own consumed electric power based on the update value for consumed electric power to control the total consumed electric power in the group in lower class.

The indication value for adjusting total consumed electric power in lower class can also be a function of system sensitivity in lower class.

The above electric power control system can be further configured so that the degree of priority in upper class is dynamically changed.

The above electric power control system can be further configured so that:
the system sensitivity in lower class in the case that the indication value for adjusting total consumed electric power in lower class is a value indicating decrease of the total consumed electric power in the group in lower class is higher than the system sensitivity in lower class in the case that the indication value for adjusting total consumed electric power in lower class is a value indicating increase of the total consumed electric power in the group in lower class so that the reduction response of the total consumed electric power is higher than the increase response of the total consumed electric power in controlling the total consumed electric power and the stability is improved.

The above electric power control system can be further configured so that:
an upper limit value and a lower limit value are prescribed to the total electric power to be consumed in the group in lower class; and
the determination of the indication value for adjusting total consumed electric power in lower class performed at the broadcast transmission element is performed within the scope (band) which the broadcast transmission element has determined so that the total consumed electric power of the group in the lower class after the update does not exceed the upper limit value and is not below the lower limit value.

The above electric power control system can be further configured so that:
the broadcast transmission element or a total consumed electric power monitoring element monitors transition of the current value of the total consumed electric power adjusted by repeating control of the total consumed electric power in the group in lower class;
the broadcast transmission element or the total consumed electric power monitoring element estimates an equivalent transition rate $C_{k,\,eq}$ given by:

[Numeral 11]

$$x_{k+1} = C_{k,eq} x_k$$

where $x_k$ is the value of difference between the current value and the reference value of the total consumed electric power at the time when the control has been repeated k times (k is an integer equal to or greater than zero) and $x_{k+1}$ is the value at the time when the control has been repeated k+1 times; and the soundness of the electric power control system is evaluated using the estimated value of the equivalent transition rate $C_{k,\ eq}$.

The above electric power control system can be configured so that:

the broadcast transmission element further calculates at least one indication value for adjusting consumed electric power integrated under sub-constraint (indication of electric power consumption integrated under sub-constraint to be adjusted, or indication of electric power consumption integrated under sub-constraint to be corrected), and transmits by broadcast at least one sub-constraint information representing the indication value for adjusting consumed electric power integrated under sub-constraint into the group in lower class;

the one or more electric power consumption elements further receive the sub-constraint information transmitted by broadcast;

electric power consumption elements as targets of control based on the sub-constraint information among the one or more electric power consumption elements further determine an update value for consumed electric power under sub-constraint by an operation using the degree of priority in lower class given or determined for the each one and the indication value for adjusting consumed electric power integrated under sub-constraint, and further control the each one's own consumed electric power based on the update value for consumed electric power under sub-constraint.

The above electric power control system can be further configured so that, in addition to broadcast transmission, communication in both directions between the broadcast transmission element and at least one of the one or more electric power consumption elements is available.

The one or more electric power consumption elements can be one or more electric power consumption devices belonging to a particular dwelling unit, office, building, area, or an aggregation of a plurality of electric power consumption devices belonging to an aggregation of particular dwelling units, offices, buildings, areas. In other word, one electric power consumption device can be defined as an electric power consumption element, or a plurality of electric power consumption devices can be regarded as one electric power consumption element.

The one or more electric power consumption elements can be a mobile object or an aggregation of mobile objects. In other word, the above electric power consumption device can be a mobile object such as a portable information terminal.

In addition, the present invention provides
an information transfer capability control system comprising:

a broadcast transmission element; and one or more information transfer elements for which degrees of priorities are given or determined individually, wherein the information transfer capability control system is configured so that:

the broadcast transmission element measures the difference between the current value of the total information transfer capability occupied in a group including the one or more information transfer elements and a reference value of the total information transfer capability, determines indication value for adjusting total information transfer capability (indication of total information transfer capability to be adjusted, or indication of total information transfer capability to be corrected) as a function of the difference, creates information to be shared in the group representing the indication value for adjusting total information transfer capability, and transmits the information as broadcast into the group;

the one or more information transfer elements receive the information transmitted as broadcast, and each one of the one or more information transfer elements calculates, independently from information transfer elements of the one or more information transfer elements other than the each one and the broadcast transmission element and in parallel, an update value for information transfer capability (information transfer capability to be adjusted) to be used for update of the each one's own information transfer capability by an operation using the degree of priority given or determined for the each one and the indication value for adjusting total information transfer capability, and controls the each one's own information transfer capability based on the update value for information transfer capability to control the total information transfer capability in the group.

In one example of the above information transfer capability control system, the broadcast transmission element can be a communication server, an information transfer element can be a client machine, and information transfer capability can be communication speed.

In addition, the present invention provides
an electric power control method comprising:

measuring, by a broadcast transmission element, the difference between the current value of the total consumed electric power consumed in a group including one or more electric power consumption elements for which degrees of priorities are given or determined individually and a reference value of the total consumed electric power, determining, by the broadcast transmission element, an indication value for adjusting total consumed electric power as a function of the difference and creating information to be shared in the group representing the indication value for adjusting total consumed electric power, transmitting, by the broadcast transmission element, the information as broadcast into the group;

receiving, by the one or more electric power consumption elements, the information transmitted as broadcast, determining, by each one of the one or more electric power consumption elements, independently from electric power consumption elements of the one or more electric power consumption elements other than the each one and the broadcast transmission element and in parallel, an update value for consumed electric power to be used for update of the each one's own consumed electric power by an operation using the degree of priority given or determined for the each one and the indication value for adjusting total consumed electric power, and controlling, by each one of the one or more electric power consumption elements, the each one's own consumed electric power based on the update value for consumed electric power to control the total consumed electric power in the group.

The determining of the indication value for adjusting total consumed electric power by the broadcast transmission element can be performed by determining the indication value for adjusting total consumed electric power as a function of a system sensitivity in addition to the difference.

The above electric power control method can further comprise dynamically changing degree of priority in at least one of the one or more electric power consumption elements.

The above electric power control method can be further configured so that:
the system sensitivity differs between the case that the current value of the total consumed electric power is larger than the reference value of the total consumed electric power and the case that the current value of the total consumed electric power is smaller than the reference value of the total consumed electric power; and
the system sensitivity in the case that the current value is larger than the reference value is higher than the system sensitivity in the case that the current value is smaller than the reference value so that the reduction response of the total consumed electric power is higher than the increase response of the total consumed electric power in controlling the total consumed electric power and the stability is improved.

The above electric power control method can be further configured so that:
an upper limit value and a lower limit value are prescribed to the electric power to be consumed at each one of the one or more electric power consumption elements; and
the control of the each one's own consumed electric power based on the update value for consumed electric power performed at respective ones of the one or more electric power consumption elements is performed within a scope of consumed electric power which does not exceed the upper limit value and is not below the lower limit value.

The above electric power control method can further comprise:
monitoring, by the broadcast transmission element or a total consumed electric power monitoring element, transition of the current value of the total consumed electric power adjusted by repeating control of the total consumed electric power in the group;
estimating, by the broadcast transmission element or the total consumed electric power monitoring element, an equivalent transition rate $C_{k,\,eq}$ given by:

[Numeral 12]

$$x_{k+1} = C_{k,eq} x_k$$

where $x_k$ is the value of difference between the current value and the reference value of the total consumed electric power at the time when the control has been repeated k times (k is an integer equal to or greater than zero) and $x_{k+1}$ is the value at the time when the control has been repeated k+1 times, and evaluating the soundness of the electric power control method using the estimated value of the equivalent transition rate $C_{k,\,eq}$.

The above electric power control method can further comprise:
calculating, by the broadcast transmission element, at least one indication value for adjusting consumed electric power integrated under sub-constraint, and transmitting by broadcast at least one sub-constraint information representing the indication value for adjusting consumed electric power integrated under sub-constraint into the group;
receiving, by the one or more electric power consumption elements, the sub-constraint information transmitted by broadcast;
determining, by electric power consumption elements as targets of control based on the sub-constraint information among the one or more electric power consumption elements, an update value for consumed electric power under sub-constraint by an operation using the degree of priority given or determined for the each one and the indication value for adjusting consumed electric power integrated under sub-constraint, and further controlling the each one's own consumed electric power based on the update value for consumed electric power under sub-constraint.

The above electric power control method can further comprise, in addition to broadcast transmission, communicating in both directions between the broadcast transmission element and at least one of the one or more electric power consumption elements.

The present invention also provides an electric power control method comprising:
receiving, by a broadcast transmission element for which a degree of priority in upper class is given or determined, information in upper class which is transmitted by broadcast from an upper class broadcast transmission element and which represents an indication value for adjusting total consumed electric power in upper class;
measuring, by the broadcast transmission element, lower class total consumed electric power consumed in a group in lower class including one or more electric power consumption elements for which degrees of priorities in lower class are given or determined individually;
determining, by the broadcast transmission element, an indication value for adjusting total consumed electric power in lower class to be used for update of the lower class total consumed electric power, by an operation using the lower class total consumed electric power, a degree of priority in upper class, and the indication value for adjusting total consumed electric power in upper class, and creating information in lower class to be shared in the group in lower class representing the indication value for adjusting total consumed electric power in lower class;
transmitting, by the broadcast transmission element, the information in lower class as broadcast into the group in lower class;
receiving, by the one or more electric power consumption elements, the information in lower class transmitted as broadcast from the broadcast transmission element;
calculating, by each one of the one or more electric power consumption elements, independently from electric power consumption elements of the one or more electric power consumption elements other than the each one and the broadcast transmission element and in parallel, an update value for consumed electric power to be used for update of the each one's own consumed electric power by an operation using the degree of priority in lower class given or determined for the each one and the indication value for adjusting total consumed electric power in lower class; and controlling, by each one of the one or more electric power consumption elements, the each one's own consumed electric power based on the update value for consumed electric power to control the total consumed electric power in the group in lower class.

The determining of the indication value for adjusting total consumed electric power in lower class by the broadcast transmission element can be performed by determining the indication value for adjusting total consumed electric power in lower class by an operation using a system sensitivity in lower class in addition to the lower class total consumed electric power, a degree of priority in upper class, and indication value for adjusting total consumed electric power in upper class.

The above electric power control method can further comprise dynamically changing the degree of priority in upper class.

The above electric power control method can be further configured so that:

the system sensitivity in lower class in the case that the indication value for adjusting total consumed electric power in lower class is a value indicating decrease of the total consumed electric power in the group in lower class is higher than the system sensitivity in lower class in the case that the indication value for adjusting total consumed electric power in lower class is a value indicating increase of the total consumed electric power in the group in lower class so that the reduction response of the total consumed electric power is higher than the increase response of the total consumed electric power in controlling the total consumed electric power and the stability is improved.

The above electric power control method can be further configured so that:

an upper limit value and a lower limit value are prescribed to the total electric power to be consumed in the group in lower class; and the determination of the indication value for adjusting total consumed electric power in lower class performed at the broadcast transmission element is performed within the scope which the broadcast transmission element has determined that the total consumed electric power of the group in the lower class after the update does not exceed the upper limit value and is not below the lower limit value.

The above electric power control method can further comprise:

monitoring, by the broadcast transmission element or a total consumed electric power monitoring element, transition of the current value of the total consumed electric power adjusted by repeating control of the total consumed electric power in the group in lower class;

estimating, by the broadcast transmission element or the total consumed electric power monitoring element, an equivalent transition rate $C_{k,\,eq}$ given by:

[Numeral 13]

$$x_{k+1} = C_{k,eq} x_k$$

where $x_k$ is the value of difference between the current value and the reference value of the total consumed electric power at the time when the control has been repeated k times (k is an integer equal to or greater than zero) and $x_{k+1}$ is the value at the time when the control has been repeated k+1 times; and evaluating the soundness of the electric power control method using the estimated value of the equivalent transition rate $C_{k,\,eq}$.

The above electric power control method can further comprise:

calculating, by the broadcast transmission element, at least one indication value for adjusting consumed electric power integrated under sub-constraint, and transmitting by broadcast at least one sub-constraint information representing the indication value for adjusting consumed electric power integrated under sub-constraint into the group in lower class;

receiving, by the one or more electric power consumption elements, the sub-constraint information transmitted by broadcast;

determining, by electric power consumption elements as targets of control based on the sub-constraint information among the one or more electric power consumption elements, an update value for consumed electric power under sub-constraint by an operation using the degree of priority in lower class given or determined for the each one and the indication value for adjusting consumed electric power integrated under sub-constraint, and controlling the each one's own consumed electric power based on the update value for consumed electric power under sub-constraint.

The above electric power control method can further comprise, in addition to broadcast transmission, communicating in both directions between the broadcast transmission element and at least one of the one or more electric power consumption elements.

In the above electric power control method, the one or more electric power consumption elements can be one or more electric power consumption devices belonging to a particular dwelling unit, office, building, area, or an aggregation of a plurality of electric power consumption devices belonging to an aggregation of particular dwelling units, offices, buildings, areas.

In the above electric power control method, the one or more electric power consumption elements can be a mobile object or an aggregation of mobile objects.

In addition, the present invention provides an information transfer capability control method comprising:

measuring, by the broadcast transmission element, the difference between the current value of the total information transfer capability occupied in a group including one or more information transfer elements for which degrees of priorities are given or determined individually and a reference value of the total information transfer capability;

determining, by the broadcast transfer element, an indication value for adjusting total information transfer capability as a function of the difference, and creating information to be shared in the group representing the indication value for adjusting total information transfer capability;

transmitting, by the broadcast transmission element, the information as broadcast into the group;

receiving, by the one or more information transfer elements, the information transmitted as broadcast;

calculating, by each one of the one or more information transfer elements, independently from information transfer elements of the one or more information transfer elements other than the each one and the broadcast transmission element and in parallel, an update value for information transfer capability to be used for update of the each one's own information transfer capability by an operation using the degree of priority given or determined for the each one and the indication value for adjusting total information transfer capability; and controlling, by each one of the one or more information transfer elements, the each one's own information transfer capability based on the update value for information transfer capability to control the total information transfer capability in the group.

In one example of the above information transfer capability control method, the broadcast transmission element can be a communication server, an information transfer element can be a client machine, and information transfer capability can be communication speed.

In addition, the present invention provides an electric power control system comprising:

a broadcast transmission element; and one or more electric power consumption elements having functions of directly consuming electric power or opening/closing supply of electric power, for which degrees of priorities are given or determined individually, wherein the electric power control system is configured so that:

the broadcast transmission element measures the difference between (i) the current value as a multivariate amount (quantity) indicating the total consumed electric power consumed in a group including the one or more electric power consumption elements or an electric power supply state and (ii) a reference value as a multivariate amount indicating the total consumed electric power or the electric power supply state, determines an indication value for adjusting electric power (indication of electric power to be adjusted, or indication of electric power to be corrected) which is generally a multivariate amount as a function of the difference, or receives the indication value for adjusting electric power from another element, creates information which is generally a multivariate amount to be shared in the group representing the indication value for adjusting electric power, and transmits the information as broadcast into the group;

the one or more electric power consumption elements receive the information transmitted as broadcast, and each one of the one or more electric power consumption elements calculates, independently from electric power consumption elements of the one or more electric power consumption elements other than the each one and the broadcast transmission element and in parallel, an update value for electric power (electric power to be adjusted) to be used for update of the each one's own consumed electric power or the opening/closing electric power by an operation using the degree of priority given or determined for the each one and the indication value for adjusting electric power, and controls the each one's own consumed electric power or the opening/closing electric power based on the update value for electric power to control the total consumed electric power or electric power supply state in the group.

The present invention also provides an electric power control system comprising:

a broadcast transmission element for which a degree of priority in upper class is given or determined; and one or more electric power consumption elements having functions of directly consuming electric power or opening/closing supply of electric power, for which degrees of priorities in lower class are given or determined individually, the broadcast transmission element is configured to receive information in upper class which is transmitted by broadcast from an upper class broadcast transmission element and which represents an indication value for adjusting electric power generally as an multivariate amount operated from a total consumed electric power or an electric power supply state in upper class, measure lower class total consumed electric power consumed in a group in lower class including one or more electric power consumption elements or an electric power supply state, determine an indication value for adjusting electric power in lower class generally as a multivariate amount, to be used for update of the lower class total consumed electric power or the electric power supply state, by an operation using the lower class total consumed electric power or the electric power supply state, a degree of priority in upper class, and the indication value for adjusting electric power in upper class, or receives the indication value for adjusting electric power in lower class from another element, create information in lower class to be shared in the group in lower class representing the indication value for adjusting electric power in lower class, and transmit the information in lower class as broadcast into the group in lower class;

the one or more electric power consumption elements are configured to:

receive the information in lower class transmitted as broadcast from the broadcast transmission element, and each one of the one or more electric power consumption elements are configured to:

calculate, independently from electric power consumption elements of the one or more electric power consumption elements other than the each one and the broadcast transmission element and in parallel, an update value for electric power to be used for update of the each one's own consumed electric power or electric power supply state by an operation using the degree of priority in lower class given or determined for the each one and the indication value for adjusting electric power in lower class, and control the each one's own consumed electric power or opening/closing electric power based on the update value for electric power to control the total consumed electric power or the electric power supply state in the group in lower class.

In addition, the present invention provides an electric power control method comprising:

measuring, by a broadcast transmission element, the difference between (i) the current value as a multivariate amount indicating the total consumed electric power consumed in a group including one or more electric power consumption elements, having functions of directly consuming electric power or opening/closing supply of electric power, for which degrees of priorities are given or determined individually, or an electric power supply state and (ii) a reference value as a multivariate amount indicating the total consumed electric power or the electric power supply state;

determining, by the broadcast transmission element, an indication value for adjusting electric power which is generally a multivariate amount as a function of the difference, or receiving the indication value for adjusting electric power from another element;

creating, by the broadcast transmission element, information which is generally a multivariate amount to be shared in the group representing the indication value for adjusting electric power;

transmitting, by the broadcast transmission element, the information as broadcast into the group;

receiving, by the one or more electric power consumption elements, the information transmitted as broadcast;

calculating, by each one of the one or more electric power consumption elements, independently from electric power consumption elements of the one or more electric power consumption elements other than the each one and the broadcast transmission element and in parallel, an update value for electric power to be used for update of the each one's own consumed electric power or the opening/closing electric power by an operation using the degree of priority given or determined for the each one and the indication value for adjusting electric power, and controlling, by each one of the one or more electric power consumption elements, the each one's own consumed electric power or the opening/closing electric power based on the update value for electric power to control the total consumed electric power or electric power supply state in the group.

The present invention also provides an electric power control method comprising:

receiving, by a broadcast transmission element for which a degree of priority in upper class is given or determined, information in upper class which is transmitted by broadcast from an upper class broadcast transmission element and which represents an indication value for adjusting electric power generally as an multivariate amount operated from a total consumed electric power or an electric power supply state in upper class;

measuring, by the broadcast transmission element, lower class total consumed electric power consumed in a group in lower class including one or more electric power consumption elements, having functions of directly consuming electric power or opening/closing supply of electric power, for which degrees of priorities in lower class are given or determined individually, or an electric power supply state;

determining, by the broadcast transmission element, an indication value for adjusting electric power in lower class generally as a multivariate amount, to be used for update of the lower class total consumed electric power or the electric power supply state, by an operation using the lower class total consumed electric power or the electric power supply state, a degree of priority in upper class, and the indication value for adjusting electric power in upper class, or receives the indication value for adjusting electric power in lower class from another element;

creating, by the broadcast transmission element, information in lower class to be shared in the group in lower class representing the indication value for adjusting electric power in lower class;

transmitting, by the broadcast transmission element, the information in lower class as broadcast into the group in lower class;

receiving, by one or more electric power consumption elements, the information in lower class transmitted as broadcast from the broadcast transmission element;

calculating, by each one of the one or more electric power consumption elements, independently from electric power consumption elements of the one or more electric power consumption elements other than the each one and the broadcast transmission element and in parallel, an update value for electric power to be used for update of the each one's own consumed electric power or electric power supply state by an operation using the degree of priority in lower class given or determined for the each one and the indication value for adjusting electric power in lower class; and controlling, by the each one of the one or more electric power consumption elements, the each one's own consumed electric power or opening/closing electric power based on the update value for electric power to control the total consumed electric power or the electric power supply state in the group in lower class.

Effect of the Invention

The biggest barrier making it difficult to solve the problem in that one-to-one bidirectional communication is required between the server and individual clients, occurred in the method suggested in the Japanese Patent Application No. 2014-12924, exists in the point that it is impossible to solve the optimization problem under restrictions of resources unless collecting even information (degrees of priorities, current consumed electric power, etc.) regarding clients other than the client as the target of the control in the group. In one example, a dedicated server element is provided in the domain for collecting information from clients in the group to solve the optimization problem. However, in that case, the communications traffic increases by occurring of one-by-one bidirectional communication between the server and a lot of clients and this prevents high-speed electric power control process.

Contrary to this, in the electric power control system and method of the present invention, the degree of priority of each electric power consumption element just has to be comprehended in the each element, and it does not have to be collected by a server etc. In addition, the server etc. does not have to collect the current value of consumed electric power of each element in the electric power control system or method of the present invention. Information which has to be shared in a domain is only indication value for adjusting total consumed electric power, and this can be shared by determining it by the broadcast transmission element by measuring by itself or by being provided with the measurement value and transmitting it by broadcast into the group. It is made possible to significantly reduce communications traffic by identifying and separating information to be shared in the domain from information which has to only be comprehended by individual electric power consumption elements and by making the electric power control as a dispersive process. By applying the similar principle to a domain to which information transfer elements belong, it is made possible to control information transfer capability in the domain without requiring much amount of communication.

BRIEF EXPLANATION OF DRAWINGS

FIG. 10 Figure explaining trapezoid-method in configuring degrees of priorities.

FIG. 11 Figure explaining trapezoid-method in configuring degrees of priorities.

FIG. 13 Figure explaining an example of setting of sub-constraint.

EMBODIMENTS FOR WORKING THE INVENTION

Figure 1A:
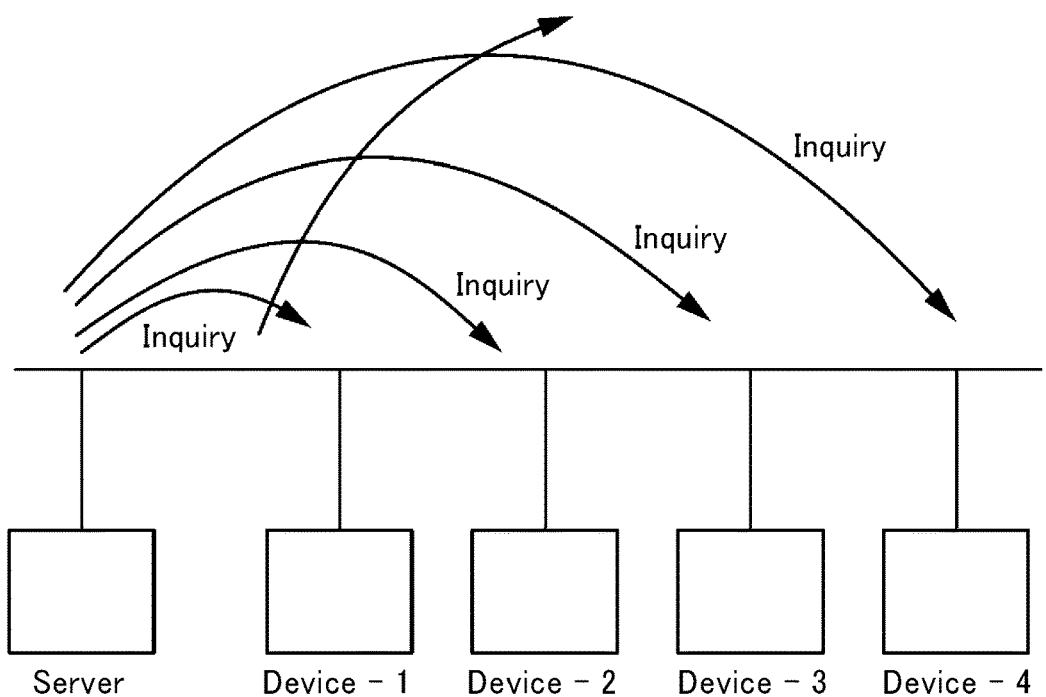
FIG. 1a Figure showing process flow of electric power control suggested in the Japanese Patent Application No. 2014-12924 (Inquiry of consumed electric powers, degrees of priorities, etc. from a server).
Figure 1B:
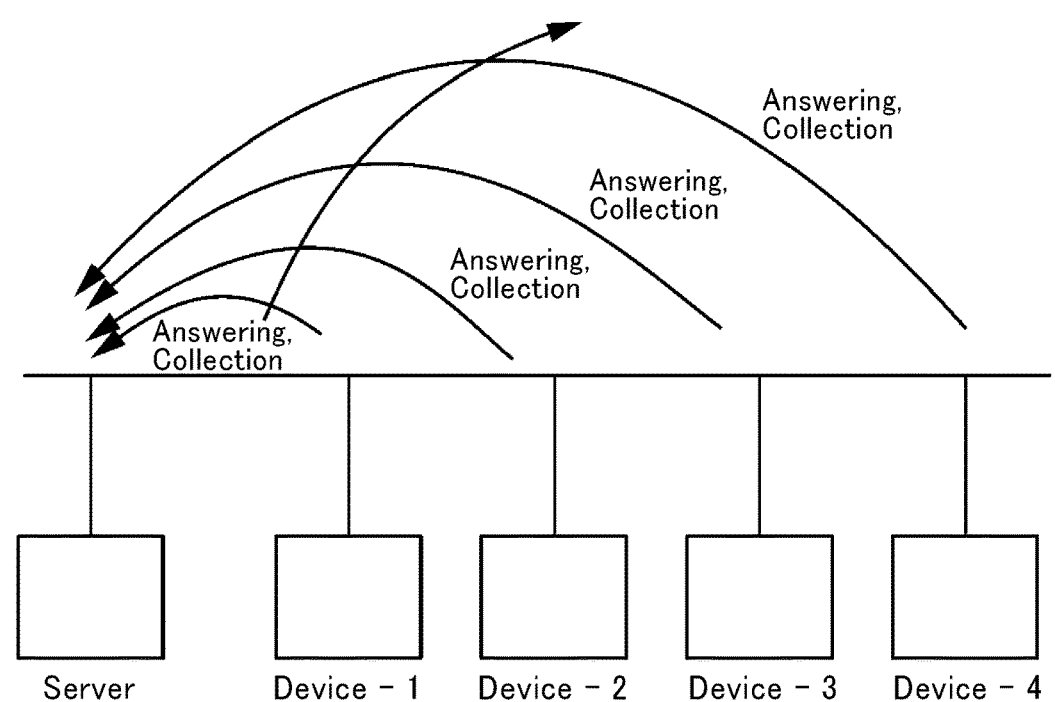
FIG. 1b Figure showing process flow of electric power control suggested in the Japanese Patent Application No. 2014-12924 (Answering of individual devices to the inquiry from the server).
Figure 1C:
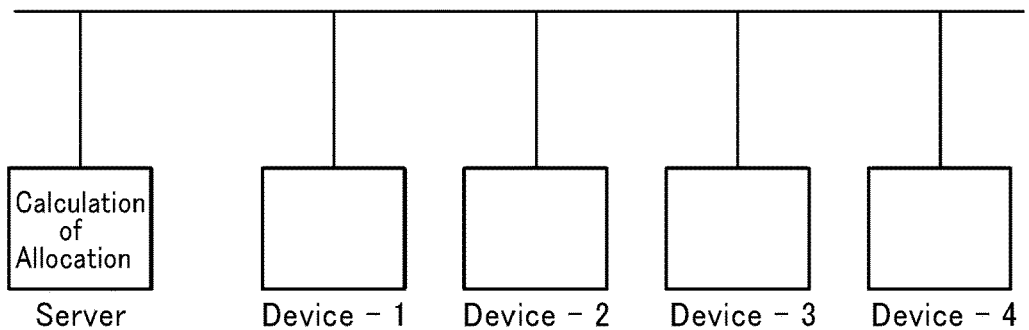
FIG. 1c Figure showing process flow of electric power control suggested in the Japanese Patent Application No. 2014-12924 (Calculation of consumed electric power allocation using the collected information by the server).
Figure 1D:
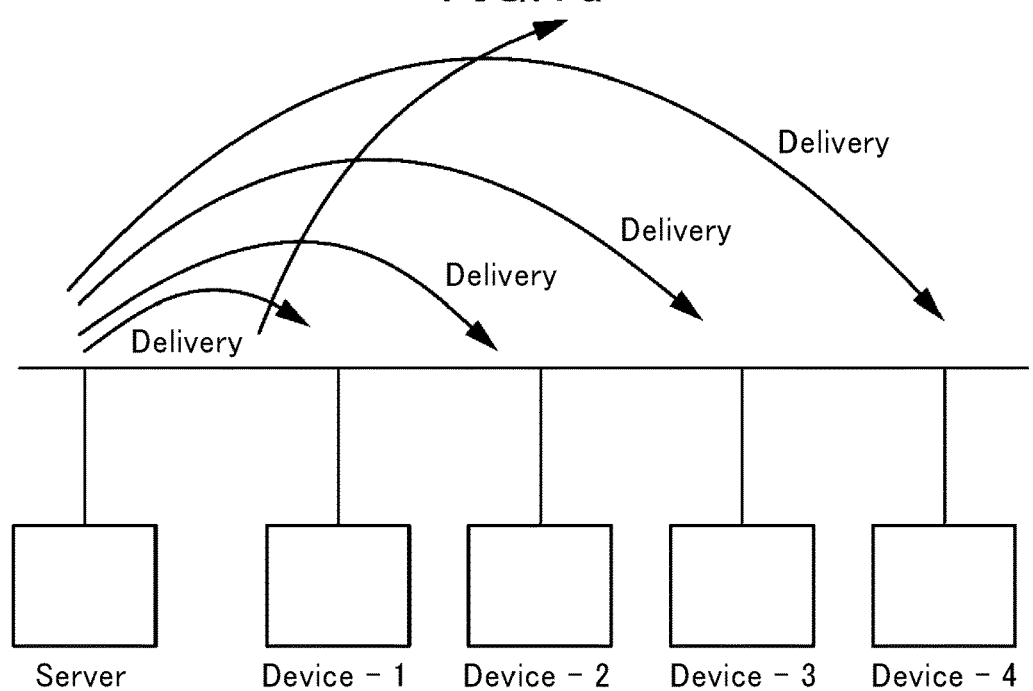
FIG. 1d Figure showing process flow of electric power control suggested in the Japanese Patent Application No. 2014-12924 (Delivering of allocated electric power to the individual devices from the server).
Figure 1E:
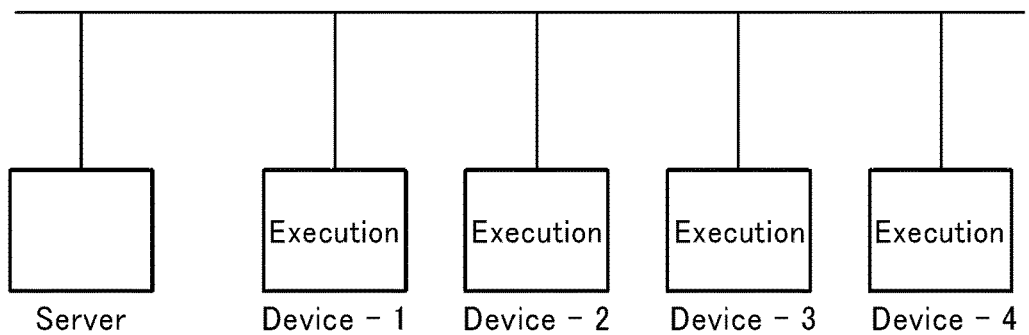
FIG. 1e Figure showing process flow of electric power control suggested in the Japanese Patent Application No. 2014-12924 (Performing of consumed electric power control according to the allocated electric power in the individual devices).

In the following, embodiments for working the electric power control system, method, and information transfer capability control system, method of the present invention will be explained using the attached figures. The concept, detailed procedures of the electric power control system, method of the present invention will be explained firstly, then an example of devices configuration for configuring the system for performing the method will be explained, and additionally, control of information transfer capability as one example of resource control which can be performed in the similar principle to the electric power control by the present invention will be explained. In the above, a definition was made with regard to "broadcast" or "broadcast transmission", and that definition will be referred to also in the following. However, respective systems and methods of the present invention are not limited to particular detailed configurations shown in respective embodiments but they can be changed within the scope of the present invention.

Embodiment 1

Concept of Electric Power Control Method

When the Q is a diagonal matrix in the formula (3) above, the electric power control of an embodiment of the present invention is performed based on the following formula (14) which is a simplified representation of the solution of the optimization problem shown in the formula (5) above:

[Numeral 14]

$$f_{i,k+1} = f_{i,k} - \Delta P \times S_t \times \left(\frac{1}{Q_{ii}}\right) \quad (14)$$

In this regard, $f_{i,k}$ is the consumed electric power of the i-th electric power consumption element (i is an integer equal to or greater than 1) included in the group when the electric power control in the system has been repeated k (k is an integer equal to or greater than zero) times (at the present time). The above formula (14) is a formula for determining the consumed electric power $f_{i,k+1}$ of the i-th electric power consumption element to be realized in the (k+1)-th electric power control. In the above formula (14), $Q_{ii}$ is the degree of priority given to the i-th electric power consumption element. In addition, $\Delta$ (delta) P is a difference obtained by subtracting the reference value of the total consumed electric power (Summation of rated consumed electric powers (specified electric power consumption) of the respective electric power consumption elements included in the group etc. In one example, it is memorized in the broadcast transmission element in advance.) from the current value (The broadcast transmission element measures the same, or the broadcast transmission element receives the same from another element which measures.) of the total consumed electric power consumed in the group, and it also can be regarded as the total consumed electric power value (If the difference is negative, it corresponds to the electric power to be recovered.) to be reduced in the group. $S_t$ corresponds to a sensitivity to the electric power to be reduced $\Delta$ (delta) P (If it is negative, the absolute value of $\Delta$ (delta) P corresponds to the electric power to be recovered. The same holds true also in the following.) when controlling the total consumed electric power in the group, and it is named system sensitivity here. Although it is preferable to define the system sensitivity as "1" theoretically, but it is not prevented to configure other sensitivities intentionally. In this regard, a value obtained by multiplying the difference between the current value and the reference value by the system sensitivity is referred to as the indication value for adjusting total consumed electric power in the following examples, and information showing this is transmitted by broadcast by the broadcast transmission element to the respective electric power consumption elements, but the indication value for adjusting total consumed electric power can be the difference value itself, and it is not necessary to use the system sensitivity in that case (The case is equal to the case where the system sensitivity is fixed to "1").

Figure 2A:
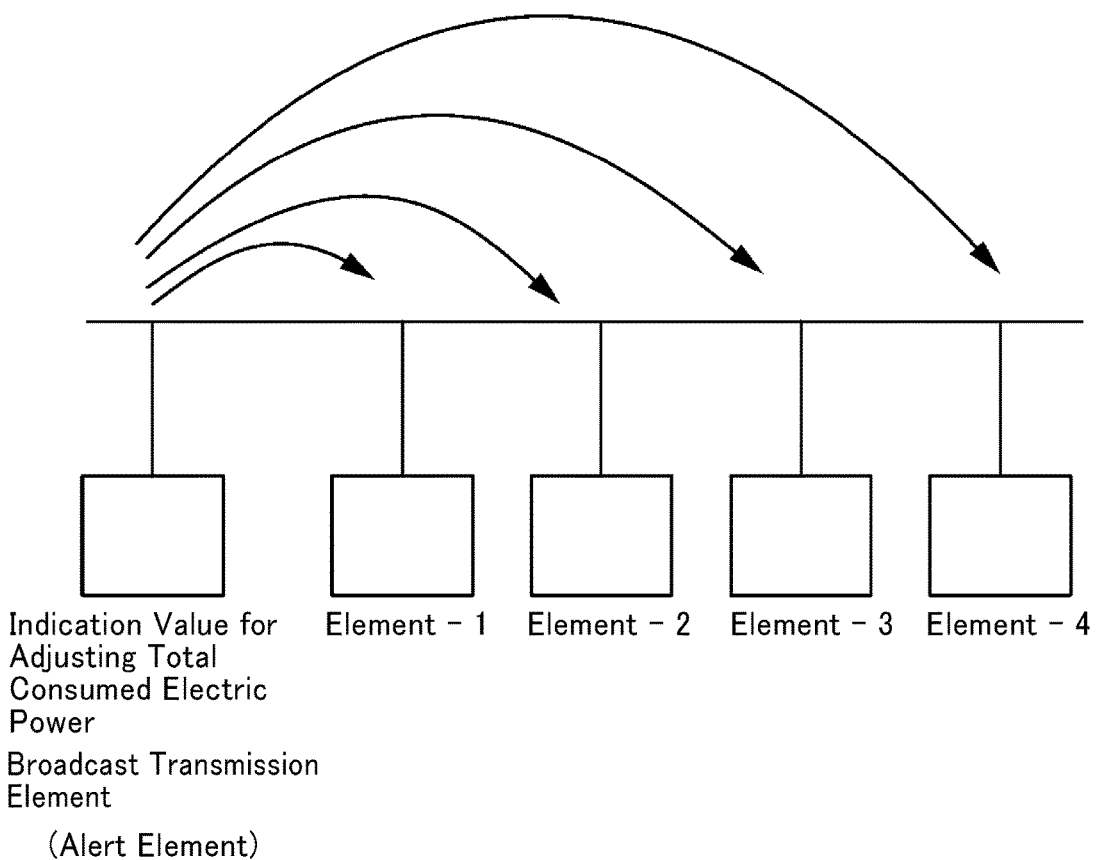
FIG. 2a Figure showing broadcast transmission of information showing an indication value for adjusting total consumed electric power from the broadcast transmission element to electric power consumption elements performed in one embodiment of the electric power control according to the present invention.
Figure 2B:
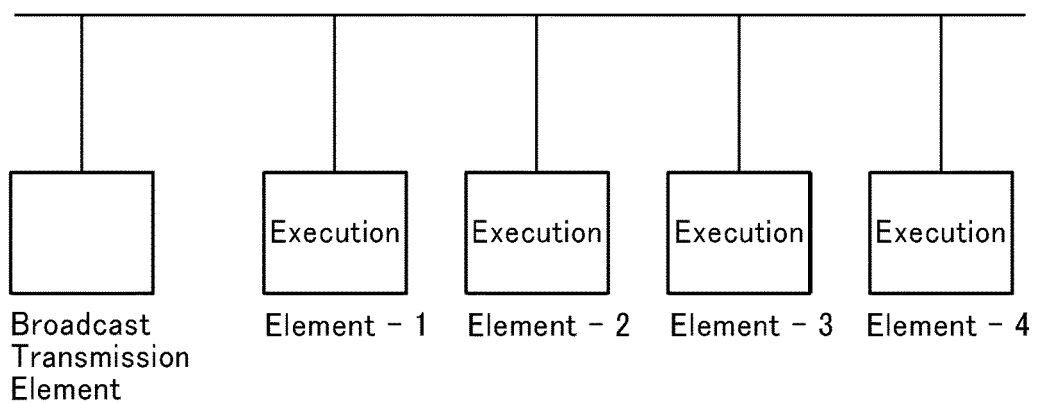
FIG. 2b Figure showing performing of update of consumed electric powers in individual electric power consumption elements performed independently and in parallel in one embodiment of the electric power control according to the present invention.

Only information showing the electric power Δ (delta) P to be reduced or recovered in the whole the target group of electric power control and the indication value for adjusting total consumed electric power obtained by multiplying it by the system sensitivity St should be shared in the domain. This information is transmitted by broadcast to the respective electric power consumption elements in the group by the broadcast transmission element (alert element, FIG. 2a). The respective electric power consumption elements in the target group which received the information divide this indication value for adjusting total consumed electric power by the degree of priority defined for each electric power consumption element (multiply by the reciprocal number) to calculate the electric power to be reduced or electric power to be recovered (update value for consumed electric power) in each electric power consumption element and change their own consumed electric powers based on the update value for consumed electric power, as shown in the above formula (14) (FIG. 2b). In this regard, if the Q has non-diagonal elements, or more generally, the operation can be performed not only by a simple division with only its own degree of priority but operations defined by functions including degrees of priorities which it can know according to some rules can be performed.

In the formula (5), the explanation was made assuming that the constraint condition is the total linear sum of the electric powers consumed by the respective electric power consumption elements, but in general, it can be non-linear information defined by operations from the electric powers consumed by the respective electric power consumption elements. For example, it can be the absolute difference between the maximum consumed electric power and the minimum electric power in all the elements. The information transmitted by broadcast is the total consumed electric power or the electric power supply state. In addition, it is not necessary to limit the information transmitted by broadcast to a scalar amount and there is a case that it is a multivariate amount depending on the contents of constraint conditions.

As described above, contrary to the method suggested in Japanese Patent Application No. 2014-12924, the electric power control according to the present invention can make collection of information and calculation of allocated amount of electric power shared between the broadcast transmission element and the electric power consumption elements. The broadcast transmission element is not required to collect information from the respective electric power consumption elements, and processes in the respective electric power consumption elements can be performed simultaneously in all the electric power consumption elements, thus the processing time is significantly shortened. In this regard, in the above formula (14), it is not necessary to define $f_{i,k}$ as the consumed electric power of the i-th electric power consumption element at the present time as described above, but it is possible to define $f_{i,k}$ as zero (Operations of the respective electric power consumption elements in the group are once set OFF.) similarly to the case of determining the optimum solutions in the above formulas (6)-(8) and determine $f_{i,k+1}$ to determine the optimum solutions in the respective electric power consumption elements. There is a theoretical relationship between the system sensitivity and the degrees of priorities of respective electric power consumption elements, and there is a condition on which convergence can be obtained by this iteration. The width confirming the stability is very wide, and it will be explained below that the present scheme is effective for practice.

In this regard, the above system sensitivity $S_t$ is memorized typically as a predetermined value such as "1" in the broadcast transmission element, but this value can also be dynamically changed. For example, if the system sensitivity $S_t$ in a case in which Δ (delta) P in the above formula (14) is positive (a case in which the current value of the total consumed electric power in the group is greater than the reference value) is greater than the system sensitivity $S_t$ in a case in which Δ (delta) P is negative (a case in which the current value of the total consumed electric power in the group is smaller than the reference value), it is possible to make the responsiveness of reduction of the total consumed electric power in controlling the total consumed electric power in the group higher than the responsiveness of increasing of the total consumed electric power (Such the judgment process is performed in judge/performance system circuit etc. in the broadcast transmission element.). Further, the stability can be improved. If the degrees of priorities $Q_{ii}$ which the respective electric power consumption elements have as their own degrees of priorities are transmitted to the broadcast transmission element in arbitrary intervals (In order to avoid increase of communications traffic, the typical interval is sufficiently longer than the interval in which controls in the respective electric power consumption elements according to the above formula (14) are performed.) (Bidirectional communication between the broadcast transmission element and the electric power consumption elements. In this regard, it is also possible that only some of the electric power consumption elements included in the group transmit their own degrees of priorities.), the broadcast transmission element can define the ideal system sensitivity (referred to as the effective system sensitivity) in the following formula (15) as the system sensitivity $S_t$.

[Numeral 15]

$$1 \Big/ \Big( \frac{1}{Q_{11}} + \frac{1}{Q_{22}} + \frac{1}{Q_{33}} + \ldots + \frac{1}{Q_{nn}} \Big) \tag{15}$$

If the information showing the indication value for adjusting total consumed electric power obtained by multiplying the system sensitivity $S_t$ in the above formula (15) by Δ (delta) P is transmitted by broadcast and the respective electric power consumption elements controlled their own consumed electric powers using them according to the above formula (14), the consumed electric powers after the update are equal to the optimum solutions given by the above formula (5). If the degrees of priorities are dynamically changed and the respective electric power consumption elements do not frequently transmit the degrees of priorities to the broadcast transmission element, it is possible that the broadcast transmission element has old information of degrees of priorities, but if the dynamical change of the degrees of priorities are not so big, it is considered that the system sensitivity $S_t$ which the broadcast transmission element determines according to the above formula (15) is still close to the effective system sensitivity.

As described above, the information to be shared (indication value for adjusting total consumed electric power) is information for which it is not necessary to perform particular identifying of elements in the address, so information sharing can be performed by broadcast communication (broadcast communication). In addition, the consumed electric powers and the degrees of priorities at the present time required only on the respective electric power consumption elements are not required to be transmitted outward from the respective electric power consumption elements, and the respective electric power consumption elements just have to receive information representing indication value for adjusting total consumed electric power.

It is sufficient if one transmission by broadcast is performed, regardless of the number of the elements belonging to the domain, by the broadcast transmission element which measures the difference between the current value and the reference value of the total consumed electric power consumed in the group and which determines the indication value for adjusting total consumed electric power as the function of the difference, and the communications traffic can be significantly reduced by performing the electric power control according to this embodiment. Even if the number of the elements belonging to the domain is one or several tens thousands, the electric power control system of this dispersive process-type does not require enlarging of control cycle time, and it is possible to keep high-speed responses. The fundamental concept of the measure enabling the high-speed operations by the electric power control of the present embodiment is utilization of the point that it is much rapid, than realizing the ideal control solution by one cycle with obtaining information of all the electric power consumption elements via server-clients communications, to increase the number of iteration times while sharing the processes between the broadcast transmission element and the electric power consumption elements and changing the both-way communication to one-way communication. This is one of the biggest features of the present embodiment.

In this regard, there are conventional technologies for performing control of devices in the domain by performing a command in chorus by a broadcast transmission as its narrow sense in order to cause electric power allocation in a predetermined proportional as in broadcast etc., but proof that the total sum of the allocated amounts to the member elements meets the constraint is required to provide a solution meeting the resource constraint, and the methods according to the command in chorus in a so-called feed-forward manner cannot confirm the achievement. In addition, in cases in which degrees of priorities dynamically change depending on the number of users and illuminance environment, particularly like illumination devices in an office, it is impossible to get the optimization solution with degrees of priorities only by selection of the predetermined operation modes of the scheme of command in chorus. The feature of this scheme provides function of determining the optimum solution at high speed by, not by mere control by command in chorus, but by sharing the control processes between both of the broadcast transmission element and the electric power consumption elements.

(Preferred Method for Practice and Expected Effect)

The above methods are discussed based on the optimization calculation method, but it is possible to define the series of operations more generally. The $\Delta$ (delta) P in the above formula (14) is the difference obtained by subtracting the reference value of the total consumed electric power from the current value of the total consumed electric power consumed in the group at the time when the power control in the system has been iterated k times, so it is represented as $\Delta$ (delta) $P_k$. $\Delta$ (delta) $P_k$ is the relative total consumed electric power at the present time from the reference value of the total consumed electric power in the group. In other word, it is the total consumed electric power to be reduced or recovered.

It is assumed that, in the k-th electric power control process, the respective electric power consumption elements defined as i-th electric power consumption elements (i=1 to N. In this regard, the total number of electric power consumption elements included in the group is defined as N.) performed control of reducing (in case in which $\alpha_i$ (alpha) ($\Delta$ (delta) $P_k$) is positive. If it is negative, recovering by the absolute value of $\alpha_i$ (alpha) ($\Delta$ (delta) $P_k$) is performed. The same holds true also in the following description.) consumed electric powers by $\alpha_i$ (alpha) ($\Delta$ (delta) $P_k$) as a function of $\Delta$ (delta) $P_k$, the total consumed electric power $\Delta$ (delta) $P_{k+1}$ to be reduced or recovered from the total consumed electric power in the group in the k+1-th electric power control process is expressed by the following formula (16):

[Numeral 16]

$$\Delta P_{k+1} = \Delta P_k - \sum_{i=1}^{N} \alpha_i(\Delta P_k) \qquad (16)$$

In this regard, it is assumed that $\alpha_i$ (alpha) (0)=0 when $\Delta$ (delta) $P_k$=0, and $\alpha_i$ (alpha) ($\Delta$ (delta) $P_k$) can be expanded as in the following formula (17).

[Numeral 17]

$$\alpha_i(\Delta P_k) \cong \left(\frac{\partial \alpha_i(\Delta P)}{\partial \Delta P}\right)_{\Delta P = \Delta P_k} \Delta P_k \equiv \beta_i \Delta P_k \qquad (17)$$

That is, the total consumed electric power to be reduced or recovered from the total consumed electric power in the group transits by the process according to the following formula (18):

[Numeral 18]

$$\Delta P_{k+1} = \Delta P_k - \sum_{i=1}^{N} \beta_i \Delta P_k = \left(1 - \sum_{i=1}^{N} \beta_i\right) \Delta P_k \qquad (18)$$

Therefore, if an function $\alpha_i$ (alpha) can be set so that the condition according to the following formula (19) comes into effect, it is made possible to perform control with meeting the constraint of the total consumed electric power in the group since $\Delta$ (delta) P converges by iterating the electric power control:

[Numeral 19]

$$0 < \sum_{i=1}^{N} \beta_i < 2 \qquad (19)$$

This condition is very loose, and it is made possible to introduce wide range of functional expressions with regard to $\alpha_i$ (alpha).

When a certain condition is given with regard to $\alpha_i$ (alpha) or $\beta_i$ (beta), they come to describe setting of the degrees of priorities. This will be shown below.

This most-simplified dispersive process can be described by the following formula (20):

[Numeral 20]

$$f_{i,k+1} = f_{i,k} - \beta_i \Delta P_k \qquad (20)$$

The above formula (20) can further be transformed to the following formula (21):

[Numeral 21]

$$f_{i,k+1} = f_{i,k} - \left(\frac{\beta_i}{\sum_{i=1}^{N}\beta_i}\right)\left(\sum_{i=1}^{N}\beta_i\right)\Delta P_k = f_{i,k} - \left(\frac{\beta_i}{\sum_{i=1}^{N}\beta_i}\right)\Delta P'_k \qquad (21)$$

Comparing the above formula (5) obtained by solving the optimization problem to the above formula (21), it can be confirmed that the solution of allocation of electric power in the optimization problem corresponds to setting as $\beta_i$ (beta)= 1/(divided by) $Q_{ii}$, and the most-simplified control method presented in the above formula (20) is, as shown in the above formula (21), equivalent to the solution of the problem in which an amount obtained by multiplying the total consumed electric power $\Delta$ (delta) $P_k$ to be reduced or recovered by the total summed value of $\beta_i$ (beta) is re-allocated. In particular, if the total sum satisfies the following formula (22):

[Numeral 22]

$$\sum_{i=1}^{N} \beta_i = 1 \qquad (22)$$

it can be understood that a solution of the optimization satisfying the above-described central condition of the stability condition and re-allocating the consumed electric power to be reduced or to be recovered as the radical problem will be provided.

This denotes the radical significance of setting the total sum of $\beta_i$ (beta) to "1". It is also desirable to set the system sensitivity obtained by transforming from the optimization problem and by processes on the respective elements to the same "1" theoretically, but it can be understood that daringly setting the system sensitivity to a value other than "1" corresponds to an operation method for daringly providing another problem for re-allocating the value of $S_t$ times of the consumed electric power to be reduced or recovered so that it can be easily known from the simplified processes in the respective elements again. Therefore, there can be a case in which the system sensitivity is operated as a value which is not always "1".

Significant speed-up can be obtained by this extremely-simplified information-sharing in the domain and dispersing processes in the system into processes on the respective electric power consumption elements in the domain. Even if the number of electric power consumption elements placed in the domain is one, or several tens of thousands, this dispersive process-type electric power control system, method can keep high-speed reactions without requiring enlargement of control cycle-time. The biggest reason why control converges without requiring aggregation of degrees of priorities of all the electric power consumption elements is the point in which the total sum of the inverse numbers of these degrees of priorities are used with normalizing as shown, for example in the above formula (22), and this point is the most important concept enabling this control. Actually, how degrees of priorities are allocated is significantly related to practical realization. Setting to $\beta_i$ (beta)=1/(divided by) $Q_{ii}$ with the inverse number is not essential, but it is essential to normalize the whole system sensitivity to something. Detailed setting methods will be described afterward.

Detailed Procedures of Electric Power Control Method

Figure 3:
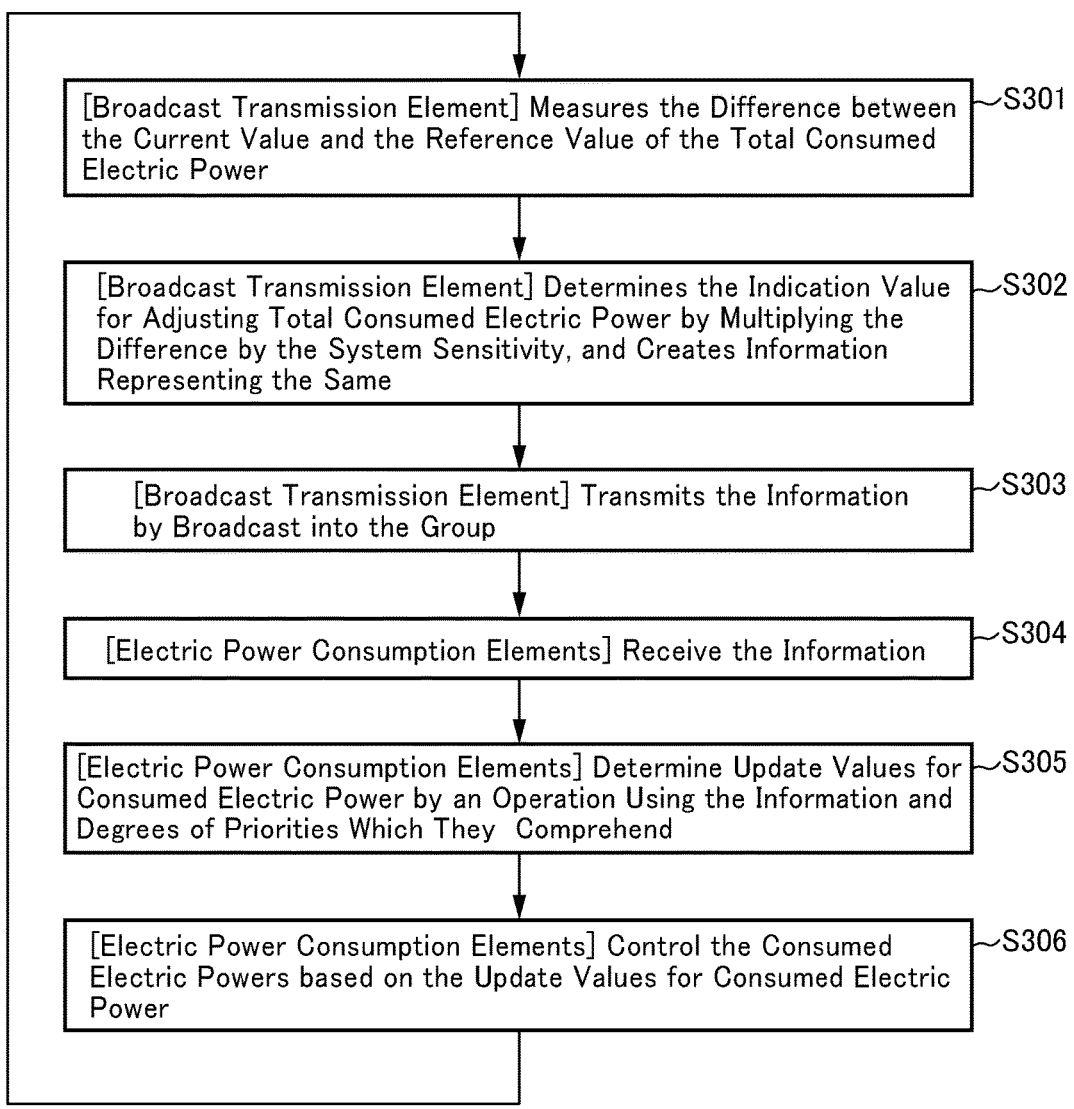
FIG. 3 Flowchart of the process performed in one embodiment of the electric power control according to the present invention.

In the following, detailed procedures of the electric power control method of the present embodiment will be explained using a flowchart of FIG. 3.

Figure 7:
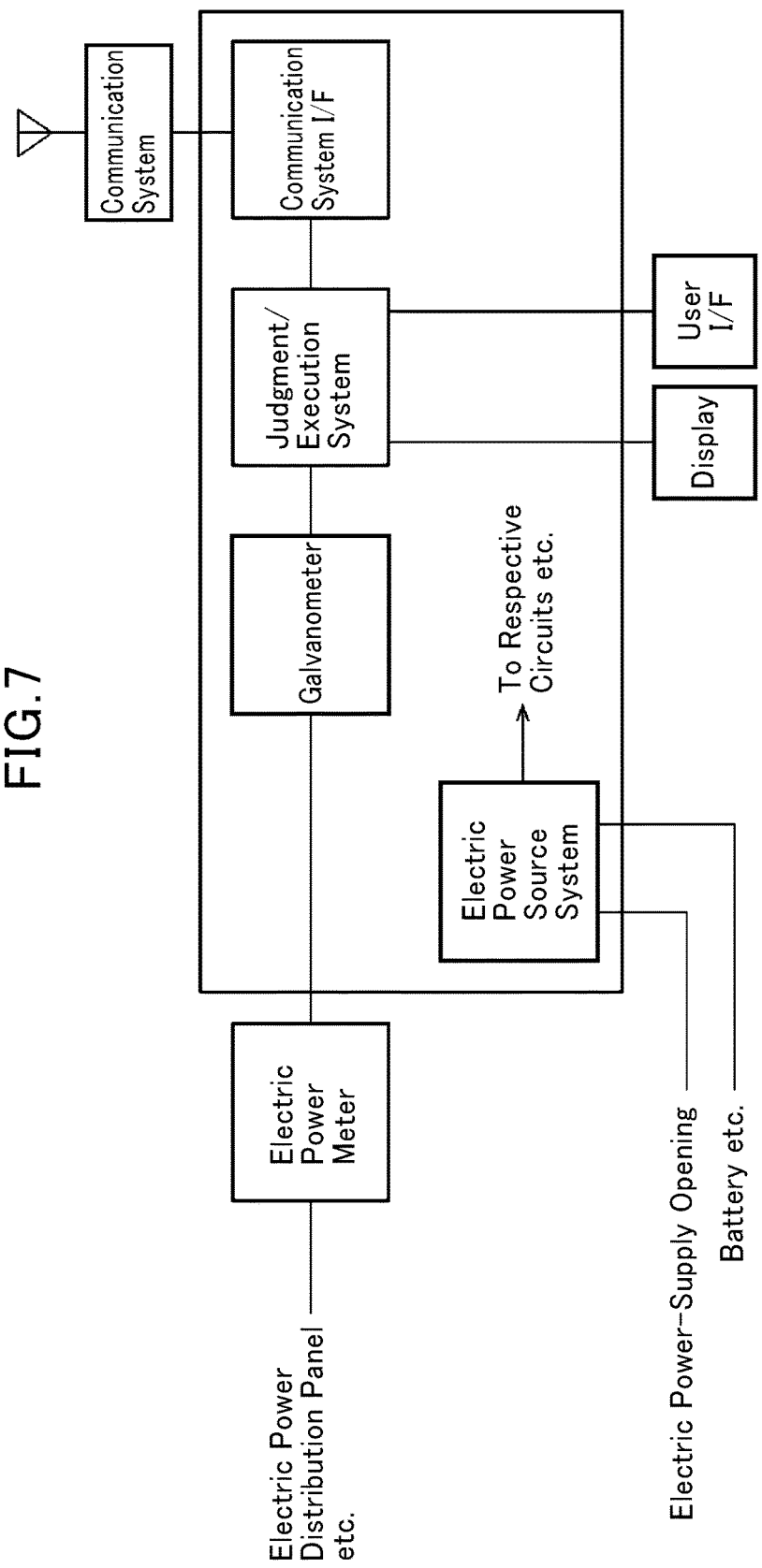
FIG. 7 Configuration Figure of the broadcast transmission element usable in electric power control according to the present invention.

Firstly, a broadcast transmission element (smart meter etc.) with configurations like FIG. 7 described afterward measures the difference between the current value and the reference value of the total consumed electric power in the group (step S301). In one example, the current value of the total consumed electric power consumed in the group is measured by, for example, connecting the broadcast transmission element having an electric power meter to an electric power distribution panel, and the difference is measured by subtracting the summation of the rated consumed electric powers (In one example, it is memorized in a memory etc. included in the broadcast transmission element in advance.) in the electric power consumption elements included in the group from the current value.

Next, the broadcast transmission element determines the indication value for adjusting total consumed electric power by multiplying the above difference by the system sensitivity and generates information representing the same (step S302). As described above, the system sensitivity is typically "1", but values other than that can be used. In this regard, the system sensitivity is also memorized in a memory etc. of the broadcast transmission element typically in advance. It has been described above that the difference above itself can be indication value for adjusting total consumed electric power (It is not necessary to use the system sensitivity.), and it has been also described above that, for example if the above difference is positive, the responsiveness of reduction of the total consumed electric power will be higher than the responsiveness of increasing by making the system sensitivity higher than in the case of negative difference.

Next, the broadcast transmission element transmits the above information by broadcast into the group (step S303). Specifying of destinations is not necessary in the broadcast transmission, and the information is broadcasted, for example, from the broadcast transmission element in a particular radio frequency.

Next, the respective electric power consumption elements included in the group receive the above information (step S304). An electric power consumption element is an element configured by attaching the modules shown in, for example, FIG. 8, FIG. 9, to an electric device (If the electric device has functions to be given by that module, that module is not required.), and the electric power consumption elements receive the information transmitted, for example, in the above radio frequency using an antenna or various communication circuits.

Figure 8:
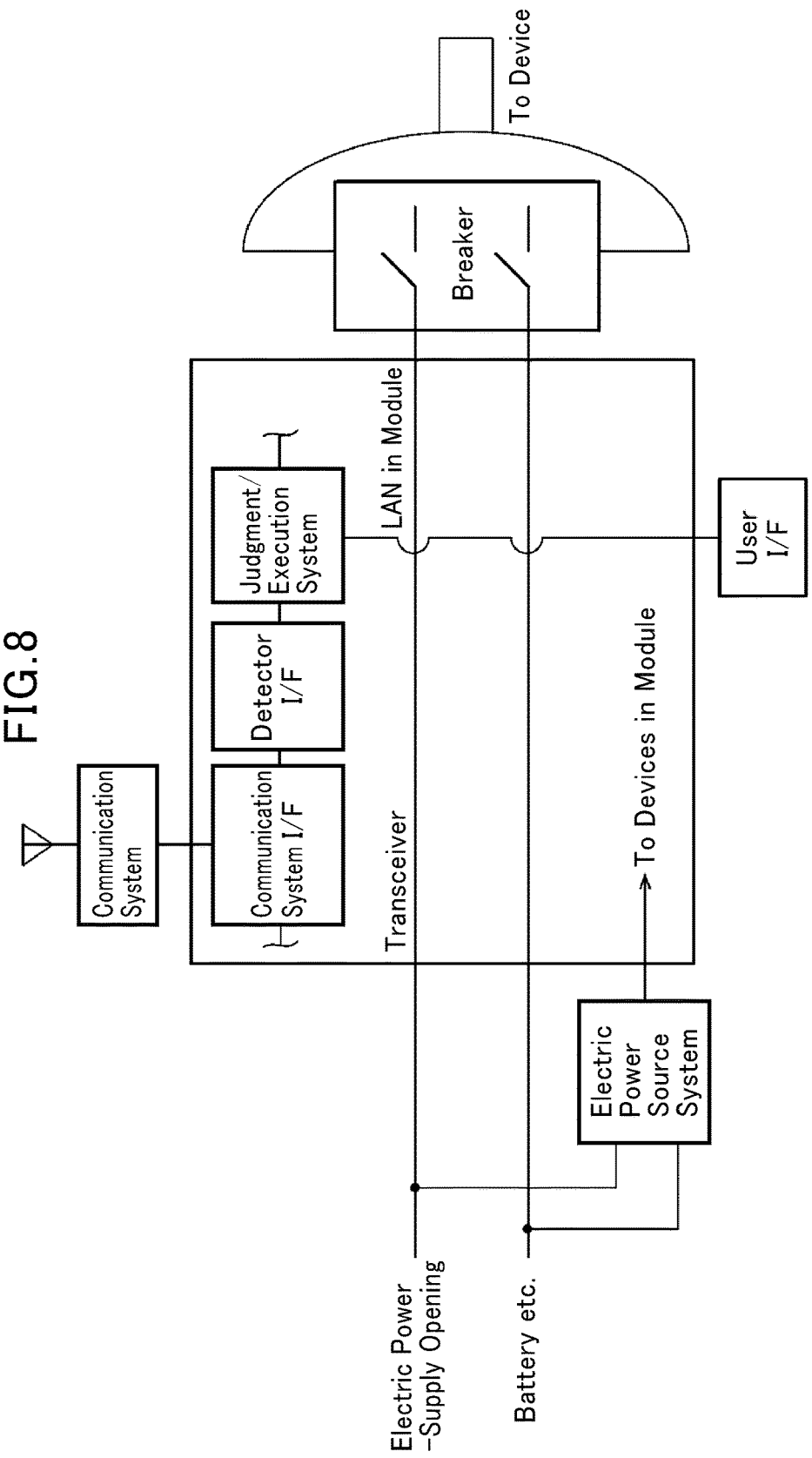
FIG. 8 Configuration Figure of an inverter-equipped-type module for making electric devices operate as electric power consumption elements in the electric power control according to the present invention.
Figure 9:
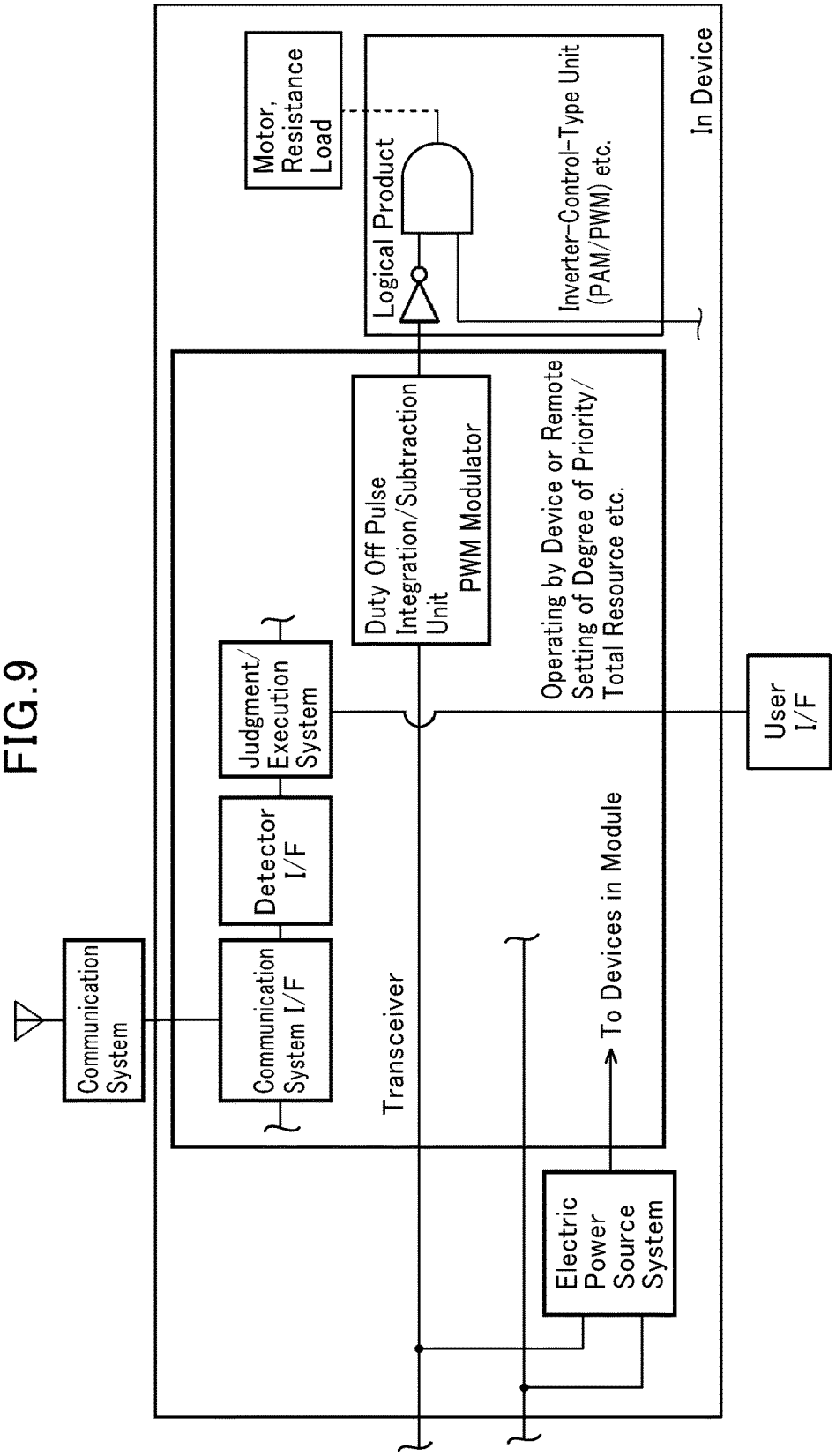
FIG. 9 Configuration Figure of inverter-control-type module for making electric devices operate as electric power consumption elements in the electric power control according to the present invention.

Next, each of the electric power consumption elements determines an update value for consumed electric power from the received information and the degree of priority of the each one own (step S305). In one example, as shown in the above formula (14), the update value for consumed electric power is determined by multiplying the indication value for adjusting total consumed electric power ($\Delta$ (delta) P×(multiplied by) $S_t$) obtained from the received information by the inverse number of the each one's own degree of priority (1/(divided by) $Q_{ii}$). Each of the electric power consumption elements just has to memorize the each one's own degree of priority $Q_{ii}$, and this degree of priority can be dynamically changed in arbitrary timings (It is possible to provide a user interface in the electric power consumption element as shown in FIG. 8, FIG. 9 and to configure the degree of priority by the user via this, or it can be changed by operations of arbitrary judgment/execution circuits).

Next, each of the electric power consumption elements control the each one's own consumed electric power based on the update value for consumed electric power determined by the each one itself (step 306). In one example, each of the electric power consumption elements reduces (Alternatively, if the Δ (delta) Pin the above formula (14) is negative, recovery is performed.) the each one's own consumed electric powers by the value of the update value for consumed electric power according to control of a breaker (circuit breaker) or an inverter (FIG. 8, FIG. 9) which the each one comprises. However, if an upper limit value and a lower limit value are prescribed to the electric power to be consumed at the respective electric power consumption elements, the control is performed within a scope of consumed electric power which does not exceed the upper limit value and is not below the lower limit value. For example, in a case in which the electric power consumption element becomes inoperative if the consumed electric power is reduced by the update value for consumed electric power, the consumed electric power will be reduced to, at most, the minimum level in which the electric power consumption element is operable. Alternatively, in a case in which the rated consumed electric power of the electric power consumption element will be exceeded if the consumed electric power of the electric power consumption element is recovered by the value of the update value for consumed electric power, it is possible to limit the recovery to the rated consumed electric power. The total consumed electric power in the group is controlled by the above.

Robustness and Plug and Play Nature

It is assumed that, in a situation where the system sensitivity $S_t$ is adjusted to "1", setting of the degree of priority is independently performed in a certain particular electric power consumption element. That is, in a case in which the degree of priority in the k-th electric power consumption element is adjusted to become greater from $Q_{kk, 0}$ to $Q_{kk, 1}$, it can be understood, as seen from the transformation of the below formula (23):

[Numeral 23]

$$S_t = \sum_{i=1}^{N} \beta_i = 1 + \left( \frac{1}{Q_{kk,1}} - \frac{1}{Q_{kk,0}} \right) = 1 - \varepsilon$$

In this regard, if $$Q_{kk,1} > Q_{kk,0},$$

the below formula is satisfied:

$$\varepsilon > 0 \quad (23)$$

that the problem solved as a result corresponds to a problem in which the electric power to be reduced or to be recovered is slightly modified from Δ (delta) P to (1−ε (epsilon)) Δ (delta) P. In addition, if the ε (epsilon) is small, the effect on the above-mentioned stability condition is trivial. This enables solving of a resource constraint problem in a "similar" manner, and this shows superior characteristics enabling to absorb changing of the degrees of priorities which can be momentarily defined in the respective electric power consumption elements belonging to the domain.

Next, it is assumed that, in a domain originally constructed including N electric power consumption elements, another electric power consumption element having capability of electric power control newly and suddenly appeared. In electric power control of the present embodiment, only transmission by transmission as broadcast from the broadcast transmission element (alert element) is required as communication in the domain, and joining of a new electric power consumption element or leaving does not affect the communication traffic.

When the degree of priority which the new electric power consumption element has is defined as $Q_{N+1, N+1}$, the system sensitivity is identical to the case in which it becomes $S_t$ in the following formula (24):

[Numeral 24]

$$S_t = \sum_{i=1}^{N+1} \beta_i = 1 + \frac{1}{Q_{N+1,N+1}} = 1 + \varepsilon' \quad (24)$$

where $$\varepsilon' > 0$$

and this is equivalent to the problem in which, in the original optimization problem with resource constraint, the consumed electric power to be reduced or to be recovered is multiplied by (1+ε' (epsilon)), and this shows that a "similar" solution can be provided. In addition, if ε' (epsilon) is small, the effect on the above-described stability is also trivial, and it can be understood that the electric power control has plug-and-play nature.

Soft Breaker

Figure 4:
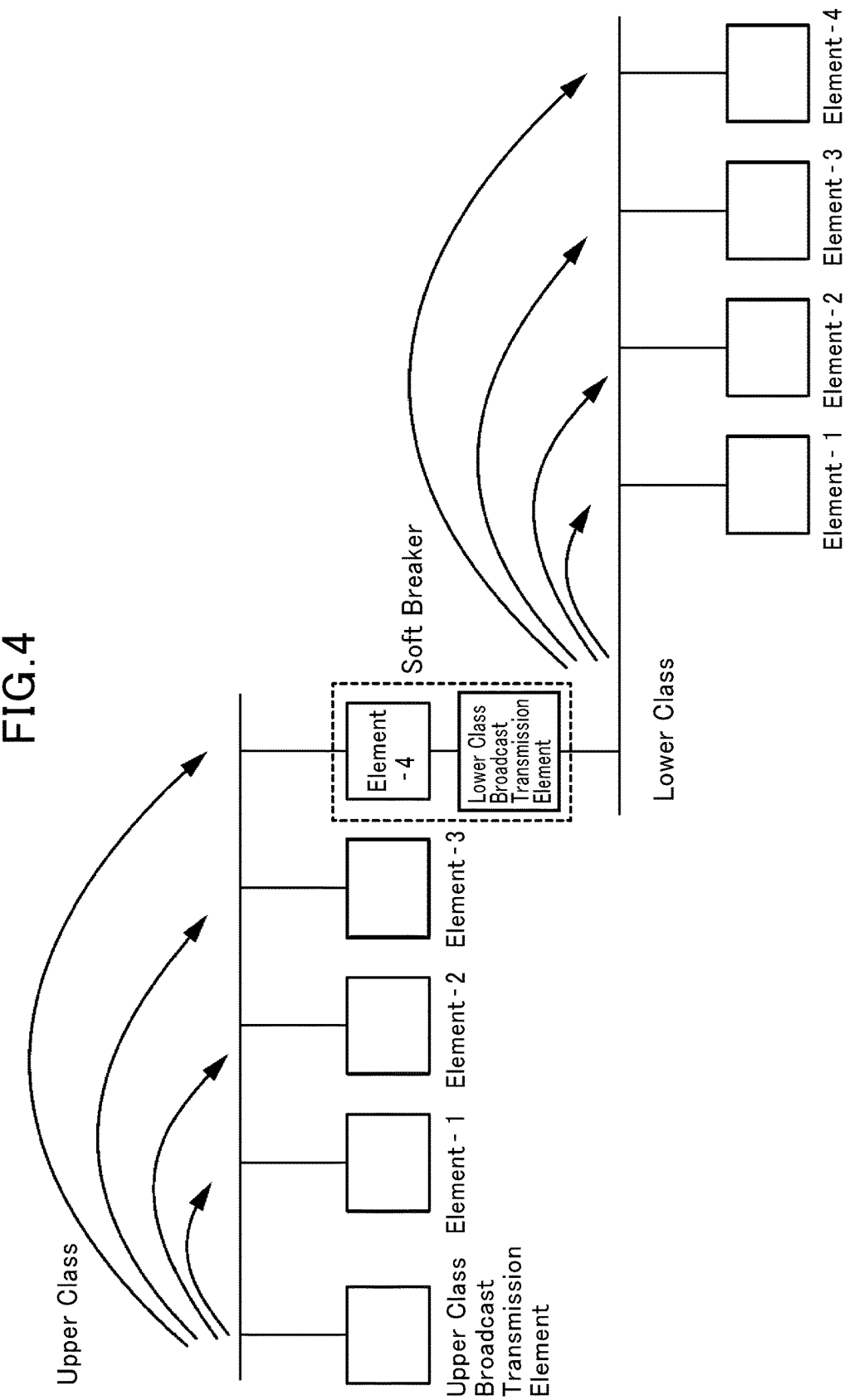
FIG. 4 Configuration Figure of an electric power control system configured as one embodiment of the present invention for performing electric power control in lower class based on information transmitted by broadcast from an upper class.

The system of the present embodiment can be configured so that it makes a part of a class structure (layered structure). In one example, the broadcast transmission element is between the upper and lower two classes, and it becomes a member element (It acts like an electric power consumption element, and determines the total consumed electric power to be reduced or to be recovered in the group in lower class using information received from a broadcast transmission element in upper class.) in the upper class and it becomes a broadcast transmission element (alert element) in the lower class (FIG. 4).

Such the broadcast transmission element (broadcast transmission element in lower class) is called "soft breaker", here. The detailed construction of the soft breaker is similar to the broadcast transmission element (FIG. 7) which has already been explained, but the soft breaker is different in that it has, not only a function of broadcast transmission into groups in lower class, but also a function of receiving information in upper class transmitted from an upper class broadcast transmission element by broadcast.

In the upper class, the soft breaker receives information in upper class showing an indication value for adjusting total consumed electric power in upper class (product of the system sensitivity in upper class in the upper class domain (upper layer domain) and the total consumed electric power to be reduced or to be recovered) from the upper class broadcast transmission element (alert element) in the upper class domain transmitted as broadcast, and calculates the total consumed electric power to be reduced or to be recovered to be allocated in groups in lower class under the jurisdiction of the soft breaker itself based on the degree of priority in upper class of itself, for example by dividing the indication value for adjusting total consumed electric power in upper class by the degree of priority in upper class. It is not necessary for the soft breaker to perform transmission to the upper class broadcast transmission element (In this regard, this does not prevent transmitting of information for "visualization" as a client etc. of a smart grid upon request. For example, it is possible to transmit the degree of priority in upper class in constant timings etc.). Then, as described above, indication value for adjusting total consumed electric power in lower class is determined by, for example, arbitrarily multiplying this value by the system sensitivity (system sensitivity in lower class) and information showing this (information in lower class) is transmitted by broadcast into the group in lower class. It is not necessary to receive anything from electric power consumption elements belonging to the lower domain (As described above, it is possible to receive degrees of priorities in lower class at any timings.). Electric power consumption elements in the group in lower class which have received information in lower class determine, as described above, update values for consumed electric powers to be reduced or to be recovered from their own consumed electric powers using the degrees of priorities (degrees of priorities in lower class) given for themselves or determined by themselves, and control their own consumed electric powers based on them.

Degrees of priorities in upper class and degrees of priorities in lower class can be dynamically changed in arbitrary timings (As shown in FIG. 8, FIG. 9, a user interface can be provided in the electric power consumption element, and a user can set the degree of priority via the interface. Alternatively, the degree of priority can be changed by operations of an arbitrary judgment/execution circuit). It has been also described that, with regard to the system sensitivity in lower class, the responsiveness in the group in lower class to reduction of the total consumed electric power become higher than the responsiveness to increasing when the system sensitivity in lower class is made higher when the indication value for adjusting total consumed electric power in lower class is a value indicating reduction of the total consumed electric power in the group in lower class than when the indication value for adjusting total consumed electric power in lower class is a value indicating increasing. In addition, it is preferable to set an upper limit value and a lower limit value for the total consumed electric power to be consumed in the group in lower class and to determine the total consumed electric power in lower class within the scope in which the soft breaker determines that the total consumed electric power does not exceed the upper limit value and is not below the lower limit value. In a particular example, in a possible operation, the soft breaker measures the total consumed electric power in the group in lower class, and in a case in which the total consumed electric power after update will be below the lower limit value for enabling operation or will exceed the rated total consumed electric power as the upper limit value (the total sum of the rated consumed electric powers in the electric power consumption elements in the group in lower class) if the total consumed electric power is reduced or recovered by the amount of the indication value for adjusting total consumed electric power in lower class, the indication value for adjusting total consumed electric power in lower class is changed so that the total consumed electric power after update will converge between the upper limit value and the lower limit value.

Simulated Embodiment by Numerical Calculation

The Numerical Example-1 shown in Table 1 to Table 8 below shows the results by numerical calculations (electric powers are denoted by the unit W) in a case in which there are different 6 electric power consumption elements, different degrees of priorities are defined for them, and the electric power control according to the present embodiment was performed 7 times by simulation from a situation where all elements are in an on state initially and the excessive electric power is 200 W.

TABLE 1

| (Initial State) | Element A | Element B | Element C | Element D | Element E | Element F |
| --- | --- | --- | --- | --- | --- | --- |
| Rated Consumed Electric Power | 1500 | 500 | 1000 | 400 | 400 | 400 |
| Consumed Electric Power | 1500 | 500 | 1000 | 400 | 400 | 400 |
| Degree of Priority | 4 | 4 | 12 | 4 | 4 | 4 |
| Electric Power Limitation | 4000 | | System Limitation | 1.2 | | |
| Reduced Electric Power | 200 | | | | | |
| Effective System Sensitivity | 0.75 | | | | | |
| System Sensitivity | 1 | | | | | |

TABLE 2

| (1 time Performed) | Element A | Element B | Element C | Element D | Element E | Element F |
| --- | --- | --- | --- | --- | --- | --- |
| Allocated Consumed Electric Power | 1450 | 450 | 983 | 350 | 350 | 350 |
| Degree of Priority | 4 | 4 | 12 | 4 | 4 | 4 |
| Reduced Electric Power | −67 | | | | | |
| Effective System Sensitivity | 0.75 | | | | | |
| System Sensitivity | 1 | | | | | |

TABLE 3

| (2 times Performed) | Element A | Element B | Element C | Element D | Element E | Element F |
|---|---|---|---|---|---|---|
| Allocated Consumed Electric Power | 1467 | 467 | 989 | 367 | 367 | 367 |
| Degree of Priority | 4 | 4 | 12 | 4 | 4 | 4 |
| Reduced Electric Power | 22 | | | | | |
| Effective System Sensitivity | 0.75 | | | | | |
| System Sensitivity | 1 | | | | | |

TABLE 4

| (3 times Performed) | Element A | Element B | Element C | Element D | Element E | Element F |
|---|---|---|---|---|---|---|
| Allocated Consumed Electric Power | 1461 | 461 | 987 | 361 | 361 | 361 |
| Degree of Priority | 4 | 4 | 12 | 4 | 4 | 4 |
| Reduced Electric Power | −7 | | | | | |
| Effective System Sensitivity | 0.75 | | | | | |
| System Sensitivity | 1 | | | | | |

TABLE 5

| (4 times Performed) | Element A | Element B | Element C | Element D | Element E | Element F |
|---|---|---|---|---|---|---|
| Allocated Consumed Electric Power | 1463 | 463 | 988 | 363 | 363 | 363 |
| Degree of Priority | 4 | 4 | 12 | 4 | 4 | 4 |
| Reduced Electric Power | 2 | | | | | |
| Effective System Sensitivity | 0.75 | | | | | |
| System Sensitivity | 1 | | | | | |

TABLE 6

| (5 times Performed) | Element A | Element B | Element C | Element D | Element E | Element F |
|---|---|---|---|---|---|---|
| Allocated Consumed Electric Power | 1462 | 462 | 987 | 362 | 362 | 362 |
| Degree of Priority | 4 | 4 | 12 | 4 | 4 | 4 |
| Reduced Electric Power | −1 | | | | | |
| Effective System Sensitivity | 0.75 | | | | | |
| System Sensitivity | 1 | | | | | |

TABLE 7

| (6 times Performed) | Element A | Element B | Element C | Element D | Element E | Element F |
|---|---|---|---|---|---|---|
| Allocated Consumed Electric Power | 1463 | 463 | 988 | 363 | 363 | 363 |
| Degree of Priority | 4 | 4 | 12 | 4 | 4 | 4 |
| Reduced Electric Power | 0 | | | | | |
| Effective System Sensitivity | 0.75 | | | | | |
| System Sensitivity | 1 | | | | | |

TABLE 8

| (7 times Performed) | Element A | Element B | Element C | Element D | Element E | Element F |
|---|---|---|---|---|---|---|
| Allocated Consumed Electric Power | 1462 | 462 | 987 | 362 | 362 | 362 |
| Degree of Priority | 4 | 4 | 12 | 4 | 4 | 4 |
| Reduced Electric Power | 0 | | | | | |
| Effective System Sensitivity | 0.75 | | | | | |
| System Sensitivity | 1 | | | | | |

In this example, the broadcast transmission element (alert element) assumes the system sensitivity as "1", but the electric power consumption elements in the system set the degrees of priorities respectively and independently, and the effective system sensitivity was 0.75. That is, the results of Table 1 to Table 8 correspond to an example in which the broadcast transmission element chanced to repeat a control request which is excessive by 4/(divided by) 3. In this example, reduction of the system sensitivity when recovering the total consumed electric power, namely non-linear control, has not been performed. From the results of Table 1 to Table 8, it can be understood that control has been promptly accomplished in the domain.

Next, the result of a simulated embodiment (Numerical Example-2) performed in a situation in which the degree of priority of the electric power consumption element E is made very big is shown in Tables 9-16 below.

TABLE 9

| (Initial State) | Element A | Element B | Element C | Element D | Element E | Element F |
|---|---|---|---|---|---|---|
| Rated Consumed Electric Power | 1500 | 500 | 1000 | 400 | 400 | 400 |
| Consumed Electric Power | 1500 | 500 | 1000 | 400 | 400 | 400 |
| Degree of Priority | 4 | 4 | 12 | 4 | 40000 | 4 |
| Electric Power Limitation | 4000 | | System Limitation | 1.2 | | |
| Reduced Electric Power | 200 | | | | | |
| Effective System Sensitivity | 0.92 | | | | | |
| System Sensitivity | 1 | | | | | |

TABLE 10

| (1 time Performed) | Element A | Element B | Element C | Element D | Element E | Element F |
|---|---|---|---|---|---|---|
| Allocated Consumed Electric Power | 1450 | 450 | 983 | 350 | 350 | 350 |

TABLE 10-continued

| (1 time Performed) | Element A | Element B | Element C | Element D | Element E | Element F |
|---|---|---|---|---|---|---|
| Degree of Priority | 4 | 4 | 12 | 4 | 40000 | 4 |
| Reduced Electric Power | −67 | | | | | |
| Effective System Sensitivity | 0.92 | | | | | |
| System Sensitivity | 1 | | | | | |

TABLE 11

| (2 times Performed) | Element A | Element B | Element C | Element D | Element E | Element F |
|---|---|---|---|---|---|---|
| Allocated Consumed Electric Power | 1467 | 467 | 989 | 367 | 350 | 367 |
| Degree of Priority | 4 | 4 | 12 | 4 | 40000 | 4 |
| Reduced Electric Power | 6 | | | | | |
| Effective System Sensitivity | 0.92 | | | | | |
| System Sensitivity | 1 | | | | | |

TABLE 12

| (3 times Performed) | Element A | Element B | Element C | Element D | Element E | Element F |
|---|---|---|---|---|---|---|
| Allocated Consumed Electric Power | 1465 | 465 | 988 | 365 | 400 | 365 |
| Degree of Priority | 4 | 4 | 12 | 4 | 40000 | 4 |
| Reduced Electric Power | 50 | | | | | |
| Effective System Sensitivity | 0.92 | | | | | |
| System Sensitivity | 1 | | | | | |

TABLE 13

| (4 times Performed) | Element A | Element B | Element C | Element D | Element E | Element F |
|---|---|---|---|---|---|---|
| Allocated Consumed Electric Power | 1453 | 453 | 984 | 353 | 400 | 353 |
| Degree of Priority | 4 | 4 | 12 | 4 | 40000 | 4 |
| Reduced Electric Power | −4 | | | | | |
| Effective System Sensitivity | 0.92 | | | | | |
| System Sensitivity | 1 | | | | | |

TABLE 14

| (5 times Performed) | Element A | Element B | Element C | Element D | Element E | Element F |
|---|---|---|---|---|---|---|
| Allocated Consumed Electric Power | 1454 | 454 | 985 | 354 | 350 | 354 |
| Degree of Priority | 4 | 4 | 12 | 4 | 40000 | 4 |
| Reduced Electric Power | −50 | | | | | |
| Effective System Sensitivity | 0.92 | | | | | |
| System Sensitivity | 1 | | | | | |

TABLE 15

| (6 times Performed) | Element A | Element B | Element C | Element D | Element E | Element F |
|---|---|---|---|---|---|---|
| Allocated Consumed Electric Power | 1466 | 466 | 989 | 366 | 400 | 366 |
| Degree of Priority | 4 | 4 | 12 | 4 | 40000 | 4 |
| Reduced Electric Power | 54 | | | | | |
| Effective System Sensitivity | 0.92 | | | | | |
| System Sensitivity | 1 | | | | | |

TABLE 16

| (7 times Performed) | Element A | Element B | Element C | Element D | Element E | Element F |
|---|---|---|---|---|---|---|
| Allocated Consumed Electric Power | 1453 | 453 | 984 | 353 | 400 | 353 |
| Degree of Priority | 4 | 4 | 12 | 4 | 40000 | 4 |
| Reduced Electric Power | −5 | | | | | |
| Effective System Sensitivity | 0.92 | | | | | |
| System Sensitivity | 1 | | | | | |

Also in the Numerical Example-2, the number of the electric power consumption elements in the domain is 6, but one electric power consumption element is provided with a very high degree of priority here to introduce an element which substantially ignores control instructions. In addition, that element is an example changing the consumed electric power independently. This control allows existence of a member individual which does not receive control instructions or which ignores control instructions in the domain, as described above. Nevertheless, it can be understood that the control satisfies the total electric power constraint almost smoothly.

Setting of System Sensitivity Related to Stability, Estimation of Soundness, and Improvement of Performance There is a difference between an ideal effective system sensitivity and a system sensitivity which a broadcast transmission element (alert element) has (Basically, the initial value is "1".), and there is a possibility that the stability of electric power control is impaired if there is a significant difference as described above. In a case in which the total sum of $ß_i$ (beta) is below "1", an asymptotic convergence will just be obtained without obstacles. However, it is not desirable to considerably exceed "1" since an oscillation-like aspect will occur. A simplest measure for preventing this is to introduce non-linearity into the system sensitivity. In particular, the system sensitivity as defined is used in a case in which the total consumed electric power should be adjusted to reduction, and, in contrast, in a case in which an excessive electric power is detected and recovered, the system sensitivity will be made lower and the above-described information to be shared will be transmitted from the broadcast transmission element. This can significantly improve the scope ensuring the above-described stability.

On the other hand, it is not preferable that the effective system sensitivity is, due to independent definitions at the respective electric power consumption elements, a value considerably different from the system sensitivity which the broadcast transmission element has. It is possible to deal with this also by a method of transmitting the degrees of priorities of the respective electric power consumption elements to the broadcast transmission element via a low-speed bidirectional communication in parallel with a high-speed electric power control by the broadcast transmission to collect information from the respective electric power consumption elements, but there is a method of estimating the effective system sensitivity to check the soundness while ensuring the dispersiveness based on the concept of dispersive process required by the original present invention. This leads to improvement of performance as a result.

The electric power control in the present embodiment generally requires a number of iterations than an ideal electric power control which converges by once. Assuming the total consumed electric power to be reduced or to be recovered (the difference between the current value and the reference value of the total consumed electric power) as $x_k$ (k corresponds to the number of times which electric power control has been executed.), the equivalent transition rate is introduced by the following formula (25) assuming that the $x_k$ changed to $y_k = x_{k+1}$ as a result of execution of the electric power control process of the present embodiment:

[Numeral 25]

$$y_k = x_{k+1} = C_{k,eq} x_k \qquad (25)$$

In this regard, the equivalent transition rate is not always constant, and it can dynamically change as shown in, for example, the following formula (26).

[Numeral 26]

$$C_{k+1,eq} = \alpha C_{k,eq} \qquad (26)$$

In addition, there is a case in which adjustment of the consumed electric power requires some time in an actual consumed electric power control in an electric power consumption element. They can be represented by the following formula (27) as a first order (dimensional) delay system:

[Numeral 27]

$$y_k = x_{k+1} = f x_k + (1-f) u_k = C_{k,eq} x_k \qquad (27)$$

In this regard, $u_k$ indicates the inputted indication value of indicated electric power to be reduced.

Therefore, transition of the total consumed electric power to be reduced or to be recovered in the domain delays from the above-mentioned transition process, or generates discrepancy of the substantial system sensitivity. Taking this into consideration, the ratio of the equivalent system sensitivity $S_t$ to the true value $S_t^*$ (the ideal effective system sensitivity) is represented by the following formula (28):

[Numeral 28]

$$x_{k+1} = \left(1 - \frac{S_t}{S_t^*}\right) x_k \qquad (28)$$

$$\frac{S_t}{S_t^*} = 1 - C_{k,eq}$$

It can be interpreted that the soundness of the electric power control system, method is high if the above equivalent transition rate $C_{k,eq}$ is close to zero, and that the soundness is low as the equivalent transition rate $C_{k,eq}$ departs from zero. As shown below, the broadcast transmission element can typically estimate the equivalent transition rate $C_{k,eq}$ using Kalman filter to evaluate the soundness (Other than the broadcast transmission element, a separate total consumed electric power monitoring element having similar functions can be provided in the system, for example, to perform the same. The same holds true below).

The effective system sensitivity can moderately change by margins of adjustable electric power, the number of users, illuminative intensity, temperature, and the like as external factors. The Kalman filter for estimating the system sensitivity ratio $S_t$/(divided by) $S_t^*$ is shown by the following formula (29).

[Numeral 29]

$$C_{k+1,eq} = C_{k,eq} + K(y_k - C_{k,eq} x_k) \qquad (29)$$

As a particular procedure of estimation, the broadcast transmission element (or total consumed electric power monitoring element etc.) monitors transition of the current value of the total consumed electric power adjusted by repeating control of the total consumed electric power in the group, and the broadcast transmission element (or total consumed electric power monitoring element etc.) estimates, based on the above formula (29), the equivalent transition rate $C_{k,eq}$ given by the above formula (27), assuming that the difference between the current value and the reference value of the total consumed electric power at the time when the control has been repeated k times is $x_k$ (k is an integer equal to or greater than 0), and the difference at the time when the control has been repeated k+1 times is $x_{k+1}$. In particular, by repeating the processes in which $x_k$ is determined firstly by measuring the difference between the current value and the reference value of the total consumed electric power, $C_{k,eq} x_k$ is calculated by multiplying by the current estimated value of the equivalent transition rate $C_{k,eq}$, $y_k$ is determined as the difference between the current value and the reference value of the total consumed electric power after the electric power control, the estimated error is calculated by subtracting $C_{k,eq} x_k$ from $y_k$, and update the estimated value to $C_{k+1,eq}$ by multiplying the estimate error by K and add this to the current estimated value $C_{k,eq}$, the convergent value of the equivalent transition rate can be obtained. If this convergent value is close to zero, it can be considered that the soundness of the electric power control method, system is high.

This Kalman filter converges under the condition according to the following formula (30):

[Numeral 30]

$$|1 - K x_k| < 1 \qquad (30)$$

In addition, in the converged (static) state, the following formula (31) is satisfied:

[Numeral 31]

$$\delta C_{k+1,eq} = (1 - K x_k) \delta C_{k,eq} (1 - \alpha) C_{k,eq}^* \qquad (31)$$

In this regard, $\delta$ (delta) $C_{k+1,eq}$ and $\delta$ (delta) $C_{k,eq}$ are estimated errors obtained by subtracting, from the true values of $C_{k+1,eq}$ and $C_{k,eq}$, the estimated values thereof, respectively, and $C_{k,eq}^*$ is the true value of the equivalent transition ratio. In addition, a model in which the true value of the equivalent transition ratio changes according to the following formula (32):

[Numeral 32]

$$C_{k+1,eq}^* = \alpha C_{k,eq}^* \qquad (32)$$

is assumed.

There is no estimated error other than that corresponding to change of the equivalent transition rate, and a residual error will arise by the effect of change of the equivalent transition rate due to external factors. This residual error becomes zero in a period in which the equivalent transition rate is constant. The soundness of the system can be checked by performing estimation in this period and inspecting the effective system sensitivity ratio (namely, equivalent transition ratio). In addition based on this, it is also possible to update the system sensitivity which the broadcast transmission element (alert element) holds while establishing upper and lower limitations. In the original transition rule, responses of the respective electric power consumption elements are sufficiently at high-speed, and it is ideal if the f is almost zero. In addition, as an ideal, the true system sensitivity (effective system sensitivity) and the system sensitivity which the alert element recognizes should be equal to each other, $C_{k,\,eq}*$ should be zero, and the estimated value of the equivalent transition rate $C_{k,\,eq}$ should also be zero. Equivalently, the transition of the total consumed electric power to be reduced or to be recovered $\Delta$ (delta) $P_k$ is not zero due to influences of transitive responses of respective elements, namely the influence off and influence of recognition error of the system sensitivity. The f should be taken as a sufficiently small value in order to extract the recognition error of the system sensitivity, and this shows that the time period for repeating this Kalman filter should be taken as sufficiently long than the transitive response time constants of the respective elements in the domain. That is, the period of repeating of Kalman filter should be sufficiently longer than the control period. Estimation of soundness of electric power control can be similarly performed also if the broadcast transmission element is a soft breaker.

Particular Examples of Setting of Degrees of Priorities

In the following, particular examples of setting of degrees of priorities related to electric power control of the present embodiment will be described.

Type 1 Method for Setting Degrees of Priorities: Basic Type Performed at the Respective Devices (Electric Power Consumption Elements) Side (Case Consisted of Devices of a Same Scale)

The basic degree of priority is defined as:

"degrees of priorities which the respective devices have"="total sum value of the number of elements as targets of control in the group".

Since they are fixed values, the system is very stable. By defining in this way, the basic system sensitivity in the whole domain can be set almost to "1". In this regard, this scheme is characteristic in that the stability of control is not affected even if the degrees of priorities are independently made higher at the side of individual devices. For example, an LED illumination domain can employ:

"degrees of priorities which the respective elements have"="total sum value of the number of elements as targets of control in the group"×(multiplied by) "reference illuminative intensity/(divided by) actual illuminative intensity"

As described above, when the upper limit and lower limit are set to the consumed electric power, an operation such as that in which the lower limit is set to the limit for keeping operation (operation limit) when the consumed electric power becomes below the limit for keeping operation by the reduction by the reduction amount of the consumed electric power obtained by calculation, and contrary, the upper limit is set to the rated consumed electric power when the consumed electric power exceeds the rated consumed electric power by a calculated negative amount of reduction, is performed.

Type 2 Method for Setting Degrees of Priorities: State-Dependent Type Performed at the Respective Devices (Electric Power Consumption Elements) Side (Case Consisted of Devices of a Same Scale)

The basic degree of priority is defined as:

"degrees of priorities which the respective devices have"="maximum electric power which can be reduced at device rating (specified maximum reducible electric power)/(divided by) electric power which can be reduced instantaneously (instantaneous reducible electric power)"×(multiplied by) "total sum value of the number of inverter-controlled devices in the domain"

Figure 5:
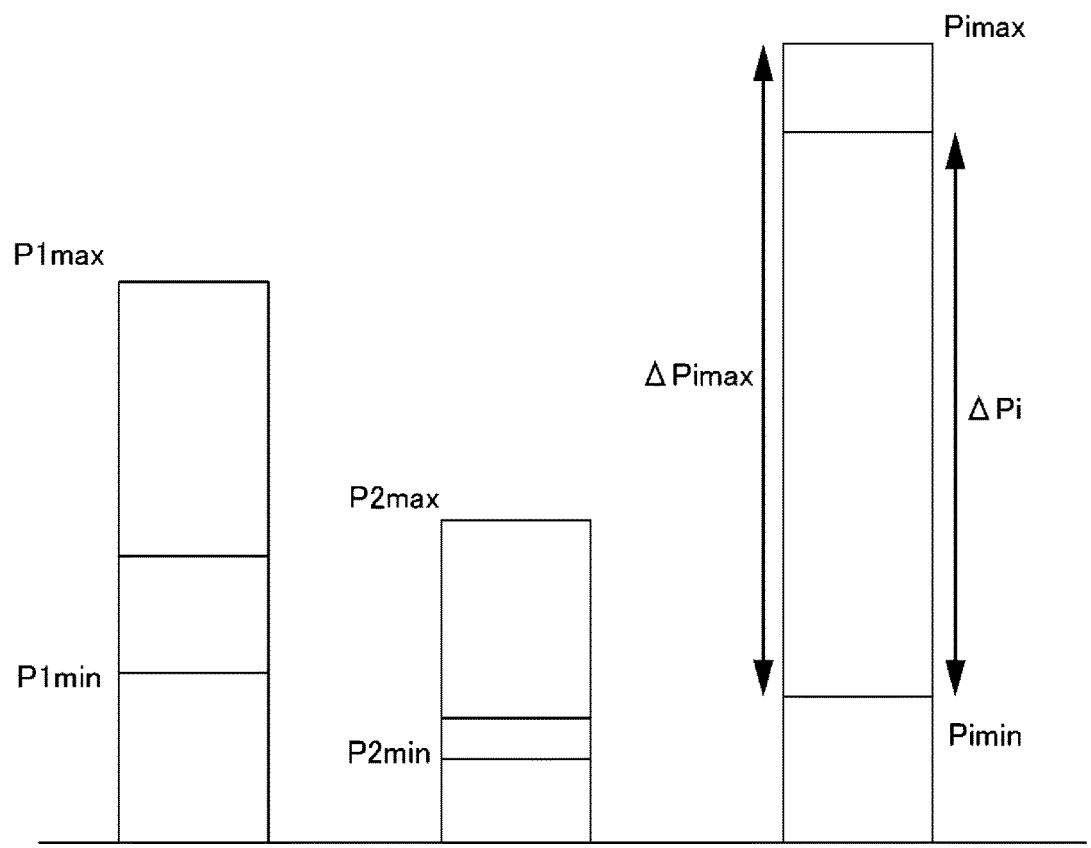
FIG. 5 Figure for explaining an example of methods for defining degrees of priorities in electric power control according to the present invention.
Figure 6:
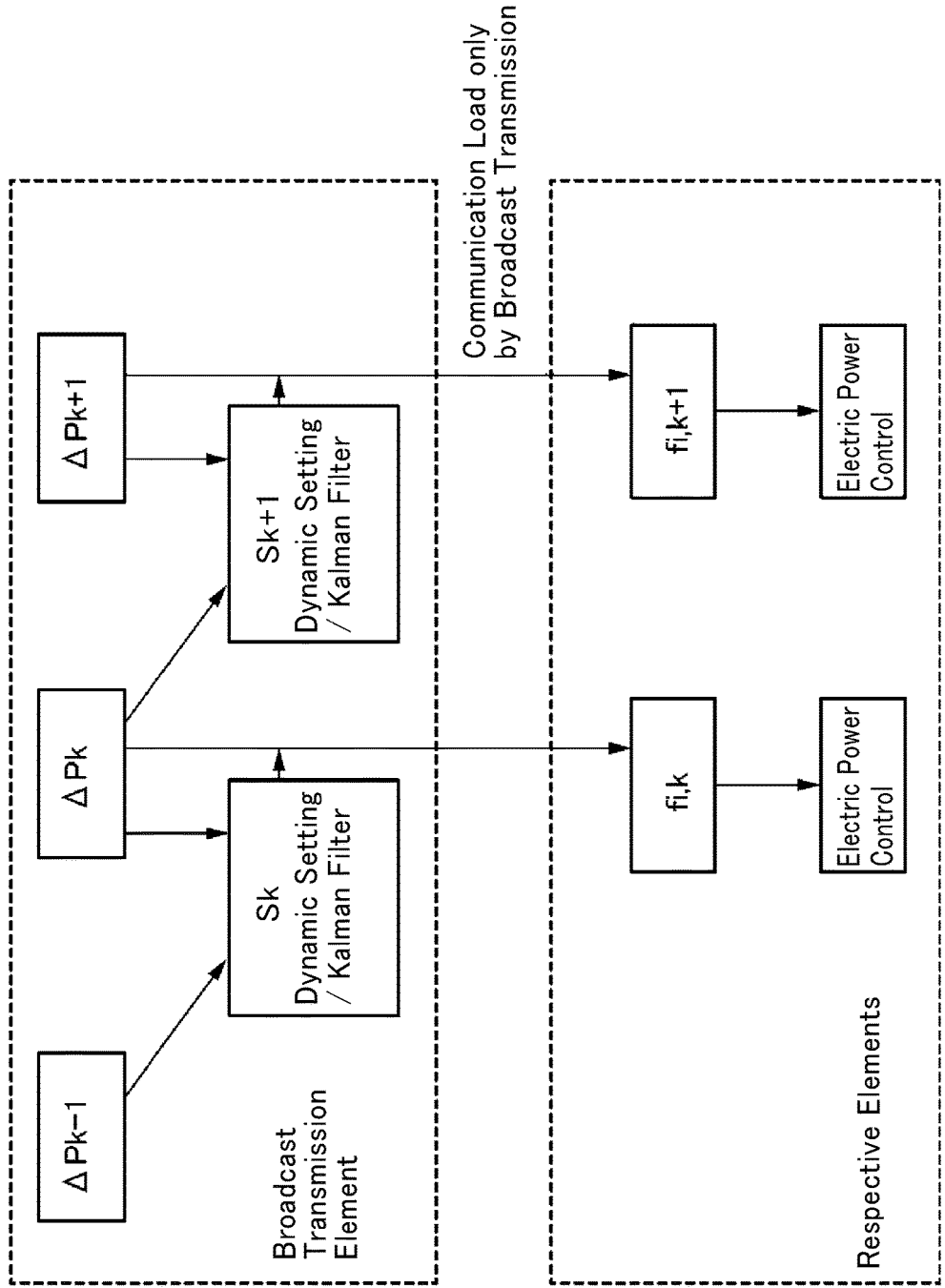
FIG. 6 Figure of operation concept for performing electric power control while estimating the equivalent transition rate using Kalman filter and evaluating the soundness of the system and the method.

The maximum electric power which can be reduced at device rating of the i-th device is $\Delta$ (delta) $P_{imax}$ obtained by subtracting the lower limit consumed electric power $P_{imin}$ for enabling operation from the rated consumed electric power $P_{imax}$, and the electric power which can be reduced instantaneously is $\Delta$ (delta) $P_i$ obtained by subtracting the lower limit consumed electric power $P_{imin}$ for enabling operation from the consumed electric power $P_i$ of the subject device at the present time (FIG. 5). That is, the electric power being consumed at the present time or duty is measured (The measurement was performed with a galvanometer (current transformer), detector I/F (interface) in FIG. 8, FIG. 9.), and it is calculated in the respective devices. In this way, the basic system sensitivity in the whole domain is made almost "1". In this regard, this scheme is characteristic in that the stability of control is not affected even if the degrees of priorities are manually made higher at the side of individual devices. For example, an LED illumination domain can employ:

"degrees of priorities which the respective devices have"="maximum electric power which can be reduced at device rating/(divided by) electric power which can be reduced instantaneously"×(multiplied by) "total sum value of the number of inverter-controlled devices in the domain"×(multiplied by) "reference illuminative intensity/(divided by) actual illuminative intensity"

The lower limit is set to the limit for keeping operation when the consumed electric power becomes below the limit for keeping operation by the calculate reduction amount, and contrary, it is set to the rated electric power when it exceeds the rated electric power by a calculated negative amount of reduction.

Type 3 Method for Setting Degrees of Priorities: Basic Type Performed at the Respective Devices (Electric Power Consumption Elements) Side (Case Consisted of Devices with Increasing Scale)

The basic degree of priority is defined as:

"degrees of priorities which the respective devices have"="maximum electric power which can be reduced at rating in the domain/(divided by) maximum electric power which can be reduced at device rating"

The maximum electric power which can be reduced at rating in the domain is the sum of the maximum electric power which can be reduced at device rating with regard to the respective devices included in the group. Such the numerical values of the degrees of priorities are fixed values, and the system is very stable. In this way, the basic system sensitivity in the whole domain will be made as almost "1". In this regard, this scheme is characteristic in that the stability of control is not affected even if the degrees of priorities are manually made higher at the side of individual devices. For example, an LED illumination domain can employ:

"degrees of priorities which the respective devices have"="maximum electric power which can be reduced at rating in the domain/(divided by) electric power which can be reduced instantaneously"×(multiplied by)"reference illuminative intensity/(divided by) actual illuminative intensity"

The lower limit is set to the limit for keeping operation when the consumed electric power becomes below the limit for keeping operation by the calculate reduction amount, and contrary, it is set to the rated electric power when it exceeds the rated electric power by a calculated negative amount of reduction.

Type 4 Method for Setting Degrees of Priorities: State-Dependent Type Performed at the Respective Devices (Electric Power Consumption Elements) Side (Case Consisted of Devices with Increasing Scale)

The basic degree of priority is defined as:
"degrees of priorities which the respective devices have"="maximum electric power which can be reduced at rating in the domain/(divided by) maximum electric power which can be reduced at device rating"×(multiplied by) "maximum electric power which can be reduced at device rating/(divided by) electric power which can be reduced instantaneously"="maximum electric power which can be reduced at rating in the domain/(divided by) electric power which can be reduced instantaneously" (see the below formula (33)).

The degree of priority of the device j:

[Numeral 33]

$$Q_{ij} = \frac{\sum_i \Delta P_{imax}}{\Delta P_j} = \left(\frac{\Delta P_{jmax}}{\Delta P_j}\right) \times \left(\frac{\sum_i \Delta P_{imax}}{\Delta P_{jmax}}\right) \quad (33)$$

namely, the electric power being consumed at the present time or duty is measured, and it is calculated in the respective devices. In this way, the basic system sensitivity in the whole domain is made almost "1". In this regard, this scheme is characteristic in that the stability of control is not affected even if the degrees of priorities are manually made higher at the side of individual devices. For example, an LED illumination domain can employ:
"degrees of priorities which the respective devices have"="maximum electric power which can be reduced at rating in the domain/(divided by) electric power which can be reduced instantaneously"×(multiplied by) "reference illuminative intensity/(divided by) actual illuminative intensity"

The lower limit is set to the limit for keeping operation when the consumed electric power becomes below the limit for keeping operation by the calculate reduction amount, and contrary, it is set to the rated electric power when it exceeds the rated electric power by a calculated negative amount of reduction.

In this case, the effective system sensitivity $S_t$ in the domain is described by the formula (34) below:

[Numeral 34]

$$\frac{1}{S_t} = \sum_i \left(\frac{\Delta P_i}{\sum_j \Delta P_{jmax}}\right) = \frac{1}{\left(\frac{\sum_j \Delta P_{jmax}}{\sum_i \Delta P_i}\right)} \quad (34)$$

Here, "electric power adjustment degree in domain" is defined by the following formula (35).

Electric power adjustment degree in domain=

[Numeral 35]

$$\left(\frac{\sum_j \Delta P_{jmax}}{\sum_i \Delta P_i}\right) \quad (35)$$

This "electric power adjustment degree in domain" is the actual (effective) system sensitivity in that domain. The value can be calculated by collecting information from member elements, but an alert element, in the present electric power control scheme assumes "1" as a predetermined sensitivity value unless specially defined, for reducing communication required for it. In fact, in a case in which all of the member elements are operated by rated electric powers, the value is "1". The electric power adjustment degree in domain is used for calculating the degree of priority for representing a lower class domain (lower layer domain) in which the same member element becomes an alert element in the upper class when the system is hierarchized.

Provision of degrees of priorities related to electric power reduction does not substantially have any problem with the fixed value in Type 1 in a case in which the domain is consisted of a lot of devices with the same scale. In dwelling units etc., in a case where it is consisted of devices with different scales, there is substantially no problem with the fixed value in Type 3, usually. In dwelling units etc., in a case in which it is consisted of devices with different scales, and when the responsiveness is pursued as much as possible, the method of providing degrees of priorities of Type 4 as state-dependent type can be employed.

Further Study of Providing of Degrees of Priorities

The calculation based on instantaneous "maximum electric power which can be reduced at rating in the devices or domain/(divided by) electric power which can be reduced instantaneously" is recommended here in setting degrees of priorities. However, in actual provision, there is a case in which a degree of priority is preferable to be allocated per an electric power consumption element without relying on preliminary numerical evaluation. In the following, such the cases will be further studied.

The number of all the electric power consumption elements in the domain is defined as N. An easy method for setting the sum of the inverse numbers of the total sum of the degrees of priorities to almost "1" is, to allocate (N/(divided by) 2) to an element with the lowest degree of priority, that is the element most contributing to electric power reduction, and to allocate (N) in average, and to allocate (2N) or (3N) to the element with the highest degree of priority, that is the element which is least wanted to join the electric power reduction. For example, in a domain to which three electric power consumption elements belong, the effective system sensitivity can be made as 6/(divided by) 7 if the degrees of priorities are 1.5, 3, and 6. In a domain to which five elements belong, the effective system sensitivity can be made as 70/(divided by) 79 if the degrees of priorities are 2.5, 3.5, 5, 7, and 10.

The method for setting the effective system sensitivity to almost "1", that is the method for prioritizing convergence of control is shown here, but it is safer while the convergence performance is less to have large effective system sensitivity in the domain, and the robustness will further be higher by setting the lowest degree of priority to N, and by setting the highest degree of priority to 2N or 3N. In three electric power consumption elements, the effective system sensitivity will be 18/(divided by) 13 by taking the degrees of priorities as 3, 4.5, 6, and in five elements, the effective system sensitivity will be 840/(divided by) 617 by taking the degrees of priorities as 5, 6, 7, 8, 10.

The above-described setting of degrees of priorities corresponds to setting at the safety side in which the real system sensitivity is less than 1. In the setting, the calculation can be performed based on a power method of the rational number of instantaneous "maximum electric power which can be reduced at rating in the devices or domain/(divided by) electric power which can be reduced instantaneously", and the function type is not particularly limited. For example, in Type 2, it is possible to employ the function: "degrees of priorities which the respective devices have"="[3−2.5×(multiplied by) (electric power which can be reduced instantaneously/(divided by) maximum electric power which can be reduced at device rating)^2]×(multiplied by) "value of the total sum of the number of inverter-controlled devices in the domain" ("^2" represents square). From this, the lowest degree of priority will be N/(divided by) 2 and the highest degree of priority will be 3N.

Next, a qualitative concept with regard to the lowest degree of priority will be described using an example of Type 2. Assuming that degrees of priorities of all electric power consumption elements are N/(divided by) 2, the effective system sensitivity $S_t$ is as follow:

$$S_t=1/(\text{divided by})(N\times(\text{multiplied by})(2/(\text{divided by})N))=1/(\text{divided by})2.$$

In this state, assuming that the alert element performs broadcast transmission using "1" as the default system sensitivity, the system will lapse into a continuous oscillation state and will reach the stability limit. Therefore, a way of setting in which the lowest degree of priority in any of the electric power consumption elements is not below N/(divided by) 2 should be employed.

Particular Examples of Setting of Degrees of Priorities

In the following, three types of particular examples of setting of degrees of priorities will be described. However, methods of setting degrees of priorities are not limited to those methods.
(1) Trapezoid Method: a method for easily performing qualitative setting.
(2) Linear Type Degree of Priority: a method of mathematically setting based on operational situations of the respective individuals.
(3) Hyperbolic Curve Type Degree of Priority: a method of mathematically setting based on operational situations of the respective individuals.

(1) Trapezoid Method: A Method for Easily Performing Qualitative Setting.

It is a qualitative method of setting from the lowest degree of priority to the highest degree of priority from N/(divided by) 2 to 2N or 3N while considering the averaged degree of priority in the domain as N, and a quantitative evaluation is not required (FIG. 10, FIG. 11). As to making the effective system sensitivity higher, it is less in a transient response, but it leads to improvement of stability. In this case, it would also be practical to set from the lowest degree of priority to the highest degree of priority from N to (2N) or N to (3N). The system sensitivity can be qualitatively evaluated in an approximation by trapezoidal integration.

(2) Linear Type Degree of Priority: A Method of Mathematically Setting Based on Operational Situations of the Respective Individuals.

Figure 12:
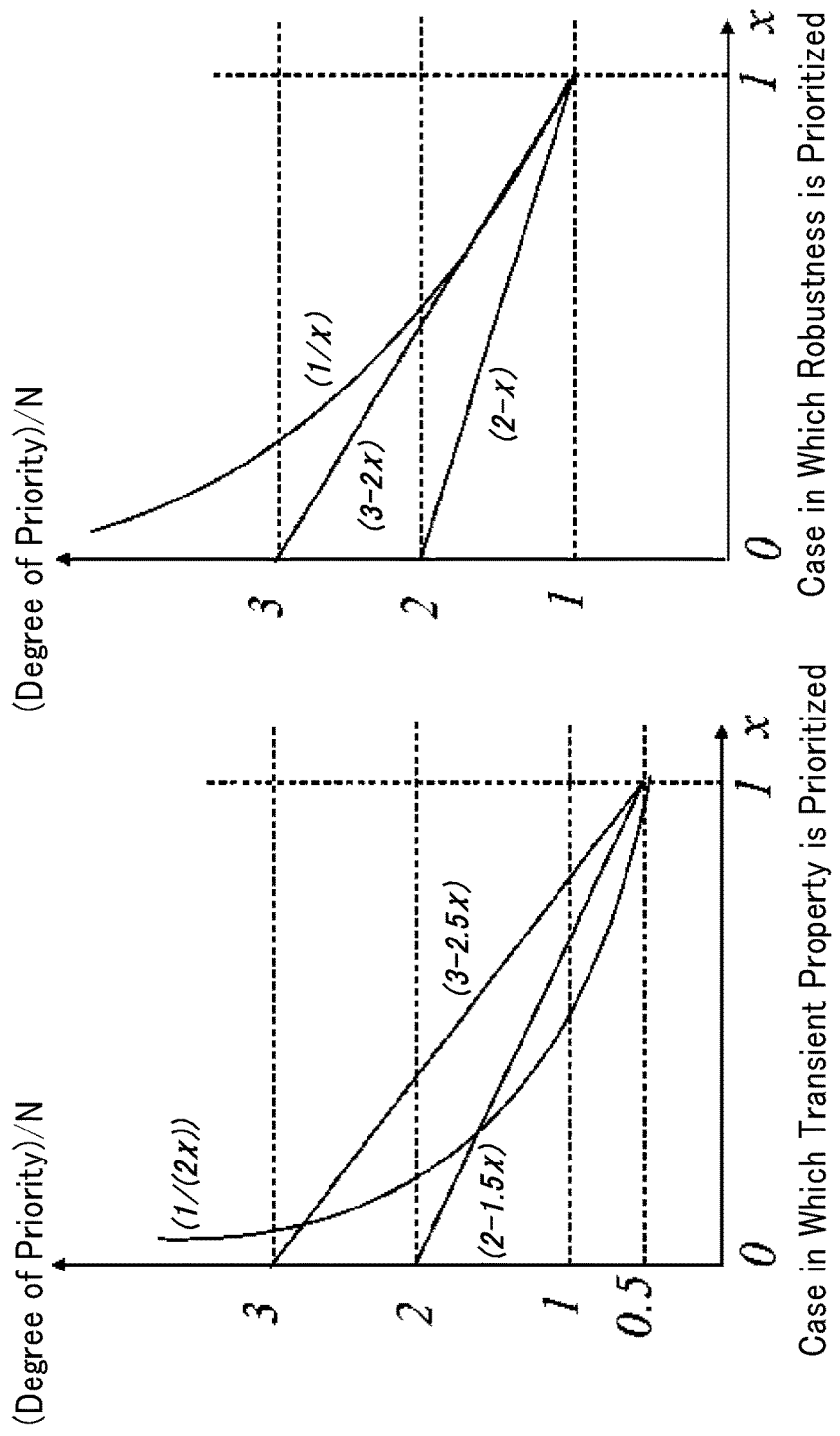
FIG. 12 Figure explaining linear-type/hyperbola-type setting of degrees of priorities.

It can be considered that:
X=(electric power which can be reduced instantaneously/(divided by) maximum electric power which can be reduced at device rating) causes random changes between 0 and 1. In Type 2, by employing the following:
"degrees of priorities which the respective devices have"="[A−(A−1/(divided by) 2) X]×(multiplied by) "the value of the total sum of the number of inverter-controlled devices in the domain", it is possible to make the degrees of priorities change linearly from the minimum value N/(divided by) 2 to 2N or 3N by setting A to 2 or 3 (FIG. 12). By integrating the inverse number of this degree of priority with respect to X between [0−1], and by taking the inverse number thereof, the effective system sensitivity can be obtained. They are 1.082 (A=2), 1.395 (A=3), and it can be understood that a stable control can be provided.

If the degrees of priorities are set as follow:
"degrees of priorities which the respective electric power consumption elements have"="[A−(A−1) X]×(multiplied by) "the value of the total sum of the number of inverter-controlled devices in the domain", it is less in a transient response, but setting of degrees of priorities advantageous in stability is made possible (FIG. 12). In this case, further large effective system sensitivity can be taken as 1.443 (A=2), 1.820 (A=3). In Type 4, the method using "(maximum electric power which can be reduced at rating in the domain)/(divided by) (maximum electric power which can be reduced at device rating)", for example, instead of "the value of the total sum of the number of inverter-controlled devices in the domain" corresponds.

(3) Hyperbola-Type Degree of Priority: a method of mathematically setting based on operational situations of the respective individuals.

Similarly, it is considered that:
X=(electric power which can be reduced instantaneously/(divided by) maximum electric power which can be reduced at device rating) causes random changes between 0 and 1.

In that case, there is a measure of using degrees of priorities as follow:
"degrees of priorities which the respective devices have"="X^(−γ (gamma))/(divided by) (γ (gamma)+1)". In this regard, γ (gamma) is an arbitrary positive real number. It is possible to integrate the inverse number of a degree of priority in the range of X, between [0, 1] and make the inverse of that to calculate the effective system sensitivity to obtain "1", and it can be understood that it is possible to constitute a desired control system. The most intuitive case as γ (gamma) is a case in which γ (gamma)=1. That case corresponds to:
"degrees of priorities which the respective devices have"=" (maximum electric power which can be reduced at device rating/(divided by) electric power which can be reduced instantaneously)×(multiplied by) "the value of the total sum of the number of inverter-controlled devices in the domain"×(multiplied by) (1/(divided by) 2)" in Type 2, and the minimum degree of priority is N/(divided by) 2 and the maximum degree of priority is infinity (FIG. 12). That corresponds to:
"degrees of priorities which the respective devices have"=" (maximum electric power which can be reduced at rating in the domain/(divided by) electric power which can be reduced instantaneously)×(multiplied by) (1/(divided by) 2)" in Type 4. It is possible also in this case to integrate in whole the domain and evaluate the effective system sensitivity, and it is possible to prove that thereby the effective system sensitivity as "1" or more can be ensured. The above-described degrees of priorities correspond to double of the degrees of priorities which have been theoretically-introduced here. This corresponds to doubling of the effective system sensitivity and it can be understood that they have been set with according ensuring of stability priority over transient response.

Setting of Degrees of Priorities in Soft Breaker

The system sensitivity in an upper class domain (system sensitivity in upper class) is basically "1". In the present soft breaker, it is not necessary to set or monitor with regard to it. Also in an upper class, as explained-above using the formulas (25)-(32), it is possible to perform a real-time estimation at an alert element (upper class broadcast transmission element), evaluate the soundness of the system, and inspect it.

In a lower class domain, the system sensitivity which the present soft breaker uses as an alert element is also basically "1". If necessary, there is a case in which different values are set in the present soft breaker. In the lower class, the present soft breaker as an alert element can perform a real-time estimation, evaluate the soundness of the system as expressed above using the formulas (25)-(32), and inspect it. In the upper class, the present soft breaker functions as one member element. This degree of priority in upper class which the one member element has (degree of priority in upper class) can be set as degrees of priorities in the above-described Types 1-4. In the easiest setting of the degree of priority, for example in a class consisted of a plurality of domains with the same scale in a smart grid, the degree of priority can be fixed as the number of domains, namely the number of member elements (degree of priority setting of Type 1). In addition, the degree of priority as one member element in the upper class can be defined as the value obtained by dividing the total amount of electric power which can be reduced at rating in upper class by the electric power which can be reduced at rating of whole the lower class domain of the present soft breaker. This is an effective setting method in the class consisted of a plurality of domains with different scales in a smart grid (degree of priority setting of Type 3). As the degree of priority which the soft breaker has in the upper class domain, it can be defined as:

"adjustment degree of electric power in lower class domain"×(multiplied by) "the number of member individuals in upper class domain", when following the degree of priority in Type 2. In addition, when following the degree of priority in Type 4, it can also be defined as "adjustment degree of electric power in lower class domain"×(multiplied by) "(maximum electric power which can be reduced at rating in the upper class domain)/(divided by) (maximum electric power which can be reduced at rating in the lower class under control)".

As to Example of Asymmetric Setting of Degree of Priority Related to Electric Power Recovery In a case in which reduction of the total consumed electric power is required, it is necessary to avoid reduction of consumed electric power in electric power consumption elements with small reduction margins. In such elements, the degrees of priorities are defined as high so that shared electric power within the reduction amount required in whole the domain becomes small. According to this concept, when restoring the electric power allowed in the domain from the reduced state, the recovery amount should be allocated more aggressively to those elements with small reduction margins. Contrarily, when recovering, there is a case in which it is preferable in operation to make the degrees of priorities of such elements small. Assuming that the degree of priority of the i-th electric power consumption element at the time of reduction is $Q_i$, as a rational setting method of the degree of priority at the time of recovery, a method according to the formula (36) below can be considered as an example, with taking complementarity into account and normalizing the total sum of the inverse numbers of the degrees of priorities to "1":

[Numeral 36]

$$Q'_i = (N-1)\frac{Q_i}{Q_i - 1} \qquad (36)$$

This setting can also be performed in the respective electric power consumption elements. According to this, in a case in which degrees of priorities at the time of reduction in a domain to which three electric power consumption elements belong are 2, 3, 6 (the total sum of the inverse numbers are taken as 1), the degrees of priorities at the time of recovery can be taken as 4, 3, 2.4. In the above-described setting of degrees of priorities of Type 1, the degree of priority is the total number of the individuals N in the domain, and the degree of priority at the time of recovery is also the same N in that case. As described above, it is also possible to change the degrees of priorities in an asymmetric manner by calculations on the respective electric power consumption elements depending on the polarity (positive/negative) of the indication value for adjusting total consumed electric power shown by the information transmitted by broadcast in a case in which reduction of electric powers is required in the domain and in a case in which electric powers can be recovered.

The method of determining degrees of priorities at the time of recovery is not one method, but there are a variety of methods. According to a basic concept, to an element which has been requesting maintaining of electric power supply when reduction was being conducted with a high degree of priority, allocation of recovery electric power is performed on a priority basis when recovering electric power resources, namely the degree of priority at the time of recovery is made lower. Since the allocated electric powers interpreted at the respective elements are values multiplied by 1/(divided by) (degree of priority), it is appropriate to consider that it is determined by a representation according to the following formula (37)

[Numeral 37]

$$\frac{1}{Q'_i} = a - b\frac{1}{Q_i} \qquad (37)$$

In a case in which the sum of the inverse numbers of the degrees of priorities at the time of reduction is "1", the condition for the sum of the inverse numbers of the degrees of priorities at the time of recovery being "1" is aNb=1. The above definition (37) of the degrees of priorities at the time of recovery is an example in which the sum of the inverse numbers of the sum of the degrees of priorities at the time of recovery is normalized to be "1" assuming a=b.

As another concept, there is a concept that the ratio allocated by the degrees of priorities at the time of reduction and the ratio allocated by the degrees of priorities at the time of recovery should meet a complementary relationship. In this case, the degrees of priorities at the time of recovery are defined by the following formula (38) when imposing a normalization condition.

[Numeral 38]

$$\frac{1}{Q'_i} = \frac{2}{N} - \frac{1}{Q_i} \tag{38}$$

According to this, in a domain to which three elements belong, in a case in which the degrees of priorities at the time of reduction are 2, 3, 6 (the total sum of the inverse numbers are taken as 1), the degrees of priorities at the time of recovery can be taken as 6, 3, 2 in a direct contrary manner of the degrees of priorities.

Assuming that the degrees of priorities at the time of recovery have been set in this method, it is described below what characters will appear with regard to the degrees of priorities of reduction in Types 1-4.

In the degrees of priorities of Type 1, $Q_i=N$, and $Q'_i=N$, and thus the degrees of priorities at the time of recovery are identical with the degrees of priorities at the time of reduction.

In the degrees of priorities of Type 2, the sum of the inverse numbers of the degrees of priorities at the time of reduction is below "1", and thus the sum of the inverse numbers of the degrees of priorities at the time of recovery exceeds "1". That is, the effective system sensitivity at the time of recovery is below "1". In fact, this state is corresponding to a case in which the system sensitivity assumed on the alert element side is too high, and is not preferable. Thus, artifices are required such as making the sum of the inverse numbers of the degrees of priorities at the time of reduction and the sum of the inverse numbers of the degrees of priorities at the time of recovery as 3/(divided by) (2N) or 1/(divided by) N instead of 2/(divided by) N. In the above-described setting method of the degrees of priorities at the time of recovery, the sum of the inverse numbers of the degrees of priorities at the time of recovery is below "1", and the effective system sensitivity is made greater than "1" to improve robustness.

In the degrees of priorities of Type 3, the sum of the inverse numbers of the degrees of priorities at the time of recovery is "1", and the normalization condition is automatically satisfied.

In the degrees of priorities of Type 4, it is not preferable since, similarly to the case of the degrees of priorities of Type 2, the effective system sensitivity in the recovery process falls below "1", and artifices are required such as making the sum of the inverse numbers of the degrees of priorities at the time of reduction and the sum of the inverse numbers of the degrees of priorities at the time of recovery as 3/(divided by) (2N) or 1/(divided by) N instead of 2/(divided by) N. Similarly, in the above-described setting method of the degrees of priorities at the time of recovery, the sum of the inverse numbers of the degrees of priorities at the time of recovery is below "1", and the effective system sensitivity is made greater than "1" to improve robustness.

In this way, from the viewpoint of setting the degrees of priorities at the time of recovery with attaching importance to performance, the secondary-described scheme is advantageous. However, since the setting of the degrees of priorities at the time of reduction of Types 2, 4 aims improvement of robustness, the robustness in the setting of the degrees of priorities at the time of recovery degrades, and thus artifices are necessary for application. There is an appropriate range for the setting width of the degrees of priorities at the time of recovery, and this point should be respected, too on application.

As described above, in a case in which the degrees of priorities are not dynamically-changed as in Type 1, 3, the recovery action is static, too. However, what is actually expected is rather dynamic operation method as in Type 2, 4, and the methods described herein should be effectively utilized.

Specifying of Sub-Constraint Condition

In the foregoing description, optimization methods under a constraint condition (formula (1)) in which the total sum of electric powers consumed in electric power consumption elements included in a group is a specified electric power as a main constraint condition are considered. However, the present control scheme can be further extended to be applied to optimizations in cases in which sub-constraint conditions are imposed. Assuming that the original constraint represented by the above formula (1) is regarded as −0th order, and sub-constraints are regarded as −1st order, −2nd order, . . . −m-th order, an optimization by an expanded evaluation function represented by the following formula (39) is considered:

[Numeral 39]

$$J = \tfrac{1}{2}(f-f^*)^T Q(f-f^*) + \lambda_0(e_0^T f - P_0) + \lambda_1(e_1^T f - P_1) + \ldots + \lambda_m(e_m^T f - P_m)$$

where $$(Q^{-1}e_0)^T e_i = 0 \ (i=1,2,\ldots m)$$

and $$e_i^T e_j = 0 \ (i \neq j) \tag{39}$$

From the first formula in the above formula (39), $e_0^T f - P_0 = 0$ can be called main-constraint condition, and $e_i^T f - P_i = 0$ can be called sub-constraint condition.

In the above formula (39), $e_0^T$ is an n-dimensional unit row vector (T is a symbol of transposition), $e_1^T$ to $e_m^T$ are integration (row) vectors corresponding to the respective sub-constraints, $\lambda_0$ (lambda) to $\lambda_m$ (lambda) are Lagrange's undetermined multipliers, $P_0$ is a constraint value for the total consumed electric power in the group (corresponding to $P_t$ in the above formula (1)), and $P_1$ to $P_m$ are constraint values for integrated consumed electric powers corresponding to the respective sub-constraints. Similarly to the above formula (2), consumed electric powers being currently consumed by the respective electric power consumption elements in the group are defined as $f^*_1, f^*_2, \ldots, f^*_n$, and a vector made by arranging them longitudinally is defined as $f^*$. The remaining variables are defined similarly to the above formulas (1)-(3) etc.

In the expanded evaluation function in the above formula (39), the optimum solution of $f_i$ can be determined on the condition that partial differentiation values of the above expanded evaluation function by $f_1$ to $f_n$ and $\lambda_0$ (lambda) to $\lambda_m$ (lambda) are zero. When representing the optimum solution in vector representation, it is as in the following formula (40).

[Numeral 40]

$$f = f^* - S_0 \Delta P_0 (Q^{-1} e_0) - S_1 \Delta P_1 (Q^{-1} e_1) - \ldots - S_m \Delta P_m (Q^{-1} e_m) \tag{40}$$

where, $$S_0 = \frac{1}{e_0^T Q^{-1} e_0}, \ S_i = \frac{1}{e_i^T Q^{-1} e_i}$$

$$\Delta P_0 = e_0^T f^* - P_0, \ \Delta P_i = e_i^T f^* - P_i$$

Therefore, completely similarly to the case under the main constraint, the solution on which even this sub-constraint is imposed can be determined by combining processes in broadcast transmission and the respective electric power consumption elements. The ideal effective subsystem sensitivity $S_i$ (i=1, 2, ... m) are determined as described above by the integration vectors $e_i$ and Q, a sub system sensitivity used by the broadcast transmission element to determine the indication value for adjusting consumed electric power integrated under sub-constraint can approximately be "N/(divided by) (the number of non-zero components of $e_i$)".

In one example of electric power control according to the present invention, m indication values for adjusting consumed electric power integrated under sub-constraint are determined by measuring or determining, by the broadcast transmission element, amounts corresponding to $e_i^T f - P_i$ for i=1 to m (m=1 is also possible), m pieces of sub-constraint information representing them are further transmitted by broadcast, in addition to the information representing the above-described indication value for adjusting total consumed electric power, from the broadcast transmission element (soft breaker, if the system has a class structure.) into the group (group in lower class, if the system has a class structure. The same holds true for the following). The respective electric power consumption elements included in the group receive the above information and m pieces of sub-constraint information, and update-control their own consumed electric powers using the indication value for adjusting total consumed electric power, m indication values for adjusting consumed electric power integrated under sub-constraint, and degrees of priorities (in lower class) given to them or determined by them, respectively, according to the formula (40) (In the formula for determining f, $S_0 \Delta$ (delta) $P_0$, $\Delta$ (delta) $P_i$ are replaced, respectively, with respectively-received indication value for adjusting total consumed electric power and indication values for adjusting consumed electric power integrated under sub-constraint in calculation.). In this regard, it is assumed that the subsystem sensitivity $S_i$, or the approximated value of the same "N/(divided by) (the number of non-zero components of $e_i$)" are memorized in advance in the electric power consumption elements as targets of sub-constraints. As to control of consumed electric powers corresponding to sub-constraint information, only the electric power consumption elements as targets of the individual sub-constraints perform the same.

In the above formula, if the orthogonality of the integration vectors in sub-constraint conditions is destroyed, this affects control performance. That amount is given by the following formula (41).

[Numeral 41]

$$\text{if } (Q^{-1}e_0)^T e_i = \varepsilon_i \ (i = 1, 2, \ldots ),$$
$$e_0^T f = P_0 - \sum \varepsilon_i S_i \Delta P_i \quad (41)$$

It is possible to control influence on the main constraint condition to minor influence.

Contrary to the fact that the error $\Delta$ (delta) $P_0$ between the consumed electric power at the present time and the constraint value for the total consumed electric power specified by the main constraint condition can be easily measured, the integration error $\Delta$ (delta) $P_i$ from the constraint value for the electric power specified by the sub-constraint condition is not directly measured by the broadcast transmission element in many cases. Therefore, realistically, it is a realistic measure to set in conjunction with the main constraint condition, as $\Delta$ (delta) $P_i = \gamma_i$ (gamma)×(multiplied by) $\Delta$ (delta) $P_0$ (if $\Delta$ (delta) $P_0 < 0$, $\gamma_i$ (gamma)=0). According to this, this optimization on which the sub-constraints are imposed will end at the same time as the main constraint is satisfied. The targets of the integration are all the electric power consumption elements in the main constraint, but in the sub-constraints, the respective electric power consumption elements have to recognize modes to which they belong, in order to correspond to the integration vectors $e_i$, in advance. For example, in the case of $e_1^T = (1, 0, -1)$, targets of the first sub-constraint are first and third electric power consumption elements, and these elements recognize, by storing in a memory etc., that they belong to the first sub-constraint mode. It is assumed that this has been established at the time when devices are placed in the domain, and memorized in the respective elements.

Typical alert element should, in this case, transmit the main constraint mode "0" and the indication value for adjusting total consumed electric power obtained by the electric power to be adjusted $\Delta$ (delta) $P_0$ multiplied by the system sensitivity by broadcast and further transmit, in a sequential manner with regard to i of 1 to m, the sub-constraint mode "i" and the indication value for adjusting consumed electric power integrated under sub-constraint given as a consumed electric power integrated under sub-constraint to be adjusted $\Delta$ (delta) $P_i$ by broadcast. For example, broadcast transmission will be performed including sub-constraint conditions such as: 0, $\Delta$ (delta) $P_0 \times$ (multiplied by) (the system sensitivity), ..., i, $\Delta$ (delta) $P_i$, ....

In addition to coping with the main constraint condition, the respective electric power consumption elements calculate the electric power allocations imposed on the respective elements by multiplying the indication value for adjusting consumed electric power integrated under sub-constraint $\Delta$ (delta) $P_i$ by the subsystem sensitivity and divide this value by the degree of priority in reduction or recovery of the respective elements. Contrary to $S_0$, $S_i$ is not a value close to "1" depending on the sub-constraint mode, and it has to be memorized in advanced in the respective individuals.

Particular Example of Control by Sub-Constraint

A particular example of control by a sub-constraint will be explained in a separated manner of an ideal optimum control and an actual control.

(Optimum Control)

It is assumed that the number of electric power consumption elements in the group N=3, and degrees of priorities of all elements $Q_{jj}$ are 3. In that case, Q in the above formula (39) becomes a diagonal matrix in which diagonal components are 3 and non-diagonal components are zero. Assuming that there is only one sub-constraint condition and the integration row vector $e_1^T = (1, 0, -1)$, the orthogonality relationship $(Q^{-1}e_0)^T e_1 = 0$ in the second formula of the above formula (39) is satisfied. The sub-constraint condition is represented, from the first formula of the above formula (39), $e_1^T f - P_1 = 0$, that is $f_1 - f_3 = P_1$. This has a physical meaning of maintaining the difference between the consumed electric power of the first electric power consumption element and the consumed electric power of the third electric power consumption element at $P_1$, and it corresponds to, for example, a case in which a difference in consumed electric power of an LED illumination is introduced between on the window side and on the corridor side. Other than this example, a variety of sub-constraints can be imposed as conceptually shown in FIG. 13 corresponding to selection of integration row vectors.

The optimum solutions are determined by assigning particular values to the above formula (40) as in the following formula (42):

[Numeral 42]

$$f_1 = f_1^* - \frac{\sum_{j=1}^{3} f_j^* - P_0}{\sum_{j=1}^{3} Q_{jj}^{-1}} \times Q_{11}^{-1} - \frac{(f_1^* - f_3^*) - P_1}{Q_{11}^{-1} + Q_{33}^{-1}} \times Q_{11}^{-1} \quad (42)$$

$$f_2 = f_2^* - \frac{\sum_{j=1}^{3} f_j^* - P_0}{\sum_{j=1}^{3} Q_{jj}^{-1}} \times Q_{22}^{-1}$$

$$f_3 = f_3^* - \frac{\sum_{j=1}^{3} f_j^* - P_0}{\sum_{j=1}^{3} Q_{jj}^{-1}} \times Q_{33}^{-1} + \frac{(f_1^* - f_3^*) - P_1}{Q_{11}^{-1} + Q_{33}^{-1}} \times Q_{33}^{-1}$$

(Actual Control)

In the actual control, the broadcast transmission element does not have the precise value (effective system sensitivity) as to $S_0$ in the above formula (40), and thus the system sensitivity is set to, for example, 1. In addition, the broadcast transmission element cannot directly measure $\Delta$ (delta) $P_1=(f_1^*-f_3^*)-P_1$, and thus it is determined assuming $\Delta$ (delta) $P_1=\gamma_1$ (gamma)×(multiplied by) $\Delta$ (delta) $P_0$ etc., and information representing the indication value for adjusting total consumed electric power $\Delta$ (delta) $P_0$×(multiplied by) 1 and sub-constraint information representing the indication value for adjusting consumed electric power integrated under sub-constraint $\gamma_1$ (gamma)×(multiplied by) $\Delta$ (delta) $P_0$ are transmitted by broadcast. The electric power consumption elements which received them update, as described above, their own consumed electric powers according to the above formula (40) by, for example, multiplying them (indication values in the transmitted information) by the inverse numbers of their own degrees of priorities or subsystem sensitivity. Therefore, the control is performed toward the consumed electric powers in the following formula (43) instead of the consumed electric powers in the above formula (42):

[Numeral 43]

$$f_1 = f_1^* - \frac{\sum_{j=1}^{3} f_j^* - P_0}{1} \times Q_{11}^{-1} - \frac{\gamma_1 \times \left(\sum_{j=1}^{3} f_j^* - P_0\right)}{Q_{11}^{-1} + Q_{33}^{-1}} \times Q_{11}^{-1} \quad (43)$$

$$f_2 = f_2^* - \frac{\sum_{j=1}^{3} f_j^* - P_0}{1} \times Q_{22}^{-1}$$

$$f_3 = f_3^* - \frac{\sum_{j=1}^{3} f_j^* - P_0}{1} \times Q_{33}^{-1} + \frac{\gamma_1 \times \left(\sum_{j=1}^{3} f_j^* - P_0\right)}{Q_{11}^{-1} + Q_{33}^{-1}} \times Q_{33}^{-1}$$

For example, in a domain consisted of illumination devices, a control introducing sub-constraints into electric power consumptions between areas can be performed, in addition to electric power control of the whole. This can be applied to a domain consisted of smart grids so that sub-constraints to differences between grids can be provided in addition to electric power control of the whole. As an example, as conceptually shown in FIG. 13, it is possible to configure the system so that an illumination is dark on the window side and it is bright on the corridor side ($e_{11}$), or there are dark areas and bright areas provided alternately ($e_{21}$, $e_{22}$).

Next, configurations of circuits of the broadcast transmission element and electric power consumption element in the allocations of consumed electric powers according to the present invention will be explained.

FIG. 7 is a figure conceptually showing a circuit configuration of the broadcast transmission element. In one example, the broadcast transmission element is constituted as a smart meter connected to an electric power distribution panel, and it is connected to an electric power-supply opening (electric power outlet) or it has a built-in battery. The broadcast transmission element is consisted of:

a communication system for broadcasting by transmission or receiving degrees of priorities from electric power consumption elements;

a communication system I/F (interface);

an electric power meter for measuring the total consumed electric power in the group;

a sensor I/F;

a judgment/execution system circuit for assuming a variety of general information processing described above, such as determination of an indication value for adjusting total consumed electric power and indication values for adjusting consumed electric power integrated under sub-constraint, generation of information, sub-constraint information representing them, estimation of soundness of the system, and;

an electric power supply system for supplying electric power to them, and the like.

A display for displaying arbitrary information such as the total consumed electric power at the present time, or a user I/F for inputting, by a user, such as degrees of priorities in upper class can be further included. Rated consumed electric powers of the respective devices are memorized, for example, in a memory circuit in the communication system I/F or a separated memory in the module (not shown in the figure).

FIG. 8 shows the schematic configuration of an inverter-equipped-type module for making electric devices operate as electric power consumption elements in the consumed electric power allocation according to the present invention. The module is consisted of:

a communication system (antenna etc. for wireless communication, or a modem etc. in power line communication) for receiving the above-described information or sub-constraint information from the broadcast transmission element, and transmitting a degree of priority, if necessary;

a communication system I/F (a communication circuit for performing general communication processing including encoding, decoding of signals and the like);

a galvanometer for measuring consumed electric power of the device (For example, if the degree of priority is a fixed value, measuring of the consumed electric power is not necessary and also the galvanometer is not necessary.);

a sensor I/F (A circuit for making measurement value of consumed electric power digital signals and transmitting them to the communication system I/F etc. is also included. If measurement of consumed electric powers is not necessary, also the sensor I/F is not necessary.);

a judgment/execution system circuit for performing general information processing for update of its own consumed electric power as described above using information received from the broadcast transmission element;

a breaker for controlling the consumed electric power by intermittently blocking supply of electric power to the device under instructions from the judgment/execution system circuit; and an electric power supply system for supplying electric power to them, and the like.

The rated consumed electric power, the degree of priority, the subsystem sensitivity etc. are memorized, for example, in a memory circuit in the communication system I/F or a separated memory in the module (not shown in the figure). By providing such the module between an electric power-supply opening (electric power outlet) and an electric device, it is possible to make the electric device operate as a client in consumed electric power allocation. In a case in which the electric power consumption element is constituted as a mobile object, it is sufficient if the module and a battery are included inside the electric device. In addition, it is also possible to provide a user I/F and change the degree of priority of the electric power consumption element and the like.

FIG. 9 shows a schematic configuration of inverter-control-type module, which is typically included inside an electric device such as an air conditioner, for making electric devices operate as electric power consumption elements in the consumed electric power allocation according to the present invention. Contrary to the circuit configuration of FIG. 8, a circuit such as duty off pulse integration/subtraction unit, PWM (Pulse Width Modulation) modulator for further providing control signals to the inverter controller which the device has, is provided instead of the breaker. For example, in a case in which a PWM modulator is used, the consumed electric power can be adjusted by regulating the duty by modulating ON pulses for giving torque to the motor inputted to the inverter controller in the device with modulation pulses from that PWM modulator. In the example of FIG. 9, modulation is performed by changing the width of the ON pulse by reversing the modulation pulse and making a logical multiplication with the ON pulse as the radical driving signal for the air conditioner. However, any circuit can be employed as a circuit enabling adjustment of the working ratio of the motor etc.

Embodiment 2

Information Transfer Capability Control System and Method

The above-described series of measures for consumed electric power control can be applied without change when the resource is information transfer capability instead of electric power and consumption of electric power is replaced with occupation of information transfer capability. In a case in which a transmitter tries to transmit information, there is a case in which the transmission speed, namely information transfer capability as resource is restricted by factors such as output of the transmitter, transmission distance, or efficiency of an antenna of transmission and reception. Respective subsystems or measuring devices in the domain which want to transfer information have to utilize their information transfer capabilities in a certain ratio, but there is a case in which the domain information transfer capability as resource is exceeded when a plurality of subsystems or measuring devices (member elements) request partial occupation of the transfer capability. In the respective member elements, it is considered that degrees of priorities are changed dynamically, but even in such the case, it is necessary to perform optimum resource allocation in view of degrees of priorities of the respective member elements. By the present measure, it is possible to obtain the optimum solution with meeting the resource constraint by combining the function, in the broadcast transmission element in the domain, of measuring the total information transfer capability and transmitting, by broadcast, information generated with using a system sensitivity in the domain based on the difference from the total rated capability (reference value), and the function, in the respective member elements, of performing operations using the degrees of priorities. Also as to the information transfer capability, a soft breaker can be introduced.

Figure 14:
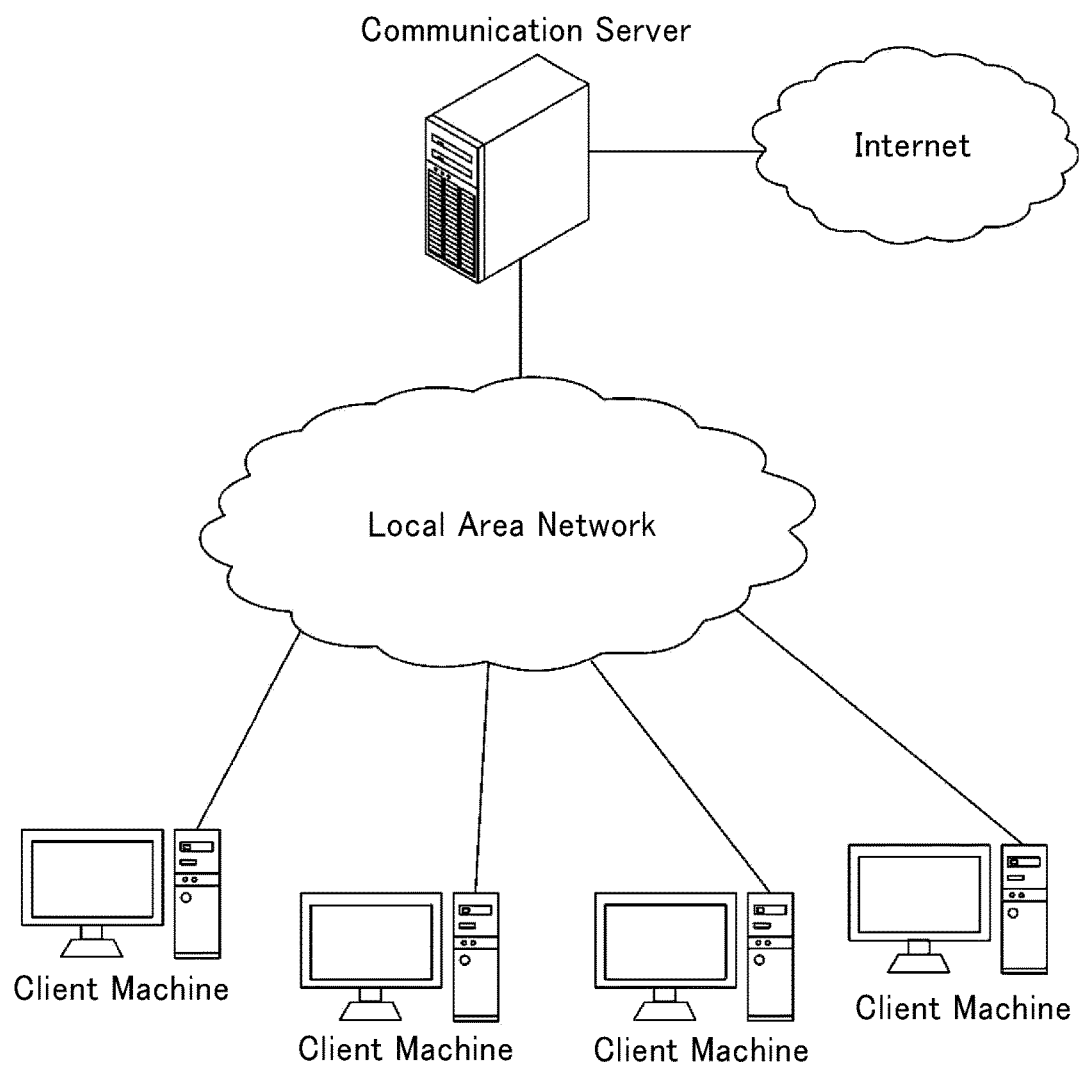
FIG. 14 Configuration Figure showing an embodiment of the information transfer capability control system of the present invention.

An example of such the information transfer capability control system is shown in FIG. 14. The system includes a communication server (broadcast transmission element), and one or more client machines (information transfer elements) for which degrees of priorities are given or determined individually. The communication server measures the current value of the sum of the communication speeds (total information transfer capability) occupied in the group including the one or more client machines, for example by executing an application for detecting communication speed on the communication server, measures the difference between the current value and a reference value (summed value of reference communication speeds defined for the respective client machines), determines an indication value for adjusting total information transfer capability by multiplying that difference by a system sensitivity and the like, generates information representing that to be shared in the group, and transmits this into the group by broadcast.

Each client machine, for example, receives the information which has been transmitted by broadcast, determines, independently from client machines other than the each one and the communication server, an update value for information transfer capability to be used for update of the each one's own communication speed (information transfer capability) by an operation using the degree of priority given or determined for the each one and the indication value for adjusting total information transfer capability (The operation can be operations such as, as described above, multiplication of the indication value for adjusting total information transfer capability by the inverse number of the each one's own degree of priority.), decreases the each one's own communication speed by the amount of the update value for information transfer capability (for example, the communication speed setting is changed by executing a communication application on each client machine) to control the each one's own information transfer capability, and thereby control the total information transfer capability in the group.

INDUSTRIAL AVAILABILITY

The present invention can be utilized in an arbitrary system using electric devices or information transfer devices such as in homes, offices, schools, commercial facilities, and the like.

The invention claimed is:

1. An electric power control system comprising:
one or more electric power consumption elements for which degrees of priorities are given or determined individually; and
a broadcast transmission element which delivers information to be shared in a group only by one-way transmission of information to all electric power consumption elements in the group including the one or more electric power consumption elements in a significantly short time compared to a time interval of the control, wherein implementation of each element of the electric power consumption elements and the broadcast transmission element includes communication system and interfaces, meters/sensors interfaces, judgement/execution system circuitry, electric power supply system in both the broadcast element and one or more power consumption elements, wherein said electric power control system is configured so that:

said broadcast transmission element measures the difference between the current value of the total consumed electric power consumed in the group and a reference value of the total consumed electric power, determines an indication value for adjusting total consumed electric power as a function of the difference, creates information to be shared in the group representing the indication value for adjusting total consumed electric power, and transmits the information as broadcast into the group;

said one or more electric power consumption elements receive the information transmitted as broadcast, and each one of said one or more electric power consumption elements calculates, independently from electric power consumption elements of the one or more electric power consumption elements other than the each one and the broadcast transmission element and in parallel, an update value for consumed electric power to be used for update of the each one's own consumed electric power by an operation using the degree of priority given or determined for the each one and the indication value for adjusting total consumed electric power, and controls the each one's own consumed electric power based on the update value for consumed electric power to control the total consumed electric power in the group.

2. The electric power control system according to claim 1, wherein the indication value for adjusting total consumed electric power is also a function of a system sensitivity.

3. The electric power control system according to claim 1, wherein it is further configured so that the degree of priority is dynamically changed in at least one of the one or more electric power consumption elements.

4. The electric power control system according to claim 1, wherein it is configured so that:

said broadcast transmission element further calculates at least one indication value for adjusting consumed electric power integrated under sub-constraint, and transmits by broadcast at least one sub-constraint information representing the indication value for adjusting consumed electric power integrated under sub-constraint into the group;

said one or more electric power consumption elements further receive the sub-constraint information transmitted by broadcast;

electric power consumption elements as targets of control based on the sub-constraint information among the one or more electric power consumption elements further determine an update value for consumed electric power under sub-constraint by an operation using the degree of priority given or determined for the each one and the indication value for adjusting consumed electric power integrated under sub-constraint, and further control the each one's own consumed electric power based on the update value for consumed electric power under sub-constraint.

5. The electric power control system according to claim 1, wherein it is further configured so that, in addition to broadcast transmission, communication in both directions between the broadcast transmission element and at least one of the one or more electric power consumption elements is available.

6. The electric power control system according to claim 1 wherein the system is for electric power control in upper and lower classes, and:

the one or more electric power consumption elements are provided as one or more electric power consumption elements in a lower class, and degrees of priorities in lower class are given or determined for those elements individually; and the broadcast transmission element is provided as a broadcast transmission element which has a function of delivering information to be shared in a group only by one-way transmission of information to all electric power consumption elements in the group in lower class including the one or more electric power consumption elements in a significantly short time compared to a time interval of the control, said broadcast transmission element for which a degree of priority in upper class is given or determined individually, is configured to receive information in upper class which is transmitted by broadcast from an upper class broadcast transmission element and which represents an indication value for adjusting total consumed electric power in upper class, measure lower class total consumed electric power consumed in a group in lower class including one or more electric power consumption elements, determine an indication value for adjusting total consumed electric power in lower class to be used for update of the lower class total consumed electric power, by an operation using the lower class total consumed electric power, a degree of priority in upper class, and the indication value for adjusting total consumed electric power in upper class, create information in lower class to be shared in the group in lower class representing the indication value for adjusting total consumed electric power in lower class, and transmit the information in lower class as broadcast into the group in lower class;

said one or more electric power consumption elements are configured to:

receive the information in lower class transmitted as broadcast from the broadcast transmission element, and each one of the one or more electric power consumption elements are configured to:

calculate, independently from electric power consumption elements of the one or more electric power consumption elements other than the each one and the broadcast transmission element and in parallel, an update value for consumed electric power to be used for update of the each one's own consumed electric power by an operation using the degree of priority in lower class given or determined for the each one and the indication value for adjusting total consumed electric power in lower class, and control the each one's own consumed electric power based on the update value for consumed electric power to control the total consumed electric power in the group in lower class.

7. The electric power control system according to claim 1 wherein:
the one or more electric power consumption elements are provided as one or more electric power consumption elements having functions of directly consuming electric power or opening/closing supply of electric power, for which degrees of priorities are given or determined individually,
the broadcast transmission element is provided as a broadcast transmission element which delivers information to be shared in a group only by one-way transmission of information to all electric power consumption elements in the group including the one or more electric power consumption elements in a significantly short time compared to a time interval of the control,
wherein the electric power control system is configured so that:
the broadcast transmission element
measures the difference between (i) the current value as a multivariate amount indicating the total consumed electric power consumed in a group including the one or more electric power consumption elements or an electric power supply state and (ii) a reference value as a multivariate amount indicating the total consumed electric power or the electric power supply state,
determines an indication value for adjusting electric power which is generally a multivariate amount as a function of the difference, or receives the indication value for adjusting electric power from another element,
creates information which is generally a multivariate amount to be shared in the group representing the indication value for adjusting electric power, and
transmits the information as broadcast into the group;
the one or more electric power consumption elements
receive the information transmitted as broadcast, and
each one of the one or more electric power consumption elements
calculates, independently from electric power consumption elements of the one or more electric power consumption elements other than the each one and the broadcast transmission element and in parallel, an update value for electric power to be used for update of the each one's own consumed electric power or the opening/closing electric power by an operation using the degree of priority given or determined for the each one and the indication value for adjusting electric power, and
controls the each one's own consumed electric power or the opening/closing electric power based on the update value for electric power to control the total consumed electric power or electric power supply state in the group.

8. An information transfer capability control system comprising:
one broadcast transmission element and one or more information transfer elements, wherein implementation of each element of the information transfer elements and the broadcast transmission element includes communication system and interfaces, meters/sensors interfaces, judgement/execution system circuitry, electric power supply system in both the broadcast transmission element and one or more information transfer elements, and devices for controlling the information transfer capability in one or more information transfer elements,
wherein the information transfer capability control system is configured so that:
said broadcast transmission element measures the difference between the current value of the total information transfer capability occupied in a group and a reference value of the total information transfer capability, determines indication value for adjusting total information transfer capability as a function of the difference, creates information to be shared in the group representing the indication value for adjusting total information transfer capability, and transmits the information as broadcast into the group;
said one or more information transfer elements receive the information transmitted as broadcast, and
each one of the one or more information transfer elements calculates, independently from information transfer elements of the one or more information transfer elements other than the each one and the broadcast transmission element and in parallel, an update value for information transfer capability to be used for update of the each one's own information transfer capability by an operation using the degree of priority given or determined for the each one and the indication value for adjusting total information transfer capability, and controls the each one's own information transfer capability based on the update value for information transfer capability to control the total information transfer capability in the group.

9. An electric power control method in a group including one or more electric power consumption elements for which degrees of priorities are given or determined individually, the method comprising:
one or more electric power consumption elements, one broadcast transmission element, wherein implementation for each element of the power consumption elements and the broadcast element includes communication system and interfaces, meters/sensors interfaces, judgement/execution system circuitry, electric power supply system in both the broadcast element and one or more power consumption elements, and devices for controlling the consumed electric power in one or more power consumption elements, the method carried out by execution by said one or more elements, comprising:
measuring, by a broadcast transmission element which delivers information to be shared in the group only by one-way transmission of information to all electric power consumption elements in the group in a significantly short time compared to a time interval of the control, the difference between the current value of the total consumed electric power consumed and a reference value of the total consumed electric power,
determining, by the broadcast transmission element, an indication value for adjusting total consumed electric power as a function of the difference and creating information to be shared in the group representing the indication value for adjusting total consumed electric power,
transmitting, by the broadcast transmission element, the information as broadcast into the group;
receiving, by the one or more electric power consumption elements, the information transmitted as broadcast,
calculating, by each one of the one or more electric power consumption elements, independently from electric power consumption elements of the one or more electric power consumption elements other than the each one and the broadcast transmission element and in parallel, an update value for consumed electric power to be used for update of the each one's own consumed electric power by an operation using the degree of priority given or determined for the each one and the indication value for adjusting total consumed electric power, and controlling, by each one of the one or more electric power consumption elements, the each one's own consumed electric power based on the update value for consumed electric power to control the total consumed electric power in the group.

10. The electric power control method according to claim 9, wherein the determining of the indication value for adjusting total consumed electric power by the broadcast transmission element is performed by determining the indication value for adjusting total consumed electric power as a function of a system sensitivity in addition to the difference.

11. The electric power control method according to claim 9, further comprising dynamically changing degree of priority in at least one of the one or more electric power consumption elements.

12. The electric power control method according to claim 9, further comprising:

calculating, by the broadcast transmission element, at least one indication value for adjusting consumed electric power integrated under sub-constraint, and transmitting by broadcast at least one sub-constraint information representing the indication value for adjusting consumed electric power integrated under sub-constraint into the group;

receiving, by the one or more electric power consumption elements, the sub-constraint information transmitted by broadcast;

determining, by electric power consumption elements as targets of control based on the sub-constraint information among the one or more electric power consumption elements, an update value for consumed electric power under sub-constraint by an operation using the degree of priority given or determined for the each one and the indication value for adjusting consumed electric power integrated under sub-constraint, and further controlling the each one's own consumed electric power based on the update value for consumed electric power under sub-constraint.

13. The electric power control method according to claim 9, further comprising, in addition to broadcast transmission, communicating in both directions between the broadcast transmission element and at least one of the one or more electric power consumption elements.

14. The electric power control method according to claim 9 wherein the method is for electric power control in upper and lower classes, and:

in a lower class, the broadcast transmission element is provided as a broadcast transmission element which has a function of delivering information to be shared in a group only by one-way transmission of information to all electric power consumption elements in the group in lower class including the one or more electric power consumption elements in a significantly short time compared to a time interval of the control;

a degree of priority in upper class is given or determined for the broadcast transmission element individually, the method comprising:

receiving, by the broadcast transmission element, information in upper class which is transmitted by broadcast from an upper class broadcast transmission element and which represents an indication value for adjusting total consumed electric power in upper class;

measuring, by the broadcast transmission element, lower class total consumed electric power consumed in a group in lower class including one or more electric power consumption elements for which degrees of priorities in lower class are given or determined individually;

determining, by the broadcast transmission element, an indication value for adjusting total consumed electric power in lower class to be used for update of the lower class total consumed electric power, by an operation using the lower class total consumed electric power, a degree of priority in upper class, and the indication value for adjusting total consumed electric power in upper class, and creating information in lower class to be shared in the group in lower class representing the indication value for adjusting total consumed electric power in lower class;

transmitting, by the broadcast transmission element, the information in lower class as broadcast into the group in lower class;

receiving, by the one or more electric power consumption elements, the information in lower class transmitted as broadcast from the broadcast transmission element;

calculating, by each one of the one or more electric power consumption elements, independently from electric power consumption elements of the one or more electric power consumption elements other than the each one and the broadcast transmission element and in parallel, an update value for consumed electric power to be used for update of the each one's own consumed electric power by an operation using the degree of priority in lower class given or determined for the each one and the indication value for adjusting total consumed electric power in lower class; and controlling, by each one of the one or more electric power consumption elements, the each one's own consumed electric power based on the update value for consumed electric power to control the total consumed electric power in the group in lower class.

15. The electric power control method according to claim 9, wherein:

the broadcast transmission element is a broadcast transmission element which has a function of delivering information to be shared in the group only by one-way transmission of information to all electric power consumption elements in the group comprising the one or more electric power consumption elements in a significantly short time compared to a time interval of the control and a function of directly consuming electric power or opening/closing supply of electric power, the method comprising:

measuring, by the broadcast transmission element, the difference between (i) the current value as a multivariate amount indicating the total consumed electric power consumed or an electric power supply state and (ii) a reference value as a multivariate amount indicating the total consumed electric power or the electric power supply state;

determining, by the broadcast transmission element, an indication value for adjusting electric power which is generally a multivariate amount as a function of the difference, or receiving the indication value for adjusting electric power from another element;

creating, by the broadcast transmission element, information which is generally a multivariate amount to be shared in the group representing the indication value for adjusting electric power;

transmitting, by the broadcast transmission element, the information as broadcast into the group;

receiving, by the one or more electric power consumption elements, the information transmitted as broadcast;

calculating, by each one of the one or more electric power consumption elements, independently from electric power consumption elements of the one or more electric power consumption elements other than the each one and the broadcast transmission element and in parallel, an update value for electric power to be used for update of the each one's own consumed electric power or the opening/closing electric power by an operation using the degree of priority given or determined for the each one and the indication value for adjusting electric power, and controlling, by each one of the one or more electric power consumption elements, the each one's own consumed electric power or the opening/closing electric power based on the update value for electric power to control the total consumed electric power or electric power supply state in the group.

16. An information transfer capability control method in a group including one or more information transfer elements for which degrees of priorities are given or determined individually, the method comprising:

one broadcast transmission element and one or more information transfer elements, wherein implementation of each element of the information transfer elements and the broadcast transmission element includes communication system and interfaces, meters/sensors interfaces, judgement/execution system circuitry, electric power supply system in both the broadcast transmission element and one or more information transfer elements, and devices for controlling the information transfer capability in one or more information transfer elements, the method carried out by execution by said one or more elements, comprising:

measuring, by a broadcast transmission element which delivers information to be shared in the group only by one-way transmission of information to all information transfer elements in the group in a significantly short time compared to a time interval of the control, the difference between the current value of the total information transfer capability occupied and a reference value of the total information transfer capability;

determining, by the broadcast transfer element, an indication value for adjusting total information transfer capability as a function of the difference, and creating information to be shared in the group representing the indication value for adjusting total information transfer capability;

transmitting, by the broadcast transmission element, the information as broadcast into the group;

receiving, by the one or more information transfer elements, the information transmitted as broadcast;

calculating, by each one of the one or more information transfer elements, independently from information transfer elements of the one or more information transfer elements other than the each one and the broadcast transmission element and in parallel, an update value for information transfer capability to be used for update of the each one's own information transfer capability by an operation using the degree of priority given or determined for the each one and the indication value for adjusting total information transfer capability; and controlling, by each one of the one or more information transfer elements, the each one's own information transfer capability based on the update value for information transfer capability to control the total information transfer capability in the group.

* * * * *